United States Patent
Tennyson et al.

(10) Patent No.: US 9,244,449 B2
(45) Date of Patent: Jan. 26, 2016

(54) WIRELESS IRRIGATION CONTROL

(71) Applicant: Rain Bird Corporation, Azusa, CA (US)

(72) Inventors: Michael James Tennyson, Oceanside, CA (US); Angel Reyes, Tijuana (MX); Frank Torres, San Diego, CA (US); Robert H. Jenkins, Santee, CA (US); Brian Jeffrey Mueller, Vail, AZ (US)

(73) Assignee: Rain Bird Corporation, Azusa, CA (US)

( * ) Notice: Subject to any disclaimer, the term of this patent is extended or adjusted under 35 U.S.C. 154(b) by 505 days.

(21) Appl. No.: 13/689,585

(22) Filed: Nov. 29, 2012

(65) Prior Publication Data

US 2013/0173070 A1   Jul. 4, 2013

Related U.S. Application Data

(60) Provisional application No. 61/564,758, filed on Nov. 29, 2011.

(51) Int. Cl.
*G05B 19/02* (2006.01)
*G05B 19/042* (2006.01)

(52) U.S. Cl.
CPC .............. *G05B 19/02* (2013.01); *G05B 19/042* (2013.01); *G05B 2219/25187* (2013.01); *G05B 2219/2625* (2013.01)

(58) Field of Classification Search
CPC ................. G05B 19/02; G05B 19/042; G05B 2219/2625; G05B 2219/25187
See application file for complete search history.

(56) References Cited

U.S. PATENT DOCUMENTS

D208,451 S    8/1967  Anesi
3,653,595 A    4/1972  Greengard, Jr.
(Continued)

FOREIGN PATENT DOCUMENTS

CA          119116        2/2008
EM     0006591640001      1/2007
(Continued)

OTHER PUBLICATIONS

REMCONIX "ICI 500 Wireless Irrigation System Brochure" http://www.remconix.co.za/Products/Irrigation/ICI500.pdf published at least as early as Mar. 22, 2006; 2 pages; Remconix (Pty.) Ltd. Republic of South Africa.
(Continued)

*Primary Examiner* — Ramesh Patel
(74) *Attorney, Agent, or Firm* — Fitch, Even, Tabin & Flannery, LLP

(57) ABSTRACT

Some embodiments provide methods and systems of controlling irrigation. Some of these systems comprise: a connector of a controller interface (CI) coupled with an irrigation controller, wherein the connector is configured to receive a valve activation signal activated by the irrigation controller; a user interface of the CI; a processor of the CI configured to obtain valve transceiver (VT) programming with VT programming being received from inputs through the user interface, determine a station identifier, and identify as defined in the VT programming a remote valve associated with the station identifier and controlled by a remote VT; and a wireless transceiver configured to wirelessly transmit a wireless activation signal configured to be wirelessly received by the VT controlling the valve associated by the VT programming with the station identifier such that the VT is configured to control an actuator to actuate the valve.

28 Claims, 34 Drawing Sheets

(56) References Cited

U.S. PATENT DOCUMENTS

| | | | |
|---|---|---|---|
| 3,726,477 A | 4/1973 | Shapiro | |
| 3,747,620 A | 7/1973 | Kah, Jr. | |
| 4,146,049 A | 3/1979 | Kruse | |
| 4,185,650 A | 1/1980 | Neves | |
| 4,209,131 A | 6/1980 | Barash | |
| 4,244,022 A | 1/1981 | Kendall | |
| 4,256,133 A | 3/1981 | Coward | |
| 4,333,490 A | 6/1982 | Enter, Sr. | |
| 4,396,149 A | 8/1983 | Hirsch | |
| 4,541,563 A | 9/1985 | Uetsuhara | |
| 4,626,984 A | 12/1986 | Unruh | |
| 4,684,920 A | 8/1987 | Reiter | |
| 4,760,547 A | 7/1988 | Duxbury | |
| D298,962 S | 12/1988 | Bruninga | |
| 4,838,310 A | 6/1989 | Scott | |
| 4,852,802 A | 8/1989 | Iggulden et al. | |
| 4,937,746 A | 6/1990 | Brundisini | |
| 4,962,522 A | 10/1990 | Marian | |
| 5,048,755 A | 9/1991 | Dodds | |
| 5,074,468 A | 12/1991 | Yamamoto | |
| 5,173,855 A | 12/1992 | Nielsen et al. | |
| 5,251,153 A | 10/1993 | Nielsen et al. | |
| 5,333,785 A * | 8/1994 | Dodds et al. | 239/69 |
| 5,427,350 A | 6/1995 | Rinkewich | |
| 5,445,178 A | 8/1995 | Feuer | |
| 5,465,904 A | 11/1995 | Vaello | |
| 5,479,338 A | 12/1995 | Ericksen | |
| D368,230 S | 3/1996 | Cohen | |
| D377,316 S | 1/1997 | Roman | |
| 5,647,388 A | 7/1997 | Butler, Jr. | |
| 5,696,671 A | 12/1997 | Oliver | |
| 5,740,031 A | 4/1998 | Gagnon | |
| 5,748,466 A | 5/1998 | McGivern | |
| 5,749,521 A | 5/1998 | Lattery | |
| 5,760,706 A | 6/1998 | Kiss | |
| 5,797,417 A | 8/1998 | DeLattre | |
| 5,826,619 A | 10/1998 | Roman | |
| 5,859,536 A | 1/1999 | Stockton | |
| 5,870,302 A | 2/1999 | Oliver | |
| 5,914,847 A | 6/1999 | Alexanian et al. | |
| 5,921,280 A | 7/1999 | Ericksen et al. | |
| 5,927,603 A | 7/1999 | McNabb | |
| D428,876 S | 8/2000 | Renkis | |
| 6,098,898 A | 8/2000 | Storch | |
| D431,195 S | 9/2000 | Clivio | |
| 6,173,727 B1 | 1/2001 | Davey | |
| D442,577 S | 5/2001 | Strand | |
| D442,947 S | 5/2001 | Warner | |
| 6,257,264 B1 | 7/2001 | Sturman | |
| 6,259,955 B1 | 7/2001 | Brundisini | |
| 6,259,970 B1 | 7/2001 | Brundisini | |
| 6,283,139 B1 | 9/2001 | Symonds | |
| 6,312,191 B1 | 11/2001 | Rosenfeld | |
| 6,335,855 B1 | 1/2002 | Alexanian | |
| 6,337,635 B1 | 1/2002 | Ericksen | |
| 6,437,692 B1 | 8/2002 | Petite | |
| 6,452,499 B1 | 9/2002 | Runge | |
| 6,453,215 B1 | 9/2002 | Lavoie | |
| 6,491,062 B1 | 12/2002 | Croft | |
| D477,287 S | 7/2003 | Roman | |
| 6,600,971 B1 | 7/2003 | Smith et al. | |
| 6,633,786 B1 | 10/2003 | Majors | |
| 6,685,104 B1 | 2/2004 | Float | |
| D487,728 S | 3/2004 | Murray | |
| D492,264 S | 6/2004 | Perez | |
| 6,782,310 B2 | 8/2004 | Bailey | |
| 6,782,311 B2 | 8/2004 | Barlow | |
| 6,823,239 B2 | 11/2004 | Sieminski | |
| 6,853,883 B2 | 2/2005 | Kreikemeier | |
| 6,895,987 B2 | 5/2005 | Addink | |
| 6,904,926 B2 | 6/2005 | Aylward et al. | |
| 7,010,394 B1 | 3/2006 | Runge | |
| 7,050,887 B2 | 5/2006 | Alvarez | |
| 7,069,115 B1 | 6/2006 | Woytowitz | |
| 7,111,817 B2 | 9/2006 | Teti | |
| D535,571 S | 1/2007 | Simon | |
| 7,216,659 B2 | 5/2007 | Caamano et al. | |
| D546,772 S | 7/2007 | Venegas | |
| 7,245,991 B1 * | 7/2007 | Woytowitz | 700/284 |
| 7,248,945 B2 | 7/2007 | Woytowitz | |
| 7,257,465 B2 | 8/2007 | Perez et al. | |
| 7,261,245 B2 | 8/2007 | Zur | |
| 7,266,428 B2 | 9/2007 | Alexanian | |
| 7,286,904 B2 | 10/2007 | Graham | |
| 7,289,886 B1 | 10/2007 | Woytowitz | |
| 7,339,957 B2 * | 3/2008 | Hitt | 370/509 |
| 7,363,113 B2 | 4/2008 | Runge et al. | |
| 7,398,139 B1 | 7/2008 | Woytowitz | |
| 7,406,363 B2 * | 7/2008 | Doering et al. | 700/284 |
| 7,444,207 B2 | 10/2008 | Nickerson et al. | |
| D581,880 S * | 12/2008 | Neitzel et al. | D13/162 |
| D585,435 S | 1/2009 | Wafer | |
| 7,522,975 B2 | 4/2009 | Perez | |
| 7,558,650 B2 | 7/2009 | Thornton et al. | |
| 7,613,546 B2 | 11/2009 | Nelson et al. | |
| 7,613,547 B1 | 11/2009 | Woytowitz | |
| 7,640,079 B2 | 12/2009 | Nickerson et al. | |
| 7,750,805 B2 | 7/2010 | Leggett et al. | |
| D622,709 S | 8/2010 | Hern | |
| 7,789,321 B2 | 9/2010 | Hitt | |
| 7,809,475 B2 | 10/2010 | Kaprielian | |
| 7,844,369 B2 | 11/2010 | Nickerson | |
| 7,853,363 B1 | 12/2010 | Porter et al. | |
| 7,877,168 B1 | 1/2011 | Porter et al. | |
| 7,883,027 B2 | 2/2011 | Fekete et al. | |
| 7,899,580 B2 | 3/2011 | Cardinal et al. | |
| 7,912,588 B2 | 3/2011 | Runge et al. | |
| 7,916,458 B2 | 3/2011 | Nelson et al. | |
| 7,917,249 B2 | 3/2011 | Jacobsen et al. | |
| 7,930,069 B2 * | 4/2011 | Savelle et al. | 700/284 |
| 7,937,187 B2 | 5/2011 | Kaprielian | |
| 7,949,433 B2 | 5/2011 | Hern et al. | |
| 7,953,517 B1 | 5/2011 | Porter et al. | |
| 7,957,843 B2 | 6/2011 | Sacks | |
| 7,962,244 B2 | 6/2011 | Alexanian | |
| 7,962,245 B2 | 6/2011 | Runge et al. | |
| 7,996,115 B2 | 8/2011 | Nickerson et al. | |
| 8,010,238 B2 | 8/2011 | Ensworth et al. | |
| 8,013,732 B2 * | 9/2011 | Petite et al. | 340/539.1 |
| 8,014,904 B1 | 9/2011 | Woytowitz | |
| 8,019,482 B2 | 9/2011 | Sutardja | |
| 8,024,075 B2 | 9/2011 | Fekete | |
| 8,055,389 B2 * | 11/2011 | Holindrake et al. | 700/284 |
| 8,104,993 B2 | 1/2012 | Hitt et al. | |
| 8,160,750 B2 * | 4/2012 | Weiler | 700/284 |
| 8,185,248 B2 | 5/2012 | Ensworth et al. | |
| 8,326,440 B2 * | 12/2012 | Christfort | 700/21 |
| 8,504,210 B2 | 8/2013 | Ensworth | |
| 8,615,329 B2 | 12/2013 | OConnor | |
| 8,620,481 B2 | 12/2013 | Holindrake | |
| 8,868,246 B2 | 10/2014 | Thornton | |
| 2002/0002425 A1 | 1/2002 | Dossey | |
| 2002/0071234 A1 | 6/2002 | Alexanian | |
| 2002/0092926 A1 | 7/2002 | Thornton | |
| 2003/0109964 A1 | 6/2003 | Addink | |
| 2003/0120393 A1 | 6/2003 | Bailey | |
| 2003/0201675 A1 | 10/2003 | Alexanian | |
| 2004/0026529 A1 | 2/2004 | Float | |
| 2004/0089346 A1 | 5/2004 | Sutardja | |
| 2004/0090345 A1 * | 5/2004 | Hitt | 340/870.11 |
| 2004/0100151 A1 | 5/2004 | Smyth | |
| 2004/0100394 A1 * | 5/2004 | Hitt | 340/870.11 |
| 2004/0206405 A1 | 10/2004 | Smith | |
| 2004/0217189 A1 | 11/2004 | Regli | |
| 2004/0225412 A1 | 11/2004 | Alexanian | |
| 2005/0060065 A1 | 3/2005 | Yuan | |
| 2005/0098649 A1 | 5/2005 | Thornton | |
| 2005/0107924 A1 | 5/2005 | Bailey | |
| 2005/0137752 A1 | 6/2005 | Alvarez | |
| 2005/0167625 A1 | 8/2005 | Deen | |
| 2005/0203669 A1 * | 9/2005 | Curren | 700/284 |
| 2005/0267641 A1 | 12/2005 | Nickerson | |
| 2005/0273205 A1 | 12/2005 | Nickerson | |
| 2006/0025875 A1 * | 2/2006 | Smith et al. | 700/86 |

(56) References Cited

U.S. PATENT DOCUMENTS

| | | | |
|---|---|---|---|
| 2006/0027676 A1 | 2/2006 | Buck et al. | |
| 2006/0030971 A1 | 2/2006 | Nelson | |
| 2006/0043208 A1 | 3/2006 | Graham | |
| 2006/0174707 A1 | 8/2006 | Zhang | |
| 2006/0202051 A1* | 9/2006 | Parsons et al. | 239/69 |
| 2006/0290399 A1 | 12/2006 | MacDougall | |
| 2007/0010915 A1 | 1/2007 | Burson | |
| 2007/0106426 A1* | 5/2007 | Ensworth et al. | 700/284 |
| 2007/0179674 A1 | 8/2007 | Ensworth | |
| 2007/0191991 A1 | 8/2007 | Addink | |
| 2007/0208462 A1 | 9/2007 | Kah | |
| 2007/0251112 A1 | 11/2007 | San Jose | |
| 2008/0039978 A1 | 2/2008 | Graham | |
| 2008/0058964 A1 | 3/2008 | Nickerson | |
| 2008/0058995 A1 | 3/2008 | Holindrake et al. | |
| 2008/0071426 A1 | 3/2008 | Perez | |
| 2008/0136630 A1 | 6/2008 | Leggett et al. | |
| 2008/0249664 A1 | 10/2008 | Runge et al. | |
| 2008/0251602 A1 | 10/2008 | Leggett et al. | |
| 2008/0275595 A1* | 11/2008 | Bailey et al. | 700/284 |
| 2008/0319585 A1 | 12/2008 | Nickerson et al. | |
| 2009/0076659 A1 | 3/2009 | Ensworth et al. | |
| 2009/0076660 A1 | 3/2009 | Goldberg et al. | |
| 2009/0099701 A1 | 4/2009 | Li et al. | |
| 2009/0126801 A1 | 5/2009 | Grill et al. | |
| 2009/0150001 A1 | 6/2009 | Fekete | |
| 2009/0150002 A1 | 6/2009 | Fekete | |
| 2009/0204265 A1* | 8/2009 | Hackett | 700/284 |
| 2009/0216345 A1 | 8/2009 | Christfort | |
| 2009/0222141 A1 | 9/2009 | Ensworth | |
| 2009/0281672 A1 | 11/2009 | Pourzia | |
| 2010/0036536 A1 | 2/2010 | Nelson et al. | |
| 2010/0100247 A1 | 4/2010 | Nickerson et al. | |
| 2010/0106337 A1 | 4/2010 | Sacks | |
| 2010/0145531 A1 | 6/2010 | Nickerson et al. | |
| 2010/0179701 A1 | 7/2010 | Gilbert et al. | |
| 2010/0222932 A1 | 9/2010 | O'Connor | |
| 2010/0241279 A1 | 9/2010 | Samon et al. | |
| 2010/0268390 A1 | 10/2010 | Anderson | |
| 2010/0286833 A1 | 11/2010 | Kaprielian | |
| 2010/0305764 A1 | 12/2010 | Carr et al. | |
| 2010/0305765 A1 | 12/2010 | Sutardja | |
| 2010/0324744 A1 | 12/2010 | Cox | |
| 2011/0015800 A1 | 1/2011 | Crist | |
| 2011/0040416 A1 | 2/2011 | Nickerson | |
| 2011/0093123 A1 | 4/2011 | Alexanian | |
| 2011/0111700 A1* | 5/2011 | Hackett | 455/41.2 |
| 2011/0137472 A1 | 6/2011 | Hitt et al. | |
| 2011/0190947 A1* | 8/2011 | Savelle et al. | 700/284 |
| 2011/0190948 A1 | 8/2011 | Fekete | |
| 2011/0224836 A1 | 9/2011 | Hern et al. | |
| 2011/0231025 A1 | 9/2011 | Sacks | |
| 2011/0238227 A1 | 9/2011 | Hern et al. | |
| 2011/0288690 A1 | 11/2011 | Ensworth et al. | |
| 2012/0232708 A1 | 9/2012 | Ensworth | |

FOREIGN PATENT DOCUMENTS

| | | |
|---|---|---|
| EM | 0006591640002 | 1/2007 |
| EM | 0006591640003 | 1/2007 |
| EP | 1 324 166 | 7/2003 |
| WO | WO 2005/002321 | 1/2005 |
| WO | WO 2007-011999 | 1/2007 |

OTHER PUBLICATIONS

REMCONIX "ICI 500 Wireless Irrigation System PowerPoint Slide Show" http://www.remconix.co.za/Products/irrigation/ICI500.html published at least as early as Mar. 22, 2006; 17 pages; Remconix (Pty.) Ltd. Republic of South Africa.

REMCONIX "ICI 500 Wireless Irrigation Information Page" http://www.remconix.co.za/Products/Irrigation/ICI500.html both portrait and landscape versions published at least as early as Mar. 22, 2006; 4 pages; Remconix (Pty.) Ltd. Republic of South Africa.

PCT; Application No. PCT/US06/28012; International Preliminary Report on Patentability mailed Mar. 17, 2009; 9 Pages.

PCT; Application No. PCT/US06/28012; Written Opinion mailed Jul. 3, 2008; 8 Pages.

PCT; App. No. PCT/US06/28012; International Search Report mailed Jul. 3, 2008; 5 Pages.

U.S. Appl. No. 11/209,590; Notice of Allowance mailed Jun. 28, 2007; 6 Pages.

U.S. Appl. No. 11/209,590; Office Action mailed Feb. 14, 2007; 6 Pages.

U.S. Appl. No. 11/458,535; Notice of Allowance mailed Jan. 28, 2009; 6 Pages.

U.S. Appl. No. 11/458,535; Office Action mailed May 22, 2008; 6 Pages.

U.S. Appl. No. 11/458,535; Office Action mailed Sep. 4, 2008; 8 Pages.

U.S. Appl. No. 11/681,153; Office Action mailed Mar. 17, 2008; 7 Pages.

U.S. Appl. No. 11/681,153; Office Action mailed Jul. 13, 2007; 9 Pages.

U.S. Appl. No. 11/876,969; Notice of Abandonment mailed Feb. 3, 2009; 2 Pages.

U.S. Appl. No. 11/876,969; Office Action mailed Jun. 27, 2008; 9 Pages.

U.S. Appl. No. 12/212,516; Office Action mailed Apr. 15, 2009; 8 Pages.

U.S. Appl. No. 12/212,516; Office Action mailed Feb. 22, 2010; 8 Pages.

U.S. Appl. No. 12/212,516; Examiner Interview Summary Action mailed May 27, 2010; 3 Pages.

U.S. Appl. No. 12/212,516; Office Action mailed Aug. 16, 2010; 10 Pages.

U.S. Appl. No. 12/212,516; Examiner Interview Summary Action mailed Feb. 17, 2011; 4 Pages.

U.S. Appl. No. 12/212,516; Notice of Allowance mailed Apr. 21, 2011; 7 Pages.

U.S. Appl. No. 12/464,818; Office Action mailed Sep. 16, 2010; 7 Pages.

U.S. Appl. No. 12/464,818; Examiner Interview Summary Action mailed Mar. 24, 2011; 3 Pages.

U.S. Appl. No. 12/464,818; Office Action mailed Mar. 24, 2011; 11 Pages.

U.S. Appl. No. 12/464,818; Examiner-Initiated Interview Summary mailed Apr. 4, 2011; 3 Pages.

U.S. Appl. No. 12/464,818; Examiner Interview Summary Action mailed Jun. 13, 2011; 3 Pages.

U.S. Appl. No. 12/464,818; Office Action mailed Jun. 13, 2011; 12 Pages.

U.S. Appl. No. 12/464,818; Notice of Allowance mailed Jan. 24, 2012; 8 Pages.

U.S. Appl. No. 13/192,420; Office Action mailed Feb. 23, 2012; 8 Pages.

U.S. Appl. No. 13/192,420; Notice of Abandonment mailed Aug. 29, 2012; 2 Pages.

Hunter Industries Incorporated; Hunter brochure for ICR Remote Control; 2 Pages; Copyright 2003; Published Feb. 2003.

Rain Bird, "ISA Series, Multiple Station Indoor Timers," commercially available prior to Dec. 14, 2006, 1 page, http://web.archive.org/web/20061229091114/www.rainbird.com/diy.products/isa.htm.

Rain Bird, "ISB-409, 9 Station Dual Program Indoor Timer," commercially available prior to Dec. 14, 2006, 1 page, http://web.archive.org/web/20061229094429/www.rainbird.com/diy/products/timers/isb409.htm.

Rain Bird, "ISM Series, Irrigation System Manager," commercially available prior to Dec. 14, 2006, 2 pages, http://web.archive.org/web/20070224174857/www.rainbird.com/diy/products/timers/ism.htm.

Rain Bird, "Rain Bird ESP-TM Series, Dual Program Hybrid Irrigation Controllers," commercially available prior to Dec. 14, 2006, 2 pages, http://web.archive.org/web/20060221193813/www.rainbird.com/landscape/products/controllers/esptm.htm.

(56) References Cited

OTHER PUBLICATIONS

Rain Bird; "Easy Rain, Single-Valve Battery-Operated Controller;" Commercially Available Prior to May 17, 2007; 2 pgs.; http://web.archive.org/web/20070203083417/www.rainbird.com/landscape/products/control . . .; Rain Bird Corporation, Glendora, CA.

Rain Bird Corporation, "E-Class Series, Indoor/Outdoor Multiple Station Timer with Programmer Rain Delay," commercially available prior to Dec. 14, 2006, 1 page, http://web.archive.org/web/20061230224254/www.rainbird.com/diy/products/timers/eclass.htm.

Rain Bird Corporation, "EC Series Irrigation Controllers, Three Program Hybrid Indoor Controller," commercially available prior to Dec. 14, 2006, 2 pages, http://web.archive.org/web/20070428032252/www.rainbird.com/landscape/products/controllers/ec.htm.

Rain Bird Corporation, "ESP-LXi Series, Indoor/Outdoor Extra Simple Programmer with Drip Program," commercially available prior to Dec. 14, 2006, 1 page, http://web.archive.org/web/20061229090326/www.rainbird.com/diy/products/timers/esplxi.htm.

Rain Bird Corporation, "ESP-MC Series, Four Program Hybrid Controllers," commercially available prior to Dec. 14, 2006, 3 pages, http://web.archive.org/web/20060502184113/www.rainbird.com/landscape/products/controllers/espmc.htm.

\* cited by examiner

CI Top Level Block Diagram

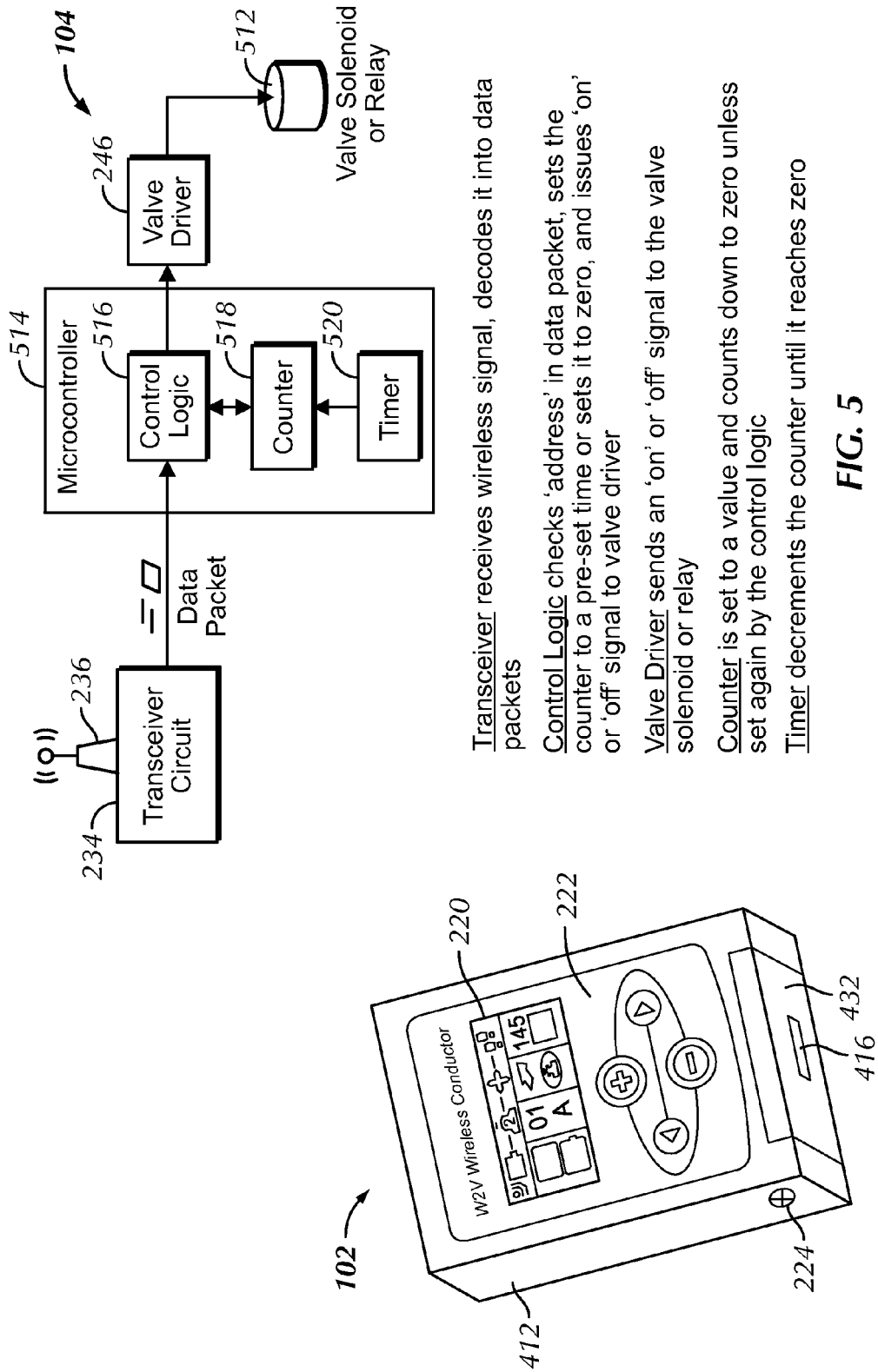

VT Top Level Block Diagram

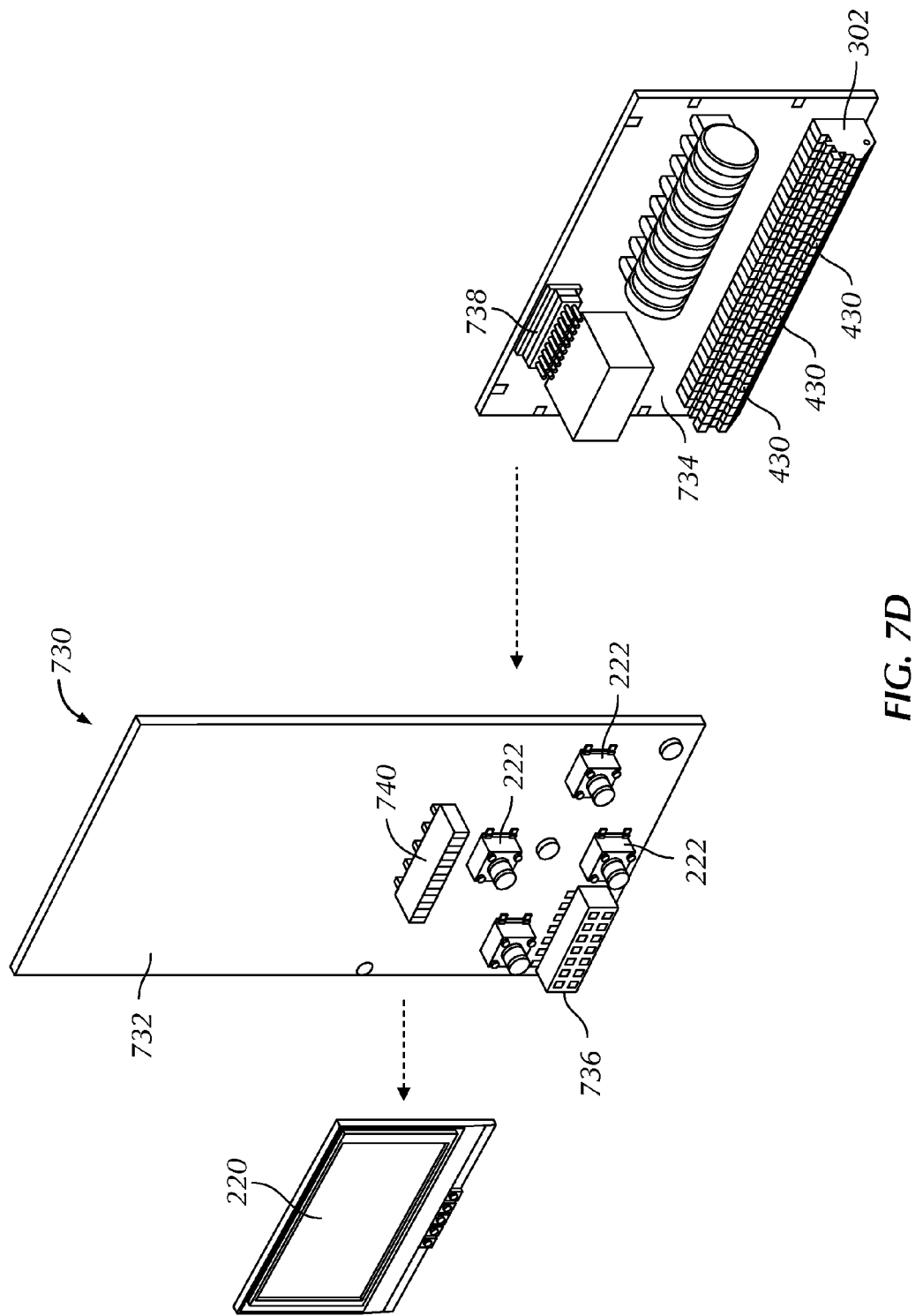

VT Board Front

VT Board Back

CI - Valve Numbering Screen

CI - Valve Locator Screen

CI - Status Screen

CI - Valve Distance Screen

CI - Pairing Screen

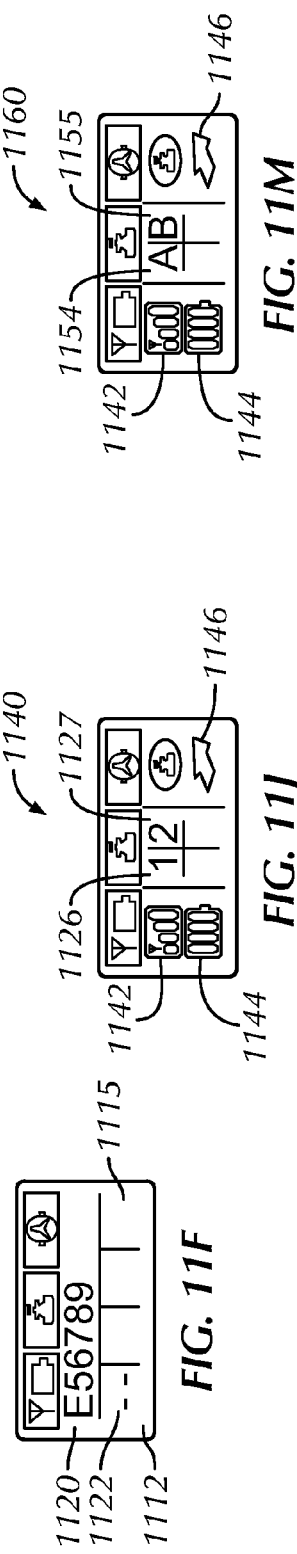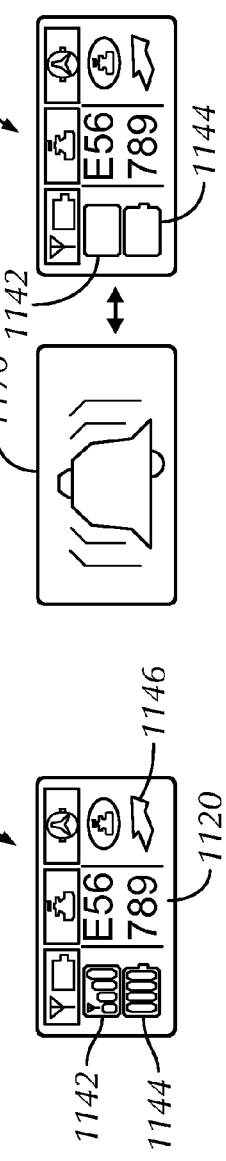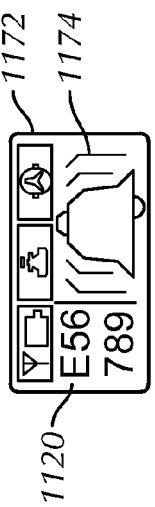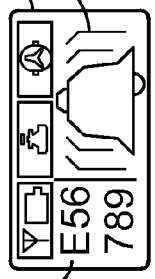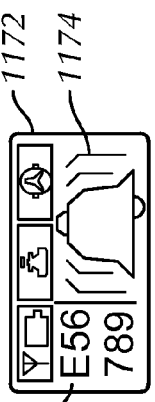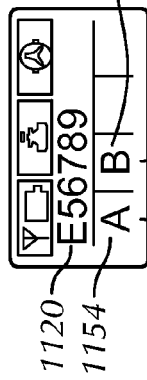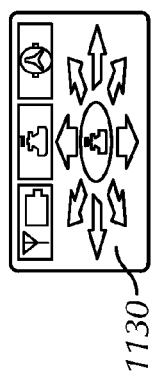

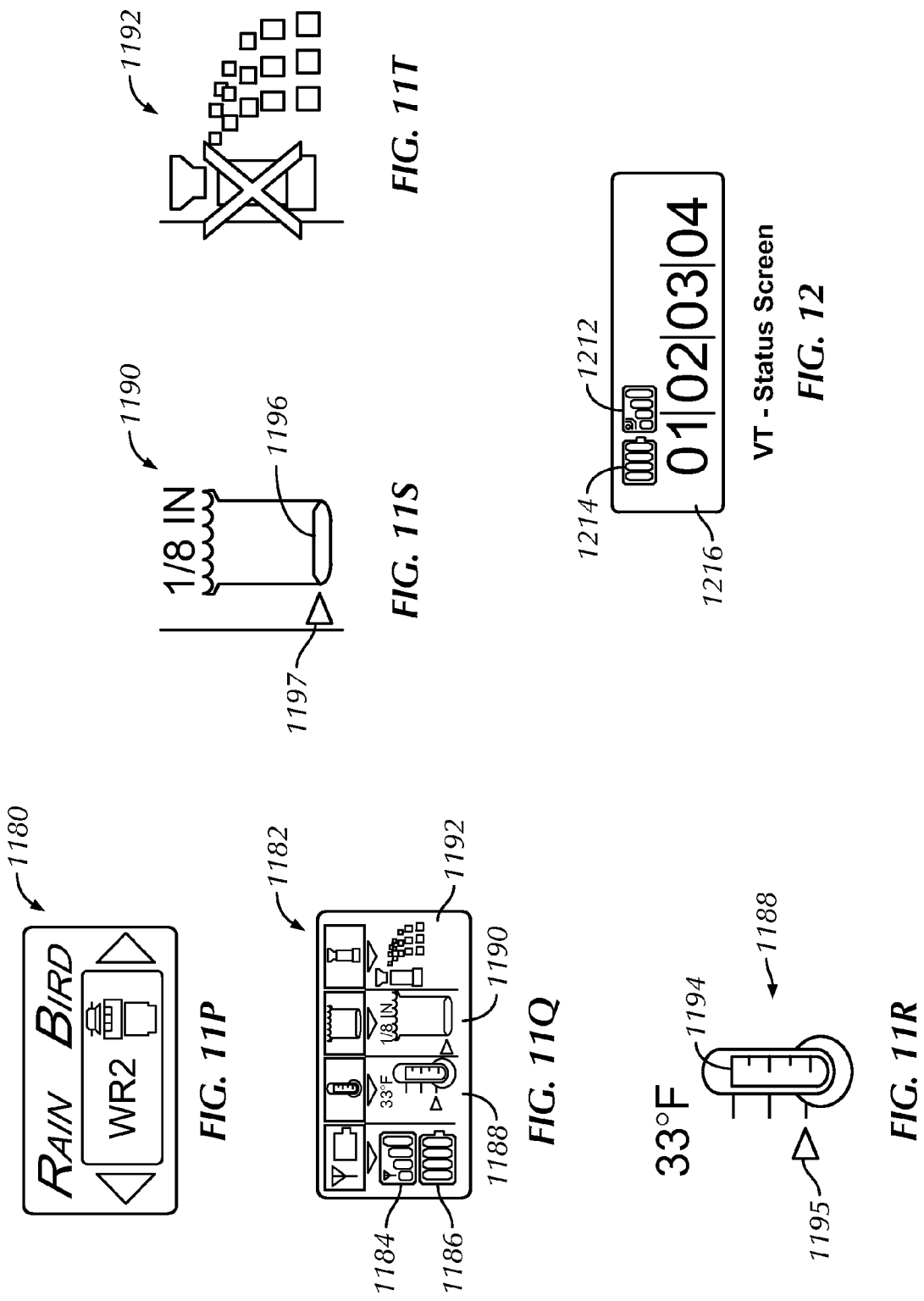

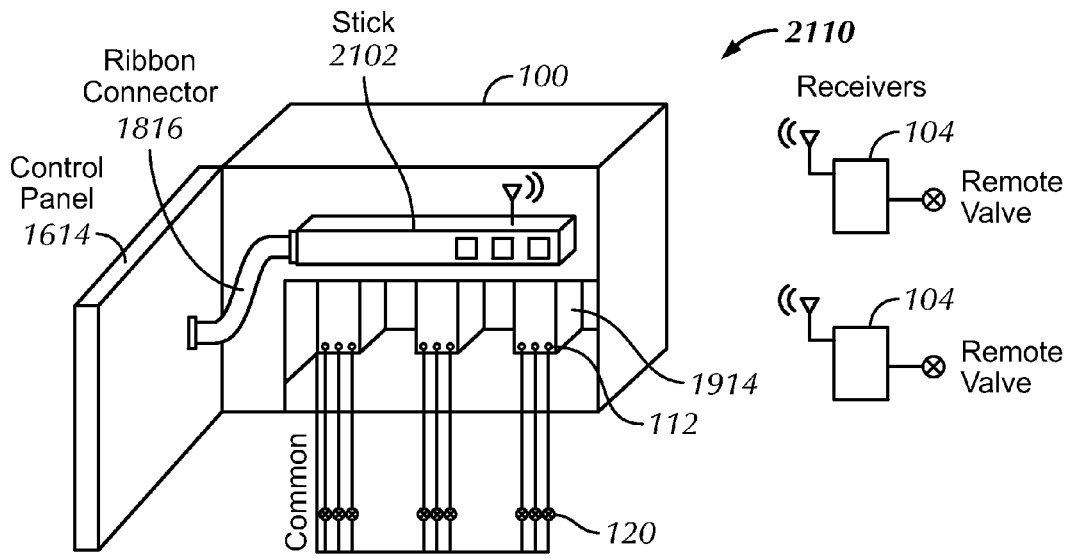
*FIG. 21A*
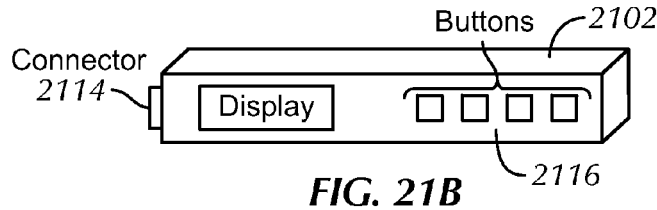
*FIG. 21B*
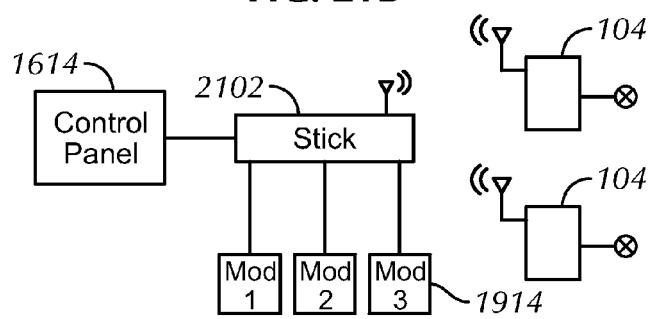
*FIG. 21C*
Station/Zone Mapping - defined at CI
| 1 | 2 | 3 | 4 | 5 | 6 | 7 | 8 | 9 |
|---|---|---|---|---|---|---|---|---|
| Wired | Wired | Wired | Wired | Wired | Wireless | Wired | Wireless | Wireless |
*FIG. 21D*

WIRELESS IRRIGATION CONTROL

This application claims the benefit of U.S. Provisional Application No. 61/564,758, filed Nov. 29, 2011, entitled WIRELESS IRRIGATION CONTROL, for Tennyson et al., which is incorporated in its entirety herein by reference.

BACKGROUND

1. Field of the Invention

The present invention relates generally to irrigation, and more specifically to irrigation control.

2. Discussion of the Related Art

Irrigation systems traditionally are used in many different applications, including, for example, commercial applications, residential applications, and on golf courses. Traditionally, when the irrigation system is installed, trenches are dug for the water piping. The same trenches are used for the wiring that connects valves to an irrigation controller. Generally, the wiring is a 24 AC power line that opens a valve coupled to a water pipe when 24 volts is applied to the power line. When there is no voltage applied to the power line, the valve closes, shutting off water flow through the valve. This is a convenient solution when a water system is first being installed because the trenches need to be dug for the water pipes in order to get water to various locations. However, if water pipes have already been installed, or a new zone is being added to the watering system there may not be a need to dig trenches all the way from the controller to the new zone because the water pipes are already installed for much of the distance in between the controller and the new zone. The additional water pipes are simply tapped into the existing water pipes. Therefore, connecting the power line from the valve for the new zone to the controller can be a very burdensome task.

Additionally, a number of other problems are created by installation and use of wires coupling an irrigation controller to remotely located valves. For example, when using traditional valves that are coupled to an irrigation controller through wires, there is a need to trench and place conduit or direct burial wire. Additionally, in-ground wiring is subject to induced lightning surges that can damage the irrigation controller or the valve solenoid. Induced lightning surges are prevalent in many areas, such as Florida. Further, wires deteriorate over time and can be exposed to damage during landscaping. Deteriorated or broken wires will cause the irrigation system to fail to properly control the actuation of valves. Still further, adding valves to a new or existing irrigation system requires trenching, designing around existing construction and landscaping or demolishing and replacing existing construction and landscaping. All of these can be very costly and undesirable. Finally, irrigation wires, once buried are difficult to locate. Additions or modifications require the use of special equipment to locate wires and/or wire breaks.

SUMMARY OF THE INVENTION

Several embodiments advantageously address the needs above as well as other needs by providing methods, systems and apparatuses of controlling irrigation. In some embodiments, an irrigation system comprises: a connector of a controller interface (CI) coupled with an irrigation controller, wherein the connector is configured to receive a valve activation signal activated by the irrigation controller; a user interface of the CI; a processor of the CI coupled with the connector and the user interface, wherein the processor is configured to obtain valve transceiver (VT) programming with at least a portion of the VT programming being received from inputs by a user through the user interface of the CI, determine a station identifier as a function of the valve activation signal, and identify as defined in the VT programming a remote valve associated with the station identifier of the irrigation controller and controlled by a remote VT; and a wireless transceiver coupled with the processor and configured to wirelessly transmit a wireless activation signal configured to be wirelessly received by the VT controlling the valve associated by the VT programming with the station identifier such that the VT is configured to control an actuator to actuate the valve.

In other embodiments, methods of controlling irrigation comprise: receiving, at a connector of a controller interface (CI) coupled with an irrigation controller, a valve activation signal activated by the irrigation controller, wherein the valve activation signal corresponds to a station identifier programmed at the irrigation controller; identifying, at a processor of the CI, a remote valve associated with the station identifier as defined at the CI in valve transceiver (VT) programming wherein at least a portion of the VT programming is received from inputs by a user through a user interface of the CI coupled with the processor, wherein the VT programming associates the station identifier with the remote valve controlled by an associated VT; and wirelessly transmitting a wireless activation signal to the associated VT, wherein the associated VT is configured to control an actuator to actuate the remote valve.

Further, in some embodiments, methods of controlling irrigation comprise: identifying, at a controller interface (CI) coupled with an irrigation controller, a remote valve transceiver (VT), wherein the CI is separate from the VT and the CI is configured to wirelessly communicate wireless activation signals to the VT; displaying, on a display of the CI, an identification of the VT; and displaying, on the display of the CI, a valve station designator corresponding to a valve controlled by the VT.

Some embodiments provide methods of controlling irrigation comprising: querying, from a controller interface (CI), an irrigation controller, wherein the CI is communicationally coupled with the irrigation controller; receiving, at the CI, a response to the query; generating at the CI a wireless activation signal as a function of the response to the query; and wirelessly transmitting the wireless activation signal to a valve transceiver (VT) configured to receive the wireless activation signal to control an actuator to actuate a valve.

BRIEF DESCRIPTION OF THE DRAWINGS

The above and other aspects, features and advantages of several embodiments will be more apparent from the following more particular description thereof, presented in conjunction with the following drawings.

FIG. 4 shows a perspective view of a controller interface in accordance with some embodiments.

FIG. 5 is a functional block diagram of a valve transceiver and components to activate and deactivate a solenoid controlled valve according to some embodiments.

FIG. 7D shows a perspective view of an exemplary two-board layout of a controller interface (CI) in accordance with some embodiments.

FIG. 12 is an exemplary display screen of a valve transceiver according to some embodiments.

FIG. 21A shows a simplified view of an irrigation system in accordance with some embodiments.

FIG. 21B shows a simplified perspective view of a controller interface of the irrigation system of FIG. 21A, in accordance with some embodiments.

FIG. 21C shows a simplified block diagram representation of the irrigation system of FIG. 21A.

FIG. 21D shows a representation of valve transceiver programming at a controller interface, in accordance with some embodiments.

Figure 1:
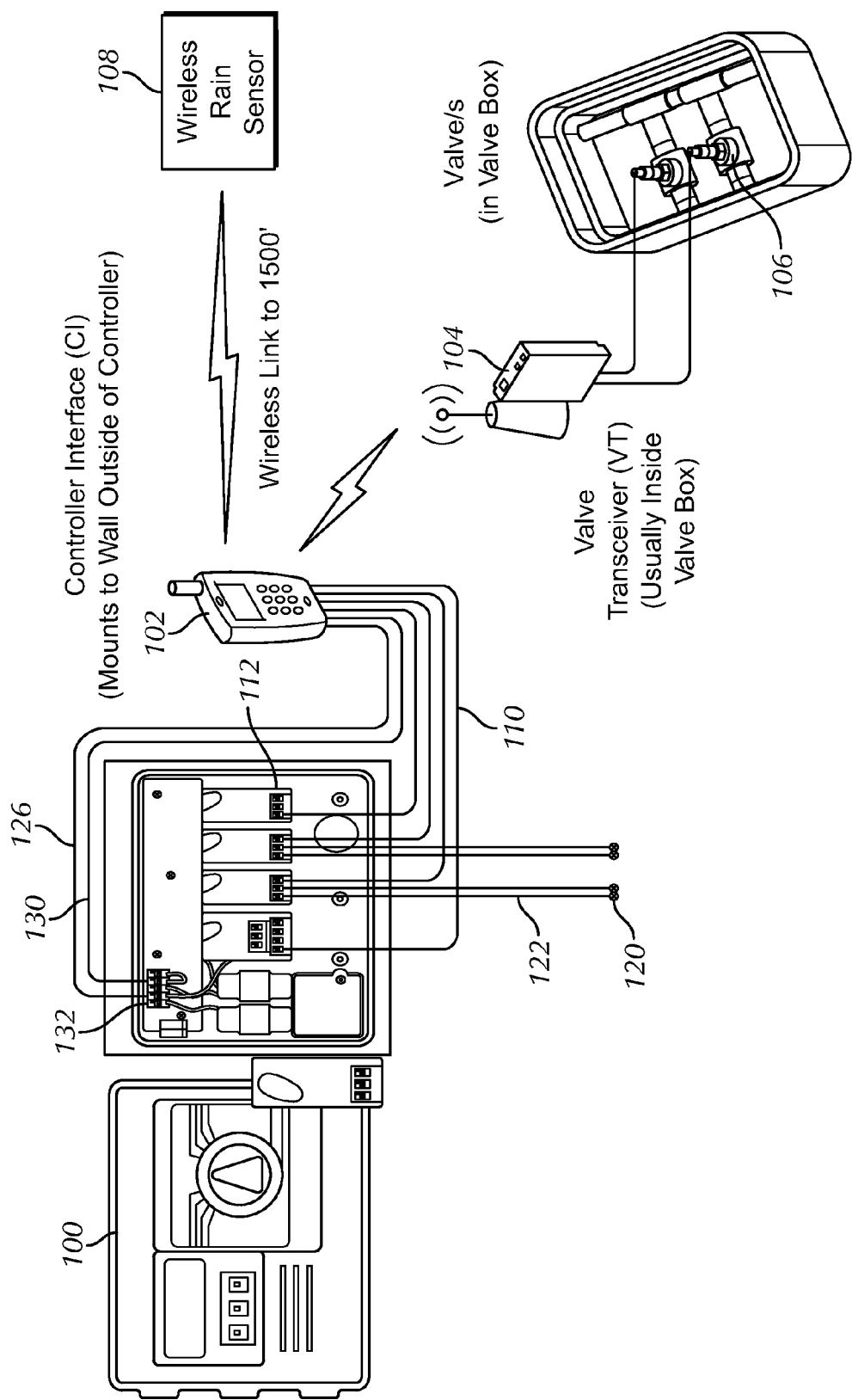
FIG. 1 is a diagram of a universal configuration of a wireless irrigation control system in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to any claims supported by this specification.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present embodiments provide systems, apparatuses and methods for use in controlling irrigation. Further, some embodiments control irrigation at least in part through wireless communication to control irrigation valves or other actuation devices (e.g., lighting devices, electric devices, pumps, gas flow control devices, etc.). In many implementations, the systems and methods allow legacy controllers to be used while still providing wireless control when the legacy controller was unable to provide such wireless control.

Wireless Irrigation Control

Some embodiments add the ability of wireless control of irrigation valves to an irrigation controller that normally lacks the ability to control valves wirelessly. In some embodiments, an irrigation controller already having the ability to control valves wirelessly is supplemented with the capability to wirelessly control additional irrigation valves. In either set of embodiments, referring first to FIG. 1, a wireless control system according to some embodiments is shown including an irrigation controller 100, a controller interface (CI) 102 and a valve transceiver (VT) 104. The CI 102 interfaces with the irrigation controller 100 and includes a wireless transceiver. The VT 104 includes a wireless transceiver and is coupled to and controls the opening and closing of one or more irrigation valves 106 (e.g., contained within a valve box) or other such actuation device. The CI 102 and the VT 104 communicate wirelessly with each other using their wireless transceivers. The wireless communication can be through substantially any relevant wireless communication method providing sufficient range to cover the distances between the CI and VTs. For example, in some embodiments, the wireless communication can be via radio frequency, optical, or substantially any other relevant wireless communication.

In some embodiments, the configuration of FIG. 1 is referred to as a universal configuration because this configuration allows wireless control of irrigation valves as an add-on to an irrigation controller 100 independent of manufacturer. Accordingly, with the universal configuration, the CI 102 can cooperate with many different types of existing and new irrigation controllers. In some embodiments, the CI does not require special communication protocol between the irrigation controller 100 and the CI 102. In other embodiments, the CI may be configured to cooperate with a specific irrigation controller 100 and/or manufacturer of irrigation controllers, such as being configured to accurately interpret protocol specific communications from a control panel or module of an irrigation controller. Still other embodiments provide a wireless configuration where the valves are wirelessly controlled and the system typically does not include wired valves.

Figure 16:
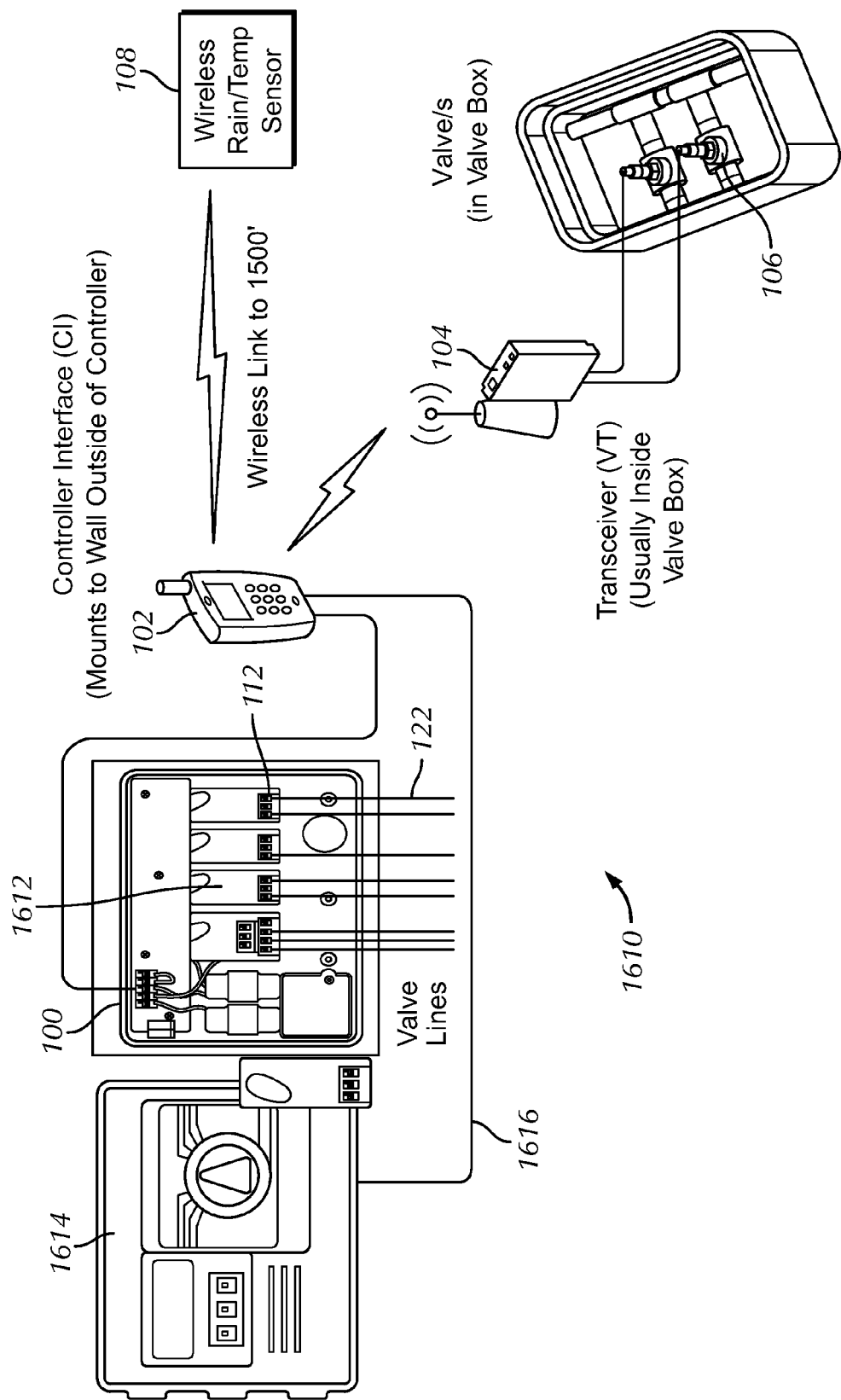
FIG. 16 is a diagram of a configuration of a wireless irrigation control system in accordance with some embodiments.

FIGS. 16-23 show other configurations of a CI that cooperate with irrigation controllers 100 through other methods. For example, FIG. 16 is a diagram of a configuration of a wireless irrigation control system 1610 in accordance with some embodiments where the CI 102 cooperates with a specific make and/or model irrigation controller 100 of a specific manufacturer. In some instances, the irrigation controller 100 is a modular irrigation controller into which a plurality of one or more types of modules 1612 are inserted and that couple with the backplane of the irrigation controller 100 to communicate with the control or front panel 1614. The CI 102, in this configuration (sometimes referred to as a Modular Configuration), couples directly with the control panel 1614 via a protocol communication line 1616. The CI can be configured to evaluate communications with valve activation signals from the control panel to extract station designations that are associated by the CI with one or more valves 106 controlled by one or more VTs 104, which are often remote from the irrigation controller 100 and CI 102.

Figure 17:
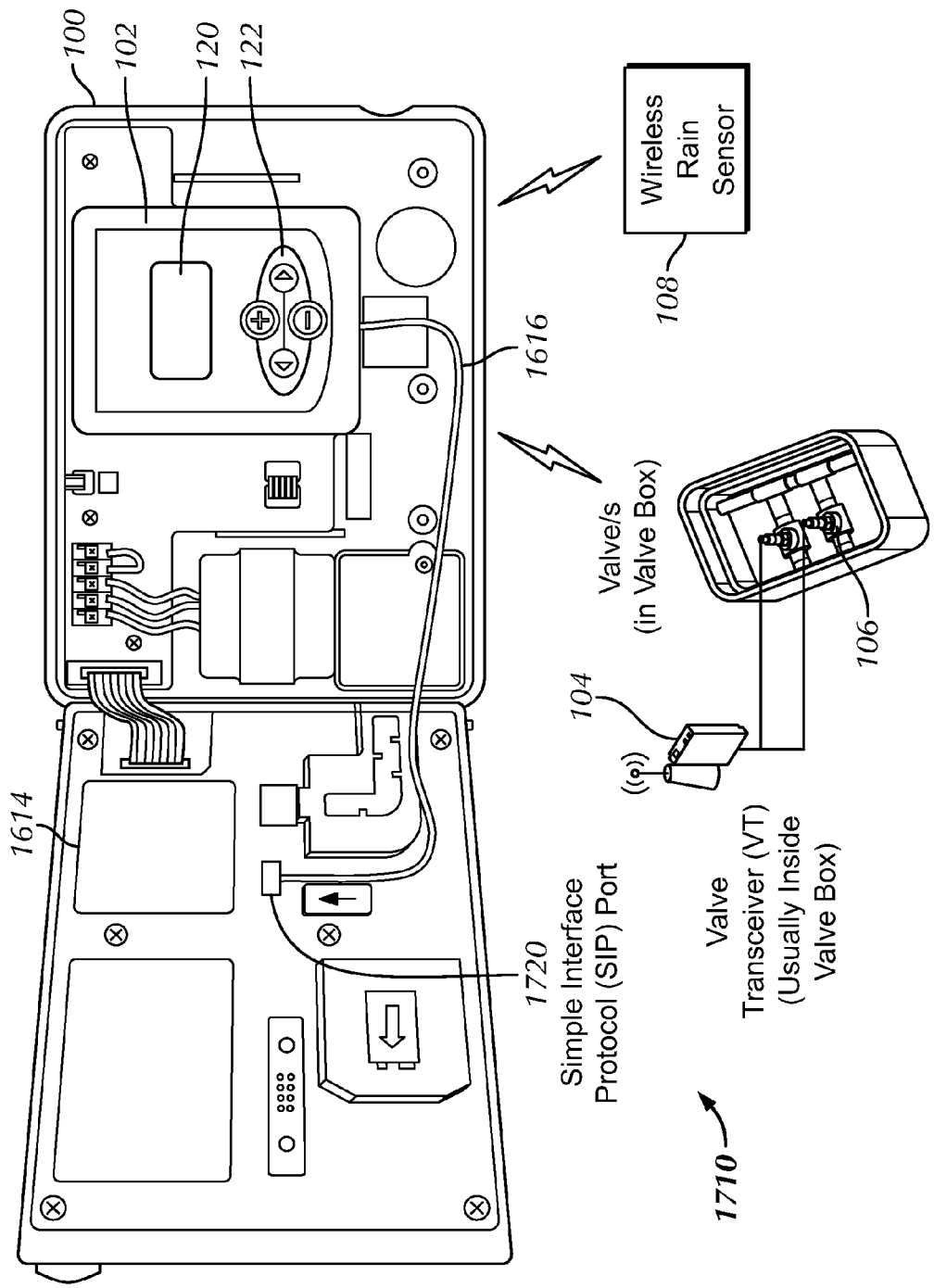
FIG. 17 is a diagram of a wireless irrigation control system in accordance with some embodiments where the controller interface is incorporated within an irrigation controller.

FIG. 17 is a diagram of a wireless irrigation control system 1710 in accordance with some embodiments where the CI 102 is incorporated within the irrigation controller 100 and cooperates with specific irrigation controllers of a manufacturer, or a specific make and/or model irrigation controller 100 of a specific manufacturer. In this configuration, the irrigation controller 100 is not configured to be directly wired to any irrigation stations, valves or other actuation devices. Instead, the configuration of irrigation control system 1710 is sometimes referred to as an all wireless configuration as the irrigation control system only wirelessly activates one or more valves 106 through the wireless communication between the CI 102 and the one or more VTs 104. The all wireless CI 102 can in some instances couple with the SIP port 1720 or other such communication port of the control panel 1614. In other embodiments, the CI 102 couples via the backplane of the irrigation controller 100 to communicate with the control panel 1614. As with the CI 102 in the modular configuration of FIG. 16, the CI 102 in the all wireless configuration can in some implementations be configured to cooperate with a specific irrigation controller (e.g., make and model), and/or to communicate with a specific protocol and interpret communications from the irrigation controller 100. As such, the CI can evaluate valve activation signals from the control panel to extract station identifiers or designations that are associated by the CI with one or more valves 106 controlled wirelessly by one or more VTs 104.

Controller Interface (CI)

Figure 2:
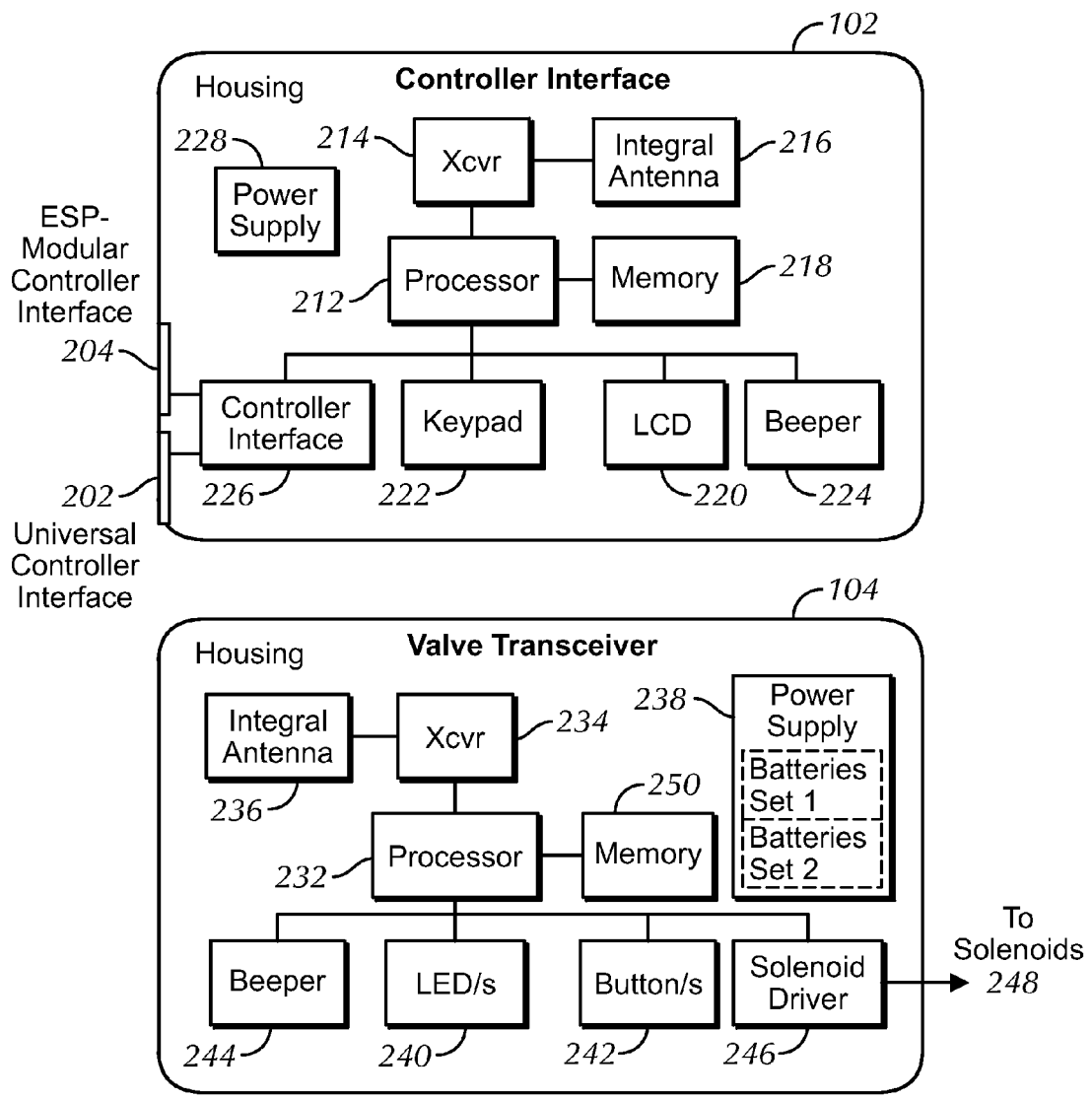
FIG. 2 is a functional block diagram of a controller interface (CI) and a valve transceiver (VT) according to some embodiments.

FIG. 2 illustrates the main functional components of some embodiments of a controller interface (CI) 102 and a valve transceiver (VT) or receiver 104. Referring to FIGS. 1-2, generally, the CI includes one or more processors, microprocessors and/or controllers 212, wireless transceivers 214, an antenna 216, a power supply 228, a display 220 (e.g., liquid crystal display LCD), other indicators (e.g., LEDs), a keypad 222 (or other user input, such as but not limited to a touch screen, buttons, mouse, scroll wheel, and/or other such user inputs), an audible element 224 (e.g., beeper, speaker or the like), and one or more interface connectors 226 to couple at least with an irrigation controller 100. In FIG. 2, a universal interface connector 202 (e.g., in a universal CI configuration) is shown that will allow the CI 102 to couple to with an irrigation controller 100, such as with the station output terminals 112 of substantially any irrigation controller, regardless of the manufacturer. Additionally or alternatively, the CI 102 can include an irrigation controller specific interface connector 204 (e.g., ESP-Modular Controller Interface) that will allow the CI to couple to a specific make and model controller of a specific manufacturer designed to operate and communicate with the specific controller.

It is understood that the processor 212 executes program instructions (such as firmware or software, for example) stored in memory 218 (which can be part of the processor 212, coupled with the processor and/or external to the CI) to control the components of the CI 102 and cause it to function as intended. The memory include one or more processor readable and/or computer readable media accessed by at least the processor 212, and can include volatile and/or nonvolatile media, such as RAM, ROM, EEPROM, flash memory and/or other memory technology. Further, the memory can be internal to the CI 102, or external or a combination of internal and external memory. The wireless transceiver 214 is configured to communicate with corresponding wireless transceivers of one or more VTs 104. For example, in one embodiment, the CI 102 can pair and communicate with up to 22 VTs.

Figure 3:
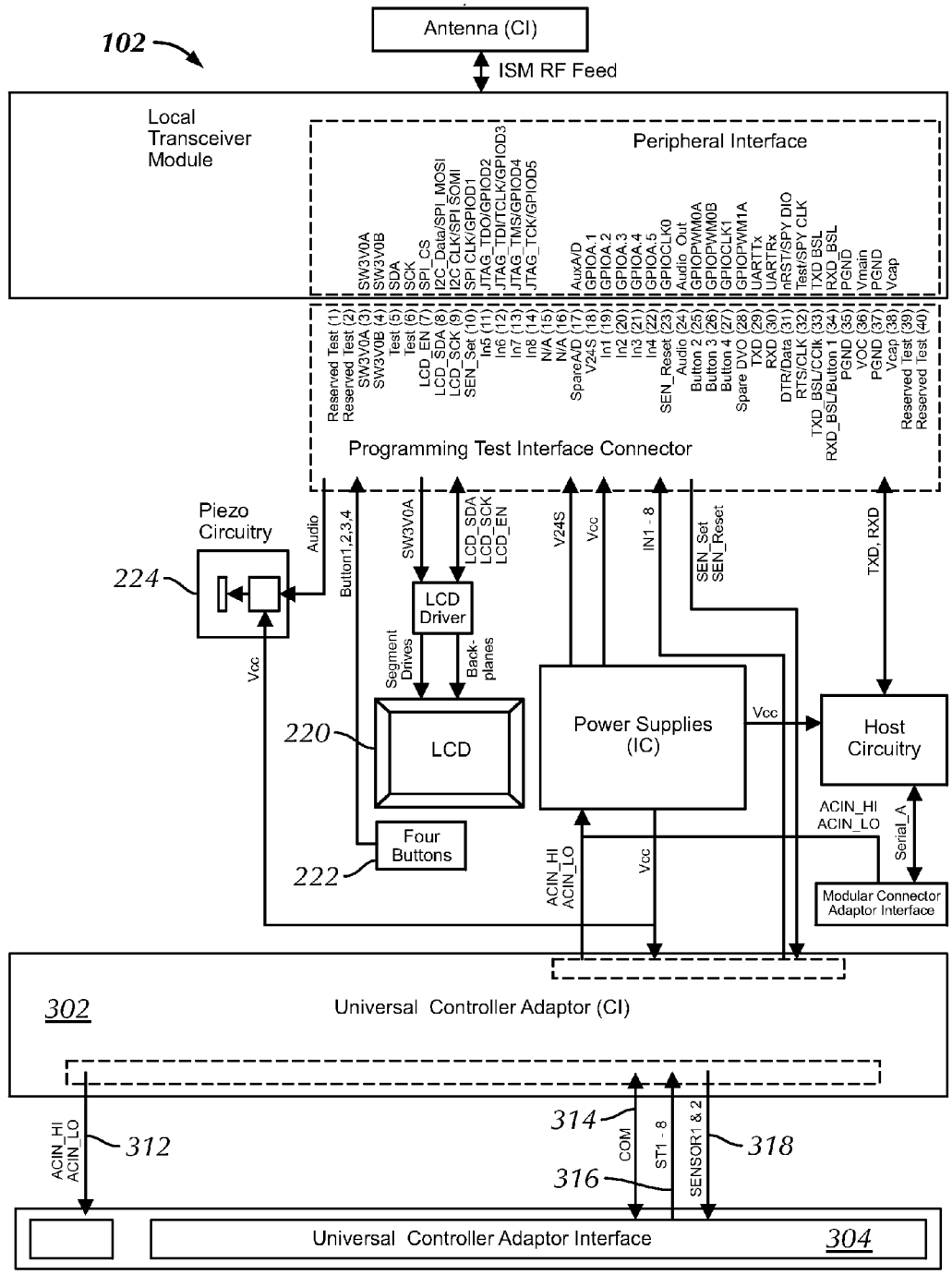
FIG. 3 is a circuit diagram of one embodiment of a controller interface (CI).

Referring to FIGS. 1-2, in some embodiments, the CI 102 couples to the station output connections or terminals 112 of the irrigation controller 100 and includes the wireless transceiver 214 to allow the CI to communicate with one or more remote VTs 104. In some embodiments, as illustrated in FIG. 1, the CI 102 is configured with a set of wires 110 extending from the CI that may be selectively connected to one or more of the station output terminals 112 of the irrigation controller 100. In other embodiments, such as illustrated in FIGS. 2 and 3, the CI 102 includes a universal interface connector (see 202 and 302). In this case, the CI includes a set of input terminals (e.g., a screwless terminal strip) that allow the user to connect wires to the universal interface connector 202/302 and then to the station output terminals 112 of the irrigation controller 100. Although the terminals are described as input terminals, those skilled in the art will appreciate that some or all of the terminals can provide for bidirectional communication. In FIG. 3, an adapter 304 is optionally included as a device that allows wires to be connected to it and then to the station output terminals 112 of the controller 100. In some embodiments, the adapter 304 acts as a passthrough.

In some implementations, when connected to the controller 100, the CI 102 couples to those station output terminals 112 for which the user intends to control valves. If the user intends that a given station output terminal control only a wired valve 120, that station output terminal is connected by valve wire 122 directly to the wired solenoid valve 120 and typically is not connected to the CI 102. Also, in some instances, a given station output terminal 112 may be coupled by valve wire 122 to a given wired solenoid 120 and also coupled by wire to the CI 102 to also control one or more valves 106 connected to one or more VTs 104.

Since the CI is coupled to the station output terminals 112 of the irrigation controller 100, no programming changes are required at the irrigation controller 100. In some embodiments, the wires 110 extending from the CI are color, number and/or letter coded to assist the user in relating the station output terminal 112 or terminal wire to the wire 110 connected to the CI 102. In some embodiments, the CI includes connector numbers 1-8 such that the user can connect a wire from, for example, the station output terminal #1 of the irrigation controller 100 to a connector or input terminal #1 of the CI.

In some embodiments, the CI 102 receives operational power 228 from the irrigation controller 100. For example, the universal interface connector 302 can include an "AC in" connector or terminal 312 that couples via one or more wires 126 to a 24 VAC output of the irrigation controller 100. The CI 102 includes the relevant electronics, including AC to DC circuitry, rectifiers, etc. to convert, for example, the 24 VAC signal into power (e.g., 3 VDC) usable by the components of the CI. In some embodiments, the CI additionally or alternatively has its own power source 228, such as a battery power source. The power source may be charged by the power received from the irrigation controller 100, solar and/or other such sources. As shown in FIG. 3, the universal interface connector 302 includes an AC in connector 312, a common line connector 314, one or more station line input terminals 316 (e.g., 8 station line input terminals, each of which can be connected to a station output terminal 112 of the irrigation controller), and optionally one or more sensor ports 318.

In operation, when the irrigation controller 100 wants to turn on a given station, it sends a signal which causes a power valve activation signal (e.g., a 24 VAC signal) to be applied to a given station output terminal 112 (which may be implemented in a terminal strip or in a station module of a modular irrigation controller, or other such station output terminal) and any wire connected thereto. As is well known in the art, the activation signal typically couples by the valve wire 122 to a valve 120, opening the valve. In the event a wire 110 from the given station output terminal 112 is coupled to the CI 102, the activation signal is transferred to the CI (e.g., via wiring 110 coupled to the universal interface connector 202/302) such that the CI senses the presence of the valve activation signal. The control circuitry of the CI then in response to the detected activation signal generates and transmits a wireless control signal or wireless activation signal (using the wireless transceiver 214 and antenna 216) to one or more corresponding VTs 104 associated with the wire 110 upon which the activation signal is detected.

The VT 104 wirelessly receives the wireless activation signal, determines which valve to operate, and applies a DC pulse to an actuator, such as a solenoid (typically a latching solenoid), coupled to the valve and actuate the valve causing the valve 106 to open. When the irrigation controller 100 terminates irrigation (e.g., by removing the activation signal at the station output terminal 112 or sending a stop irrigation command), the CI 102 detects the absence of the power valve activation signal, and stops sending the wireless control signal and/or sends a "stop irrigation" signal to the VT 104. In turn, the VT 104 receives the stop signal and stops sending a valve activation signal and/or generates a DC pulse to the latching solenoid to cause the latching solenoid to close the valve.

In some embodiments, the CI 102 is located in a separate housing that is located outside of the housing of the irrigation controller 100. In other embodiments, the CI may be located within the volume of the irrigation controller 100, assuming there is enough available space and wireless communication is acceptable (e.g., radio reception is acceptable).

As introduced above, in some embodiments, the CI 102 includes a user interface, such as a display screen 220 or other indicators (e.g., LEDs) and user inputs 222. For example, the display screen 220 is a segmented LCD screen capable of displaying text, icons and/or graphics. In one form, the user input 222 takes the form of four push buttons including left and right buttons and "+" and "−" buttons. The LCD display and push buttons of some embodiments are shown in at least the illustrations of FIGS. 1, 2, 4, and 7A-D, for example.

In some embodiments, the CI 102 includes an audible element 224 (e.g., beeper), such as a piezoelectric device, speaker or other such element that emits an audible sound or alarm to alert a user in the vicinity of the CI in certain events. In some embodiments, the audible element 224 is triggered (e.g., an alarm or beeper signal) when the batteries of a VT 104 are near the end of their useful life. In some embodiments, the VT uses a 3 volt DC battery (e.g., 2 AA batteries in series), and the audible element 224 at the CI is triggered when the power at the VT drops below a low power threshold, e.g., 2.25 volts. In some implementations, each VT 104 periodically transmits its battery strength back to the CI 102. Similarly, the audible alert may be activated by the VT 104 in response to instructions or wireless alert command transmitted from the CI 102. For example, the VT 104 can be configured to wirelessly communicate status and/or parameter information about the VT (e.g., battery strength, signal strength, etc.) to the CI. The CI 102 can evaluate the status information, such as comparing to one or more status thresholds. When the status information has a predefined relationship with a threshold (e.g., battery strength is below a threshold), the CI can communicate an alert activation signal that causes the VT to activate the audible element (e.g., for one second at 30 second intervals).

In some embodiments, the audible element 224 is triggered when the radio link between the CI 102 and a given VT 104 has been lost or drops below a given threshold. In one form, the audible element is triggered when the link goes down for a period of more than 48 hours. In some embodiments, the audible element 224 emits a beep that repeats, e.g., one 0.3 second beep every 30 seconds. In some embodiments, the audible element emits the alarm until a button is pressed on the CI or the CI receives data indicating that the battery level of the VT has increased above the low power threshold. In some embodiments, it is intended that the alarm be audible a distance from the CI, e.g., up to 75 feet away from the CI. In one embodiment, the audible element emits a sound having a volume greater than 100 dB at a distance of 10 centimeters.

In some embodiments, the CI 102 includes a non-volatile memory backup to maintain the system identity indefinitely upon line power outages. In some embodiments, this non-volatile memory backup also maintains the unique pairing addresses of each VT 104 paired with the CI upon line power outages or during VT battery replacement or failure.

Although only one VT 104 is illustrated in FIG. 1, it is understood that the CI 102 may pair to and communicate with more than one VT. Such communications can take the form of a star configuration with the CI 102 forming the hub with each VT 104 communicating with the CI. It is understood that other known configurations are possible in other embodiments, for example, a given VT 104 may act as a repeater forwarding signaling to and from another VT.

FIG. 3 provides an example detailed circuit diagram of an exemplary CI 102, all individual components generally known in the art and having the functionality described herein programmed into the various components as is known in the art.

FIG. 4 shows a perspective view of a CI 102 in accordance with some embodiments. In some embodiments, the CI 102 includes a housing 412, user interface with a display 220 and one or more buttons 222, and one or more wire input apertures, connectors or ports 416. Some embodiments may further include a lid or cover (not shown) hinged with the housing 412 to allow the cover to open providing access to the display 220 and buttons 222, and close to provide at least some protection from environmental conditions and elements. In some embodiments, the buttons 222 may include four (4) buttons (e.g., plus ("+") and minus ("−") buttons, and left and right buttons). More or fewer buttons can be included and/or different buttons can be included. Similarly, other user interaction devices can be used (e.g., touch screen, scroll wheel, etc.). In some embodiments, the CI 102 also includes an audible element 224 (e.g., beeper), such as a piezo-electric device, speaker or other such element. The audible element emits a sound audible to a user to alert the user to a condition and/or problem with the CI and/or VT (e.g., signal strength, power level of the CI or a VT, threshold exceeded, irrigation interrupted, or other such conditions).

The CI 102 receives valve activation signals from the irrigation controller 100, determines which one or more valves 106 are associated with each valve activation signal and the corresponding one or more VTs 104 that control the one or more valves wirelessly, and wirelessly communicates wireless activation signals to the corresponding one or more VTs 104 to activate the relevant valves 106 wirelessly. In some embodiments, the CI 102 is configured to provide two-way communications with the VTs. As such, the CI can receive acknowledgements, VT status and/or parameter information, sensor data and/or other communications (e.g., battery levels, signal level, etc.).

The housing 412 of the CI 102 can be made of substantially any relevant material, such as but not limited to plastic, PVC, metal, or other relevant material or combinations of such materials. Further, the housing is typically water proof and protects the electronics of the CI 102 from the environment. In irrigation arts, it is common to pot the cavity of a housing with a fluid material that fills some or all of the volume of the housing and hardens to form a water proof barrier to the elements. Accordingly, in some implementations, some of the cavity within the housing 412 is potted. However, input terminals are not potted allowing connection with the irrigation controller 100, and in some instances, other devices such as power source, sensor or other such devices are not potted. Similarly, a volume within the housing 412 and in the vicinity of the audible element 224 may not be potted allowing the sound to escape. Further, some implementations include one or more mounting brackets or other such mounting structures to mount the CI 102. The mounting bracket allows the CI 102 to be mounted proximate the irrigation controller 100 or within the irrigation controller when space is available and the wireless signal is sufficient to communicate with intended VTs 104.

In some embodiments, the display screen 220 can display relevant operational and/or status information, such as but not limited to signal strength, battery level, VT and/or valve identifiers, direction information, status information, alarm conditions, valve designation information, programming correlating station activation signals with valves 106 and corresponding VTs 104, and other such relevant information as described below. Additionally or alternatively, in some embodiments, the CI 102 may include one or more LEDs or other indicators to provide the user with information, such as status information, activation information, signal strength, state of operation or other such information or combinations of such information.

In some embodiments, wires extend from the input port 416 of the CI 102 and connect with the input terminals 430 of the interface connector 202/204 or other connector (for example, see FIGS. 2 and 7D). In some embodiments, the input terminals are accessible behind a door or cover 432 that secures with the housing 412. The wiring can be passed through the wire input port 416 and connected to the relevant input terminal 430 of the interface connector 202/204. In some embodiments, the wires are color coded to allow easy identification of the input terminal and, when relevant, the corresponding output terminal of the irrigation controller 100.

Connection to Wireless Sensor

Referring to FIG. 1, in some embodiments, the CI 102 can also communicate with one or more sensors 108. For example, in some embodiments, the CI 102 can wirelessly receive accumulated rainfall and/or temperature data from one or more wireless sensors 108 (e.g., wireless rain sensor device), such as the device/s described in U.S. Pat. No. 7,949, 433 to Hem et al. and assigned to Rain Bird Corporation (the '433 patent), which is incorporated herein by reference. Such known commercial devices include the WR2 wireless rain sensor commercially available from the Rain Bird Corporation of Azusa, Calif. In such embodiments, the CI 102 also includes one or more functions of the interface unit 14 of the '433 patent. For example, CI 102 allows the user to set and adjust one or both of a rainfall accumulation cutoff threshold and a temperature cutoff threshold (e.g., using the display 220 (or other indicator, e.g., LEDs) and push buttons 222). The control circuitry (e.g., processor 212 and/or microcontroller) of the CI 102 can also use one or both of the received accumulated rainfall and temperature data from the sensor 108 and one or both of the rainfall accumulation cutoff threshold and a temperature cutoff threshold to determine whether irrigation by the irrigation controller 100 should be interrupted. Such example methods are described in the '433 patent.

In one embodiment, if irrigation is to be interrupted, the CI 102 does not send any wireless signaling to VTs 104 in response to receiving activation signals from the irrigation controller 100. Additionally, in some embodiments, one or more wires 130 extending from the CI 102 (e.g., at the universal interface connector 302) can be connected to the irrigation controller 100 at a common line connection point 132 of the irrigation controller or are otherwise connected in series with the common line 132. The CI 102 opens a switch (like the switch 20 of the interface unit 14 of the '433 patent), which breaks the common line and interrupts any irrigation by the irrigation controller 100. In many cases, the irrigation controller is not aware that it is being interrupted. In other embodiments, the CI 102 may communicate an irrigation interrupt signal back to the control panel of the irrigation controller to notify the irrigation controller of the interrupt. In yet other embodiments, the interrupt signal may be supplied to the control panel of the irrigation controller instead of the CI interrupting a common line 132 or other such interruption, and the control panel implements relevant interruption of irrigation to wired valves 120. It is understood that the wireless rain sensor 108 may alternatively be a wireless soil moisture sensor or other wireless sensor.

Valve Transceivers

As described above and further below, the VTs 104 are paired with and communicate with a given CI 102. FIG. 2 illustrates the functional components of a VT 104 according to some embodiments. As shown, a VT includes one or more processors, microprocessors and/or controllers 232, wireless transceivers 234, an antenna 236, a power supply 238, an audible element 244 (e.g., beeper, speaker, etc.), one or more drive circuits 246 (e.g., solenoid drivers), solenoid connectors 248, and in some instances a user interface, which can include a display (e.g., liquid crystal display LCD) and/or indicators 240 (e.g., LEDs, or the like) and a keypad 242 (or one or more buttons or other user inputs).

The wireless transceiver 234 and antenna 236 communicate using the same protocol as the wireless transceiver 214 and antenna 216 of the CI 102. It is understood that the processor 232 executes program instructions (such as firmware or software, for example) stored in memory 250, which can be part of the processor 232, coupled with the processor and/or external to the VT 104, to control the components of the VT 104 and cause it to function as intended. Again, the memory can be but not limited to volatile and/or nonvolatile media, such as RAM, ROM, EEPROM, flash memory and/or other memory technology. Further, the memory can be internal to the VT 104; however, the memory can be internal, external or a combination of internal and external memory.

FIG. 5 illustrates another functional block diagram of the VT 104 including components to activate and deactivate a solenoid controlled valve 106 according to some embodiments. The VT 104 includes the wireless transceiver 234, antenna 236, one or more valve or solenoid drivers 246 and a microcontroller 514. The microcontroller 514 may include one or more processors 232 of FIG. 2 for example, and/or be implemented through the one or more processors 232. The microcontroller executes a control logic function 516, and in some embodiments also includes one or more counters 518 and one or more timers 520 features. In other embodiments, the counter 518 and/or timer may be separate from the microcontroller 514. The one or more valve driver circuits 246 are configured to send an activation signal to, for example, one or more DC latching solenoids 512 or relays that are commonly used for operating irrigation valves.

Typically, the wireless transceivers 214 and 234 of the CI 102 and VT 104, respectively, are each configured to be capable of two-way communications, but a primary purpose of the transceiver 234 of the VT 104 is to receive the wireless activation signal (indicating to "turn on" or "turn off" the valve) from the CI 102. The wireless transceiver circuit also functions to demodulate the wireless signal, and decode the bits into a data packet of bytes. The packet is sent to the microcontroller 514 to be analyzed by the control logic 516. In some embodiments, the control logic 516 checks the address and verifies that the data packet was sent to this particular VT 104, and determines what function is requested by the control bytes. In other embodiments, the received communication may be a broadcast communication such that the control logic 516 identifies portions of the broadcast relevant to the VT 104 and to determine whether the VT is to take any action (e.g., detect a valve is to be activated or shut off, a counter is to be reset, or other such action).

In some embodiments, the microcontroller 514 of the VT 104 includes the counter 518 that is decremented by the timer 520 to establish a pre-determined time that the activated valve is allowed to be open. When the counter 518 reaches zero, it is no longer decremented. The counter 518 relates to the valve operation of the microcontroller 514 with the valve assumed to be on when the counter is non-zero, and assumed to be off when it is at zero. When a wireless activation signal (e.g., 'valve on' command) is received at the control logic 516 of the VT, the counter is set to a time interval (e.g., 10 minutes). If the counter 518 is at zero when the wireless activation signal is received, a signal is sent to the valve solenoid 512 via the valve driver 246 to turn on a corresponding valve 106. The valve will continue to remain on until the timer 520 decrements the count in the counter 518 to zero, at which time a signal is sent to the valve solenoid 512 to turn the valve off. However, if a 'valve on' command is received and the counter 518 is not at zero, it is assumed that the valve is already on and no signal is sent to the valve solenoid. In this case, regardless of the count, the counter 518 is set back to the predetermined time interval (e.g., 10 minutes). If a 'valve off' command is received at the VT 104, a signal is sent to the valve solenoid 512 to turn the valve off, and the counter 518 is set to zero. The counter value is always decrementing when irrigation is on, and thus; it does not store and hold any particular value or data. Similarly, in some embodiments, the control logic 516 does not store the state indicated by the wirelessly received wireless activation signal. For example, the control logic 516 simply triggers the counter 518 and inspects the value of the counter (which is either at zero or constantly decrementing)

to determine whether the valve is on or should be turned off. By using the counter 518 and timer 520 with the control logic 516 automatically turning off the valve if the counter decrements to zero, a fail-safe is provided to automatically turn off irrigation if there is a loss of communication from the CI to the VT. This fails safe will prevent overwatering or flooding.

Additionally, in some embodiments there are other signals that may be transmitted between the CI 102 and VT 104. For example, the CI periodically sends messages expecting an acknowledgment to confirm the wireless link. Similarly, in some implementations, the VT 104 can communicate status and/or parameter information (e.g., battery level, signal level, count valve, timer information, and other such status information) or other such information to the CI 102. In some embodiments, the VTs 104 are located within a valve box and coupled to one or more solenoid controlled valves 106. In one embodiment, VTs 104 have either 1, 2 or 4 station configurations, i.e., 1, 2 or 4 solenoid outputs. In some embodiments, the VTs have their own power supply (see FIG. 9, for example), e.g., battery power, solar panel, and the like, or combinations thereof. In some embodiments, the VTs output a DC pulse causing the latching solenoid 512 to open a valve and a DC pulse causing the latching solenoid to close the valve. In some embodiments, the battery power supply includes two sets of 2 AA batteries (the batteries of each set coupled in series), one used as a 3 volt DC power source and the other used as a backup 3 VDC power supply. When the voltage level of the first set of AA batteries gets low, the second set of AA batteries is used. A battery selection circuit monitors the energy level of the batteries and selects the appropriate set to use. When the battery level of the second set passes below a low power threshold, the VT 104 may, in some embodiments, activate an audible alarm. Further, in some implementations, the VT may send signaling to the CI 102, which allows the CI to evaluate the status of the VI and to trigger an audible alarm at the VT and/or the CI.

In some embodiments, the VT uses one or more capacitors to provide the DC pulse to open/close the valve in order to maximize battery life to limit peak current draw from the battery. A charger circuit under control by the processor/microcontroller 514 uses the battery power source to charge the capacitor/s and ensure that they remain at a charged level. It is unknown when the capacitor will be needed, so in some embodiments, the capacitor is maintained at an acceptable voltage level. For example, the charging circuit begins charging the capacitor when its voltage level drops below start threshold and stops when the voltage reaches a stop threshold. In one form, ultra-capacitors are used.

Figure 6B:
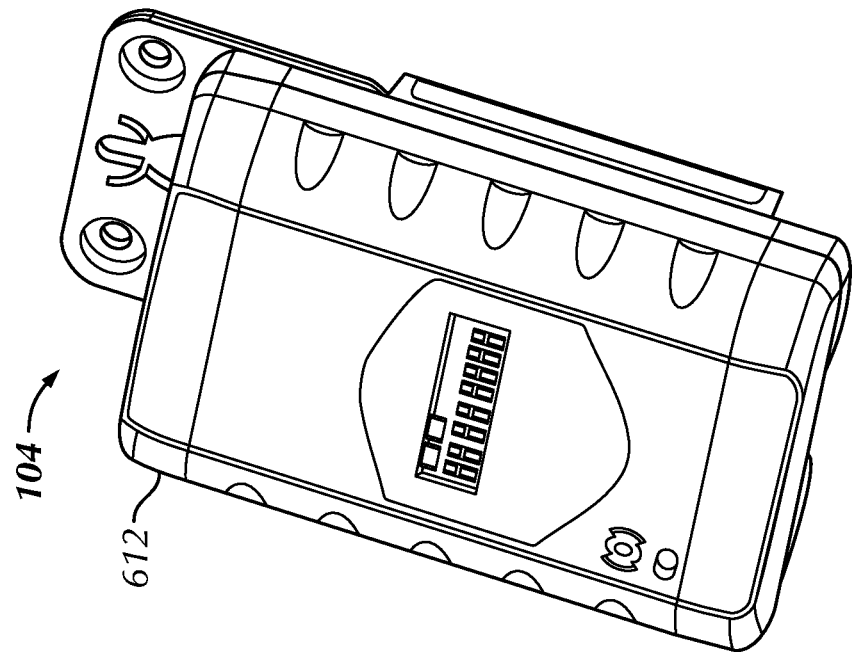
FIGS. 6A-6B show plane and perspective views, respectively, of a valve transceiver in accordance with some embodiments.
Figure 6A:
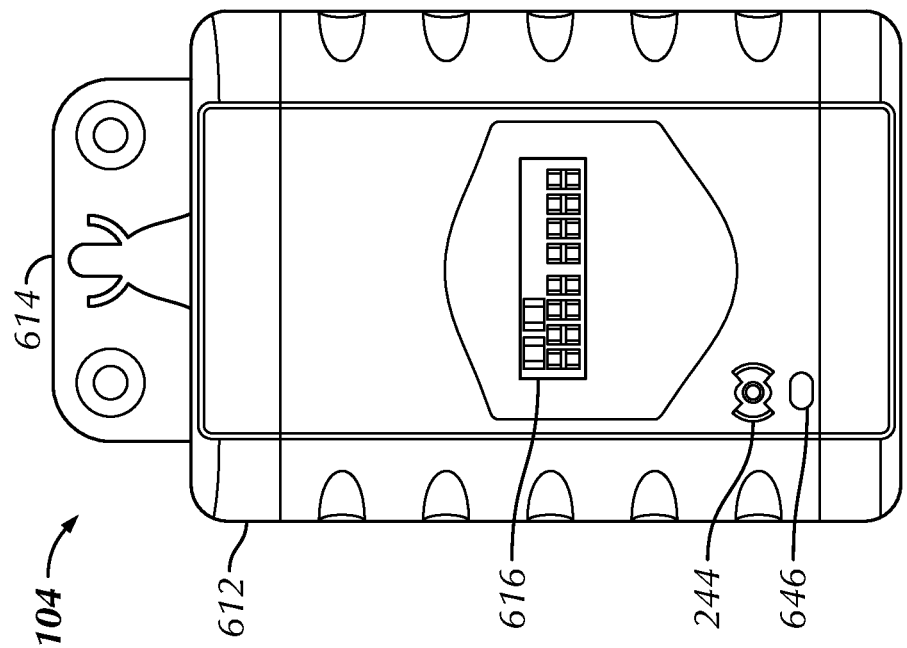
Figure 6D:
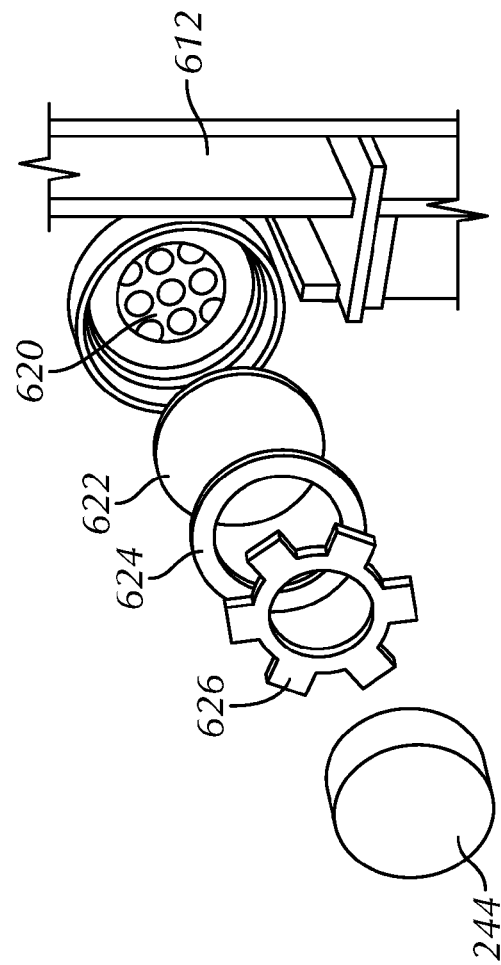
FIG. 6D shows an exploded view of an audible element of a valve transceiver in accordance with some embodiments.
Figure 6C:
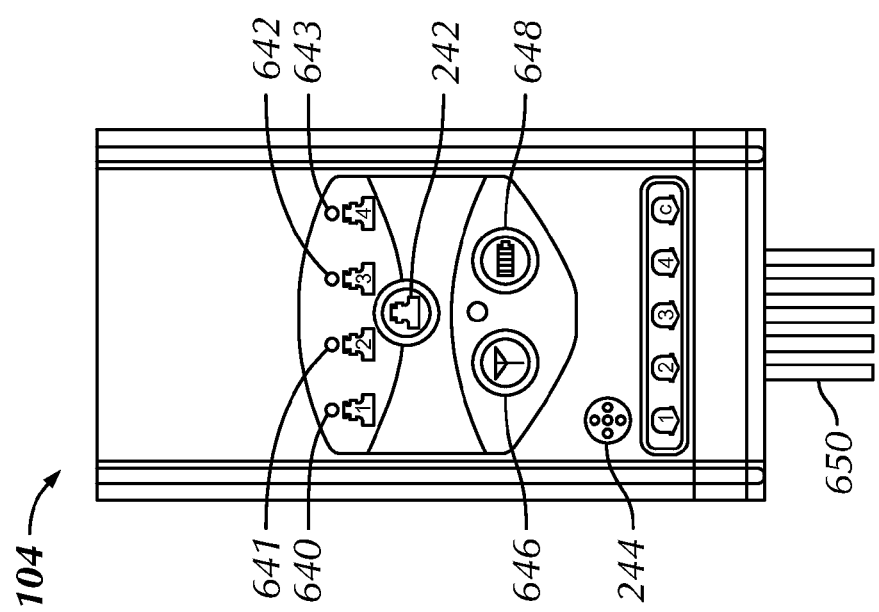
FIG. 6C shows a plane view of a valve transceiver in accordance with some embodiments.
Figure 6E:
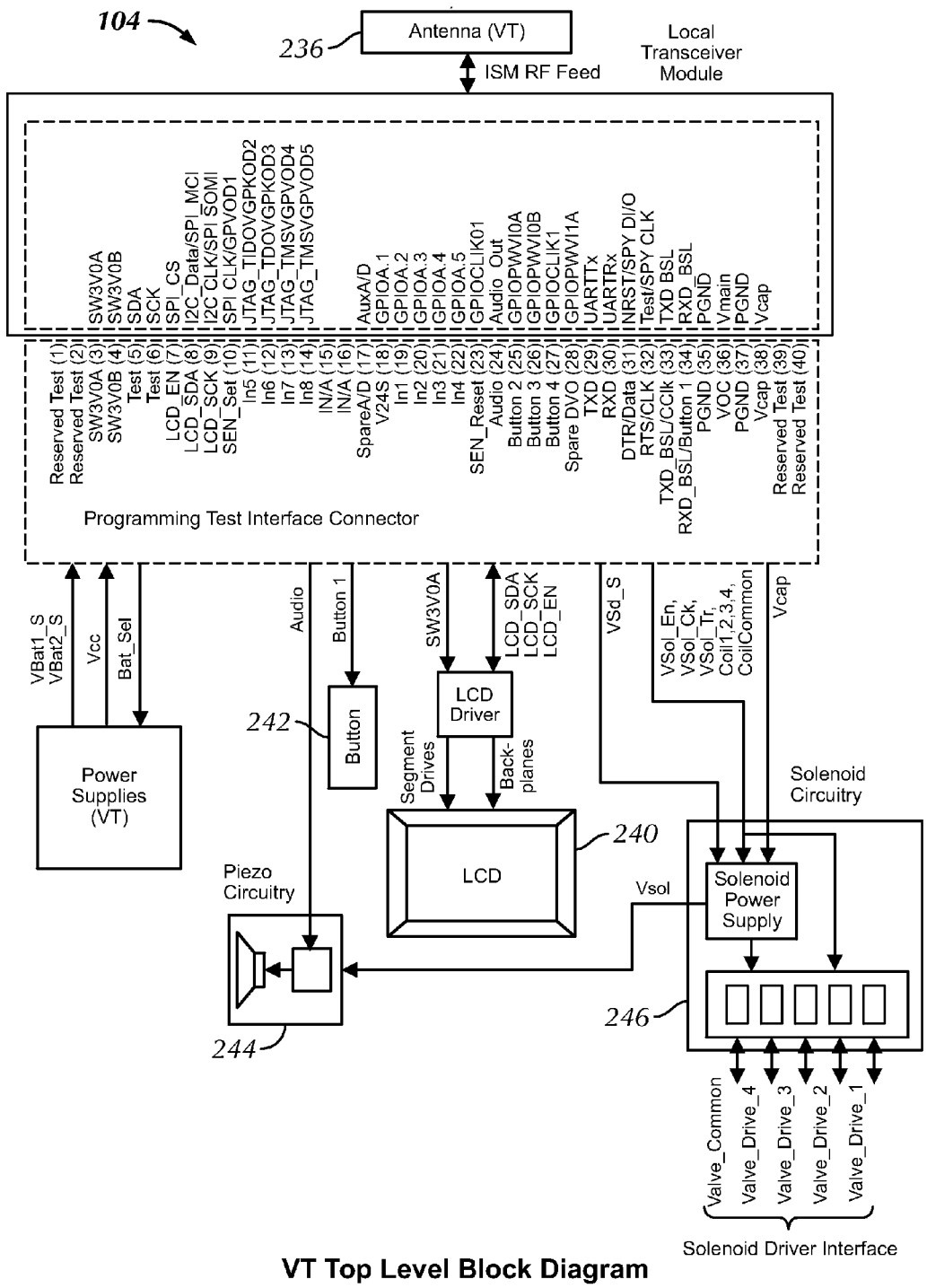
FIG. 6E provides circuit diagram of an exemplary embodiment of a valve transceiver.

FIGS. 6A-B show plane and perspective views, respectively, of a VT 104 in accordance with some embodiments. FIG. 6C shows plane view of a VT 104 in accordance with some embodiments. FIG. 6D shows an exploded view of an audible element 244 of a VT 104 in accordance with some embodiments. FIG. 6E provides a detailed circuit diagram of an exemplary VT 104, all components generally known in the art and having the functionality described herein programmed into the various components as is known in the art. Referring to FIGS. 6A-E, generally, the VT 104 is contained within a housing 612, e.g., made of plastic, PVC, metal, or other relevant water resistant material or combinations of such materials, and in some instances includes a mounting bracket 614 or other structure for mounting the VT within a valve box, other enclosure or other structure in a location and orientation to ensure sufficient, and preferably optimum antenna and radio performance. In some embodiments, the mounting bracket mounts to a post, fence or other such structure and/or allows installation to valves 106 installed above or below ground. The mounting bracket and VT 104 typically present a small product profile so as to minimize obstruction and easy access to the valves in the valve box.

In some embodiments, as described above, the VT 104 also includes an audible element 244 (e.g., beeper). In one form, the audible element is a piezo-electric device. The audible element emits a sound audible to a user in the vicinity of the VT 104. For example, referring to FIG. 6D, in some embodiments the audible element 244 is positioned relative to an aperture or grid 620 formed in the housing 612 to allow the sound to escape. A water or moisture resistant membrane 622, such as a Gor-tex™ membrane or other such water resistant membrane, can be positioned relative to the aperture or grid 620 and used to prevent water intrusion. In some implementations, a seal or o-ring 624 is used to seal the membrane 622 relative to the housing 612, and the o-ring 624 or other seal can be secured with a retaining clip 626 or other structure.

In one embodiment, the audible element 244 is intended to be used as an aid in locating the VT 104. The audible element can be activated based on a command from the CI 102, such as in response to the CI determining the VT has a battery power level below a threshold level, a signal strength below a predefined level or other such status information having predefined relationships with one or more thresholds or other factors. In one embodiment, the audible element 244 emits 0.2 second beeps once every 7 seconds for 20 minutes. In some implementations, the beep process repeats every hour or other periodic or random time period. In one embodiment, the volume of the beeper shall be greater than 100 dB at a distance of 10 centimeters. The audible element helps to locate the VT 104 which can be difficult to find in an irrigation area that may contain many valve boxes with many VTs that are not visible (they are typically within valve boxes). This will assist the user in locating a VT 104 that requires new batteries, for example.

In some embodiments, the VT 104 is to be located within a valve box that may occasionally be flooded. Thus, the VT 104 is designed in at least some embodiments to be water proof to protect the electronics. Again, it is common in the irrigation arts to pot the cavity or part of a cavity of a housing with a fluid material that fills the volume of the housing and hardens to forms a water proof barrier to the elements. In some embodiments, the entire volume of the housing is not fully potted. For example, a piezoelectric audible element 244 may need a volume of air in order to produce a sound. Thus, the volume within the housing and in the vicinity of the audible element 244 is not potted. Further, the housing 612 can include one or more apertures and/or grids 620 to allow the sound to escape. Additionally, the space for the batteries and battery door is not to be potted. Instead, a seal is created at the door to protect the batteries from water intrusion.

In some embodiments, the VT 104 includes a display screen 616, e.g., an LCD screen. In some embodiments, the screen 616 displays signal strength, battery level, and the station number assigned for each valve associated with and controlled by the VT 104 (see FIG. 12 which includes the signal strength indicator 1212 and battery strength indicator 1214, and the station numbers 1216 for the four (4) valves 106 it is controlling). Icons similar to those on the CI 102 can be used for signal strength and battery level (e.g., see FIGS. 11E and 11J-11K). In some embodiments, the display screen 616 is located on the VT 104 so that the display screen 616 can be viewed while the VT is inside the valve box (depending on the mounting bracket and location). In some embodiments, the display screen 616 is clear enough to be viewable in direct sunlight, and readily readable from a distance of 1 meter.

In some embodiments, the VT 104 additionally or alternatively includes LEDs or other indicators, for example, one, two or four LEDs 640-643 (see FIGS. 6C-D) corresponding to the number of valves 106 capable of being controlled by the VT. The illumination of one or more of the LEDs 640-643 can provide information relative to the valves being controlled, state of operation (e.g., in a pairing procedure and/or pairing achieved, alarm state, communication state, or other such state), battery power levels, signal strength and/or other relevant information. For example, an LED corresponding to a valve can be illuminated (e.g., green) when the valve is open. A series of flashes of the LEDs and/or specific color illumination can indicate, for example a signal strength. Similarly, a different sequence of flashing and/or color can indicate a battery power level.

In some embodiments, the VT 104 includes one or more user inputs 242, such a one or more push buttons. For example, the one button is located in an ergonomic location near the display screen or LEDs (see for example FIGS. 6A-C and 9) that allows a user or contractor to navigate a menu of options, activation pairing, activate commands and/or activate the illumination of the LEDs 640-643 to obtain status and/or parameter information from the VT, such as but not limited to signal strength, battery strength, manual valve test mode and/or other such information or commands. Other buttons may be included such as an antenna or communication button 646 that establishes or reestablishes communication between the VT and a CI 102, and/or activates the VT to pair with a CI 102. Further, some embodiments include a battery button 648 that, for example, can cause the VT 104 to indicate a battery strength (e.g., by illuminating one or more LEDs 640-643, flashing one or more LEDs a number of times to correspond to battery strength, or the like). In some instances, the pressing of the battery button 648 following the replacement of batteries confirms the battery strength and activates the VT to automatically reacquire communication with the CI 102.

Other buttons may be included such as an antenna or communication button 646 that establishes or reestablishes communication between the VT and a CI 102, and/or activates a pairing In some embodiments, the VT 104 includes wires 650 for connection to the valve latching solenoids 512 which are long enough to allow the user or contractor to easily remove the VT 104 from the valve box, e.g., a length of about 24 inches. In some embodiments, the wires 650 are color coded to allow easy identification of which valve is connected to the VT 104. Unique colored wires may correspond to that valve number and/or the illumination of a corresponding LED. In one embodiment, contractors should be able to splice wires to accommodate control of valves in other valve boxes in close proximity to the valve box containing the VT, e.g., the VT supports spliced wires of up to a minimum of 20 feet.

In some embodiments, the CI 102 and the VT 104 wirelessly communicate effectively to turn on and shut off irrigation at a distance of 1500 feet (line of sight) with 99.5% valve operation reliability when valves are buried to an average depth of 1 foot below grade. In one example, Line of Sight is defined as the top of the VT 104 being installed a maximum of 1 inch below the valve box lid. Line of sight (LOS) impediments (fences, buildings, flooded valve box) may diminish this LOS range.

In some embodiments, a VT 104 includes a sensor input to receive sensor signals or measurements in known formats. These sensor signals may be processed by the VT 104 and then communicated back to the CI 102. In one form, sensors include one or more of soil moisture, soil salinity, temperature, water pressure, flow sensors, for example.

Pairing Valve Transceivers (VT) and the Controller Interface (CI)

Typically, the CI 102 and the one or more VTs 104 controlled by the CI are paired to establish a communication connection. The pairing is achieved through the recognition at the CI of the VTs and at the VTs of the CI.

The following describes an exemplary method of pairing a CI 102 with a VT 104. In some embodiments, the process is initiated at the CI 102. For example, the user pushes and holds both left and right arrow buttons on the CI simultaneously for 3 seconds (or until, for example, the battery and signal strength icons flash on the LCD) to put the CI 102 in pairing mode. In some implementations, the CI remains in the pairing mode for a predefined period of time (e.g., 20 minutes, 40 minutes or other duration) or until pairing is achieved. The VT 104 is also placed in pairing mode, e.g., by incorporating batteries, by pressing and holding the one button 242 on the VT, such as for at least a predefined period of time, detection at the VT of a pairing request from the CI or other such action.

During pairing, the CI transmits pairing signaling or request to any VT in range. In response to receiving the pairing signaling, the receiving VT generates a pairing response. In some instances, the VT evaluates the pairing request before responding. For example, the VT may confirm that a signal strength is above a predefined strength threshold, may confirm that the VT is authorized to communicate with the CI or other such evaluation before responding to the pairing request. When the CI 102 and VT 104 pair, they exchange identifiers (ID) (e.g., serial numbers, user defined IDs, or the like), and in some implementations perform an authentication process to verify that they are authorized to pair (e.g., confirm they are from an authorized manufacturer). For example, the CI and VT each contain a unique 32-bit serial number in its non-volatile memory that is set at the factory during manufacture. One purpose of the serial number is to be able to uniquely 'pair' one or more CI and VT, e.g., both devices process the serial number, or run an algorithm using the number to verify the other device.

During pairing, in some embodiments, the CI 102 and/or VT 104 can indicate to a user that a pairing process is being performed. For example, a battery strength icon and a signal strength icon of the display screen 220 of the CI 102 may flash. Similarly, one or more LEDs 640-643 may flash, flash in a predefined sequence, be illuminated in one or more colors, or other such indication (e.g., the LEDs may be sequentially illuminated, such as for 0.5 seconds, during the pairing). Further, once pairing is achieved the battery strength and signal strength icons of the display screen 220 of the CI may stop flashing and display a correct indication for a battery strength or level at the VT and the signal strength of the signal received at the CI from the VT or a signal strength reported from the remote VT. The VT 104 may also indicate that pairing is achieved, such as all the LEDs 640-643 being simultaneously illuminated and/or flashed through a predefined sequence.

In response to the pairing request and/or as part of the pairing, the VT supplies an identifier (e.g., serial number) of the VT. The serial number may identify the number of valves 106 that can be controlled by the VT. Additionally or alternatively, the VT may specify in a communication the number of valves 106 that can be controlled and/or that are currently connected to a valve. The CI 102 shall recognize the number of potential stations/valves associated with the VT (1, 2 or 4, for example). The appropriate number of valve station designators 1112-1115 also appear on the display screen 220 of the CI 102 (e.g., see FIGS. 11A, 11C and 11F-G that have four station designations into which can be specified valve stations of the irrigation controller 100 that are to correspond to the valves 106 controlled by the VT). In some embodiments, the pairing process terminates when the time associated with a pairing window (e.g., 20 minutes) on the CI times out before either a VT or wireless rain sensor (see below) is successfully paired. In this case, the pairing process needs to be reinitiated. In one form, the contractor saves the programming details of a particular VT 104 by pressing one or more buttons 222 (e.g., the '>' (right) and '+' arrow key simultaneously) on the CI 102. For the VT 104, if the pairing window terminates without pairing with a CI, the unit shall go back into a low-power sleep mode.

Figure 25:
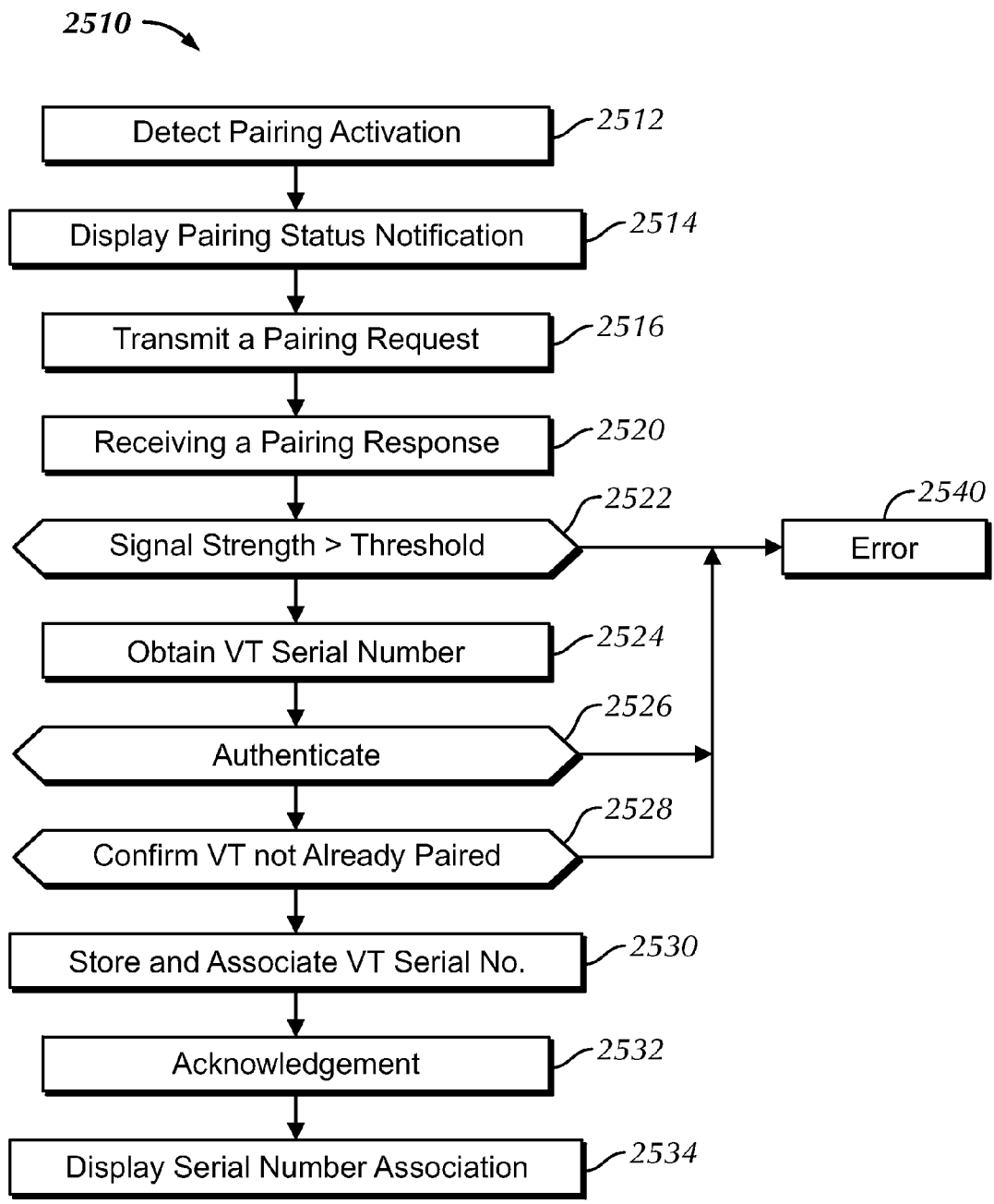
FIG. 25 depicts a simplified flow diagram of a process performed by the controller interface in pairing with a valve transceiver, in accordance with some embodiments.

FIG. 25 depicts a simplified flow diagram of a process 2510 performed by the CI 102 in pairing with a VT 104, in accordance with some embodiments. In step 2512, the CI detects a pairing activation. For example, the user may press a pairing button, press a sequence of buttons or take other action to activate the pairing mode of the CI (e.g., user pushes and holds both left and right arrow buttons on the CI simultaneously for 3 seconds). In step 2514, the CI indicates that the CI is in a pairing mode and/or indicates a pairing status (e.g., displaying on the display screen 220 that pairing is in progress by flashing a power supply icon and a signal strength icon). In step 2516, the CI 102 transmits a pairing request to any VT 104 within wireless range of the CI. In step 2520, the CI receives one or more responses to the pairing request from one or more VTs.

In some embodiments, the CI performs optional step 2522, where a signal strength of the pairing response is evaluated to determine whether the signal strength is above a predefined threshold, which typically ensures satisfactory communication between the CI and a VT. When the signal strength is below the threshold the CI can notify the user through an error indication in step 2540. The error indication can be presented by displaying a low signal strength icon, flashing just the low signal strength icon, generating an audible alert, or other such indication or combination of such indications.

In step 2524, the CI 102 obtains an identifier (ID) of the responding VT. As described above, in many instances the VT provides a serial number, which may be defined at the manufacturer. In step 2526, the CI 102 authenticates the responding VT 104. For example, the authentication can be based on the received serial number. In other embodiments, other authentication information may be provided in the response to the pairing request, one or more additional communications between the CI and the VT can be used to obtain further authentication information and/or to further authenticate the VT (e.g., keys, passwords, encoding scheme, etc.). When the authentication fails the process can generate an error in step 2540 and notify the user of the potential error (e.g., by flashing the received VT serial number, displaying an authentication error indication, displaying the VT serial number in red, or other such indication).

In optional step 2528, the CI may further confirm that the VT is not already paired with the CI or another CI. In some instances, when the VT is already paired the CI may notify the VT that it is already paired. Additionally or alternatively, an error can be generated when the VT is already paired. In step 2530, the CI 102 stores the VT serial number, determines a number of valves 106 capable of being supported and/or currently supported by the VT 104 and stores the relevant information. In step 2532, the CI 102 may optionally wirelessly transmit an acknowledgment to the VT confirming the completion of the pairing. In step 2524, the CI notifies the user of the successful pairing between the CI and the VT. For example, the CI 102 may display on the display screen 220 the VT serial number, the corresponding signal strength icon, the battery strength icon, and/or the potential valve designations 1112-1115. In some embodiments, the CI 102 may further provide communication protocol information and/or other such information allowing the VT to accurately receive and interpret communications and/or commands from the CI. For example, the CI 102 may wirelessly transmit broadcast information about the current status of valves. Accordingly, the CI may provide the VT upon pairing with information about identifying those bits and/or bytes of the broadcast associated with the VT and/or which bits or bytes correspond to the valves 106 controlled by the VT 104.

The VT 104 similarly stores the CI identifier (e.g., serial number) with which the VT pairs. Again, the VT may indicate to the user that the pairing has been accomplished, such as by stopping the flashing of the LEDs 220, illuminating the LEDs in certain color or colors, stopping the flashing of a battery strength icon and/or a signal strength icon on a display of the VT, and/or other such indications. Further, the VT 104 may authenticate the CI 102 prior to completing the pairing process and can provide relevant information to the CI, such as status information and/or a number of valves capable of being controlled by the VT and/or currently coupled with the VT.

In some embodiments, the VT 104 performs similar processing to pair with the CI 102. For example, the VT may detect a pairing activation. For example, the user may press a pairing button, press and hold the single button 242 for a predefined period of time, at VT powered up (e.g., through the insertion of batteries), detect a pairing request from a CI 102, or the like. When attempting to pair with a CI, the VT 104 typically indicates that the VT is in a pairing mode and/or indicates a pairing status (e.g., flashing one or more LEDs in a predefined pattern). Again, the VT 104 may wirelessly transmit a pairing request (e.g., broadcast a pairing request message) and/or may detect a wireless pairing request from a CI.

Upon receiving a pairing request, the VT 104 can extract relevant information from the pairing request and/or extract relevant information from subsequent communications from the CI 102. Typically, the VT 104 authenticates the CI 102 prior to completing the pairing. For example, the authentication can be based on the received serial number, exchange of keys, encoding scheme, or other such authentication. When the authentication fails the VT 104 may provide some notification or error alert (e.g., by flashing one or more LEDs and/or generating an audible alert).

In response to a pairing request or upon receiving a response from a CI to a pairing request sent by the VT, the VT 104 transmits a response to the pairing request, which in some embodiments can include the serial number or other identifier of the VT and/or other information, such as a number of valves 106 that the VT can support, a battery strength or level at the VT, signal strength detected at the VT and/or other information. In some implementations, the VT receives a confirmation from the CI confirming the pairing, and/or the VT determines the pairing is achieved (e.g., by not receiving a notification of failed pairing, or other such confirmation). Upon establishing the pairing with a CI 102, the VT 104 records the CI identifier and other relevant information, such as encoding parameters, keys or other such information. In some embodiments, the VT 104 notifies the user of successful pairing. For example, the flashing of the LEDs can be stopped, the LEDs can be illuminated in a predefined pattern, an audible alert can be generated and/or other such indications. Additionally or alternatively, the VT can indicate a signal strength between the VT and the CI as measured at the VT. In some embodiments, one or more blinking LEDs 640-643 on the VT indicate signal strength for a period of time after pairing is achieved (e.g., 20 minutes), where greater number of flashes present greater signal strength (e.g., a single flash indicates a reliable signal strength, and a series of four flashes indicates the strongest signal). The LED would not blink with the signal strength is insufficient indicating that the VT should be moved.

To pair the CI 102 with a wireless sensor 108 (e.g., a wireless rain and/or temperature 108, soil moisture sensor, etc.), in one embodiment, the battery is installed in the sensor 108 (or the sensor is otherwise powered on). In some embodiments, the pairing begins at power up, in response to user activation of a pairing mode and/or in response to receiving a pairing request from an authorized CI 102. The sensor 108 may flash one or more LEDs of the sensor to indicate the status. If the CI 102 is in pairing mode, a repeating series of flashes of the LED (e.g., one to four LED flashes) on the sensor can be used to indicate the signal strength. During installation mode the LED flashes signal strength updates every 3 seconds. In some embodiments, the pairing of the CI 102 with the sensor 108 can be similar to the pairing with the sensor described in U.S. Pat. No. 7,949,433 to Hem et al., and U.S. patent application Ser. No. 13/277,224, filed Oct. 20, 2011, to Redmond et al., each of which is incorporated herein by reference in its entirety.

Installation Mode

In some embodiments, after exiting the pairing mode, the VT 104 or wireless sensor 108 shall transition to the installation mode. In one embodiment, installation mode window is a predefined period of time (e.g., 20 minutes or other duration). During installation mode, the VT 104 and CI 102 each shall indicate signal strength.

In some embodiments, the installation mode is defined as a period of time for which each device remains in a 'setup' mode for configuration. During this period, tasks such as assigning valve numbers, using an electronic site map, entering set points or thresholds (e.g., rainfall/temperature cutoff thresholds) for the wireless sensor 108, etc. can be accomplished. In one implementation, for the wireless sensor 108 and the VT 104, the installation window is 20 minutes or until the CI set-up and/or programming sequence is completed. After the configuration is completed or the time-out period is over, the CI 102 places the VT 104 or wireless rain/temperature sensor 108 in normal operation mode. In one embodiment, while in the installation mode, the VT or wireless rain and/or temperature sensor 108 updates the signal strength every 3 seconds so that the user could walk to the installation location and visually confirm the quality level of the RF signal.

The CI 102 is also mapped or programmed with VT programming to associate VTs 104 with valves 106 controlled by the VTs, as well as associating valves 106 to station activation signals and/or station identifiers issued by the irrigation controller. In some implementations, this VT programming or mapping is performed at the CI 102 through the user interface of the CI while in the "set-up" mode. This VT programming is performed in addition to and separate from the irrigation programming and/or scheduling defined through the user interface of the irrigation controller 100. Accordingly, the user defines the irrigation programming through the irrigation controller 100, and separately defines the VT programming through the CI 102. In some embodiments, the user can activate a programming mode in the CI 102 to define the VT programming (e.g., by pressing and holding a combination of buttons). As described above, the CI 102 can be implemented through various configurations. Accordingly, in some embodiments, the VT programming of the CI 102 is dependent on and may vary based on the configuration.

Figure 26:
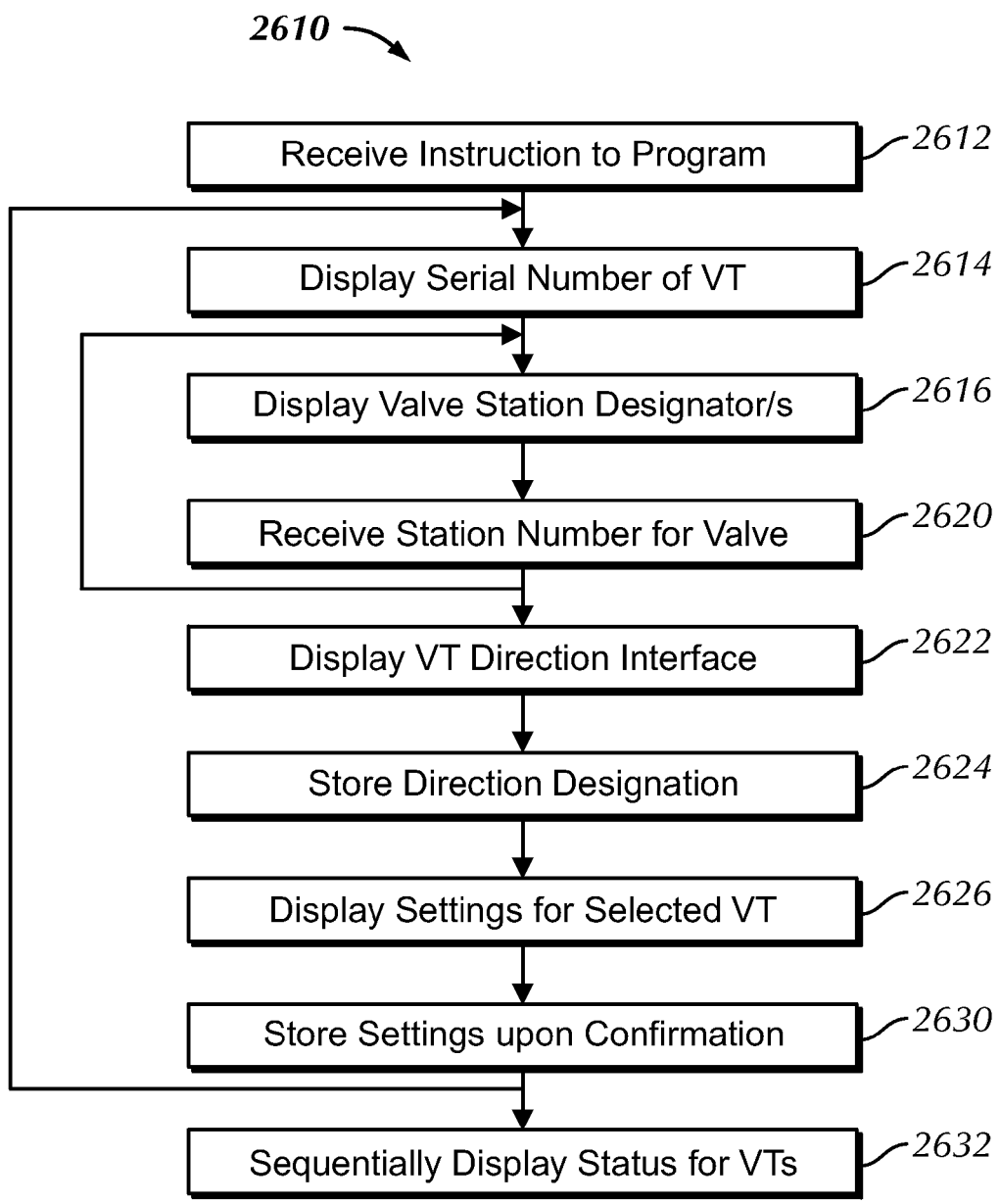
FIG. 26 shows a simplified flow diagram of a process of defining valve transceiver programming at a controller interface configured in a modular and/or all-wireless configurations, in accordance with some embodiments.

FIG. 26 shows a flow diagram of a process 2610 of defining the VT programming at a CI 102 configured in a modular or irrigation controller specific configuration (e.g., see FIG. 16) and/or an all-wireless configuration (e.g., see FIGS. 16-17), in accordance with some embodiments. This programming is performed by the user at the CI 102. Accordingly, the irrigation programming at the irrigation controller 100 is performed separate from the VT programming, and is unaffected and the user does not have to make any changes at the irrigation controller to implement the wireless control through the CI 102 and VTs 104. Further, in some embodiments, the CI 102 displays information usable by the user during the programming.

In step 2612, an activation of station and VT programming is detected at the CI 102. For example, the CI may be powered up, the CI may enter the installation or programming mode following the successful pairing of the CI 102 with a VT 104, the user may press a predefined button or combination of buttons (e.g., pressing both the left and right arrow buttons simultaneously), or other such activation. In step 2614, a VT 104 is selected (e.g., the VT that has just paired with the CI) for which valve programming is to be defined. In some embodiments, the CI 102 may display on the display screen 220 the VT serial number 1120 or other identifier (e.g., see FIG. 11F). In step 2616, the CI displays available valve station designators 1112-1115 corresponding to the number of valves 106 capable of being controlled by the identified VT, and in some implementations indicates 1122 one of the valve station designator that the user is to associate with a station or station identifier of the irrigation controller 100.

In step 2620, the user specifies a station identifier or number 1126 of the irrigation controller 100 to be associated with the valve 106 corresponding to the indicated valve station designator 1122 (e.g., see FIG. 11G). In some instances, the user can press one or more of the buttons 222 to input the station identifier (e.g., the user can sequence through a series of potential station numbers by pressing the "+" or "−" button, and then press the right arrow button to enter the displayed station number and advance to the next valve station designator 1113 to repeat the station numbering). This allows the user to define an association of the valve station designators, 1112-1115 corresponding to the valves 106 controlled by the identified VT 104, with the relevant station identifier of the irrigation controller 100 that will be detected by the CI in response to receiving a valve activation signal from the irrigation controller. Typically, a station identifier or number 1126-1127 (e.g., see FIG. 11G) is associated by the user with each valve 106 controlled by the VT 104 associating each valve with one or more station identifiers of the irrigation controller. In some embodiments, the user can further specify a station identifier 1126 as a master valve (e.g., by advancing the station identifier through the series of numbers or other options until an "M" option is displayed in the desired valve station designator 1112). Steps 2616 and 2620 can be repeated for each of the available valve station designators 1112-1115 corresponding to the valves controlled by the VT.

In step 2622, the CI 102 displays a VT direction designation interface 1130 (see FIG. 11H). The user can use the buttons 222 (e.g., "+" button) to shift through the arrows and/or rotate an arrow 1132, such as in a clockwise direct (see FIG. 11I), until a direction designation (e.g., the arrow) points in a direction from the CI toward the VT. In step 2624, the CI 102 records the direction designation selected by the user through the direction designation interface 1130.

Some embodiments include step 2626, where the CI 102 displays a summary (see FIG. 11J) of the VT programming for the VT allowing the user to review the defined settings and save the settings or return and make changes. FIG. 11J shows an example summary user interface 1140. In some instances, the summary user interface 1140 displays a signal strength icon 1142 showing a current signal strength between the CI 102 and the VT 104, a battery strength icon 1144, the irrigation controller station numbers 1126-1127 associated with the valves 106 controlled by the VT, and a direction designation 1146. In step 2630, the CI 102 stores the VT programming for the VT 104. In some embodiments, the CI waits for confirmation from the user before storing the VT programming (e.g., a press of a predefined button or elapse of time without changes or shifting to a previous interface to make modifications, etc.). Steps 2614-2630 can be repeated for each VT 104 paired with the CI 102.

Some embodiments further include optional step 2632, where the CI 102 sequentially displays the status information and/or stored VT programming for each VT 104 paired with the CI. For example, FIG. 11K shows an example of a status interface 1150 that can be displayed on the display screen 220. The status interface 1150 can display, for example, the VT identifier 1120, the corresponding signal and battery strength through the signal and battery strength icons 1142, 1144, the direction designation 1146 and/or other such information. In some embodiments, the user can access relevant status and/or VT programming for a VT by activating a status mode, which shows similar information as provided in the summary user interface 1140 and/or the status interface 1150. In some instances, the CI periodically displays this information. Additionally or alternatively, the user can activate the summary interface 1140 and/or status interface 1150, for example by selecting one or more buttons 222 and/or a sequence of buttons.

Figure 27:
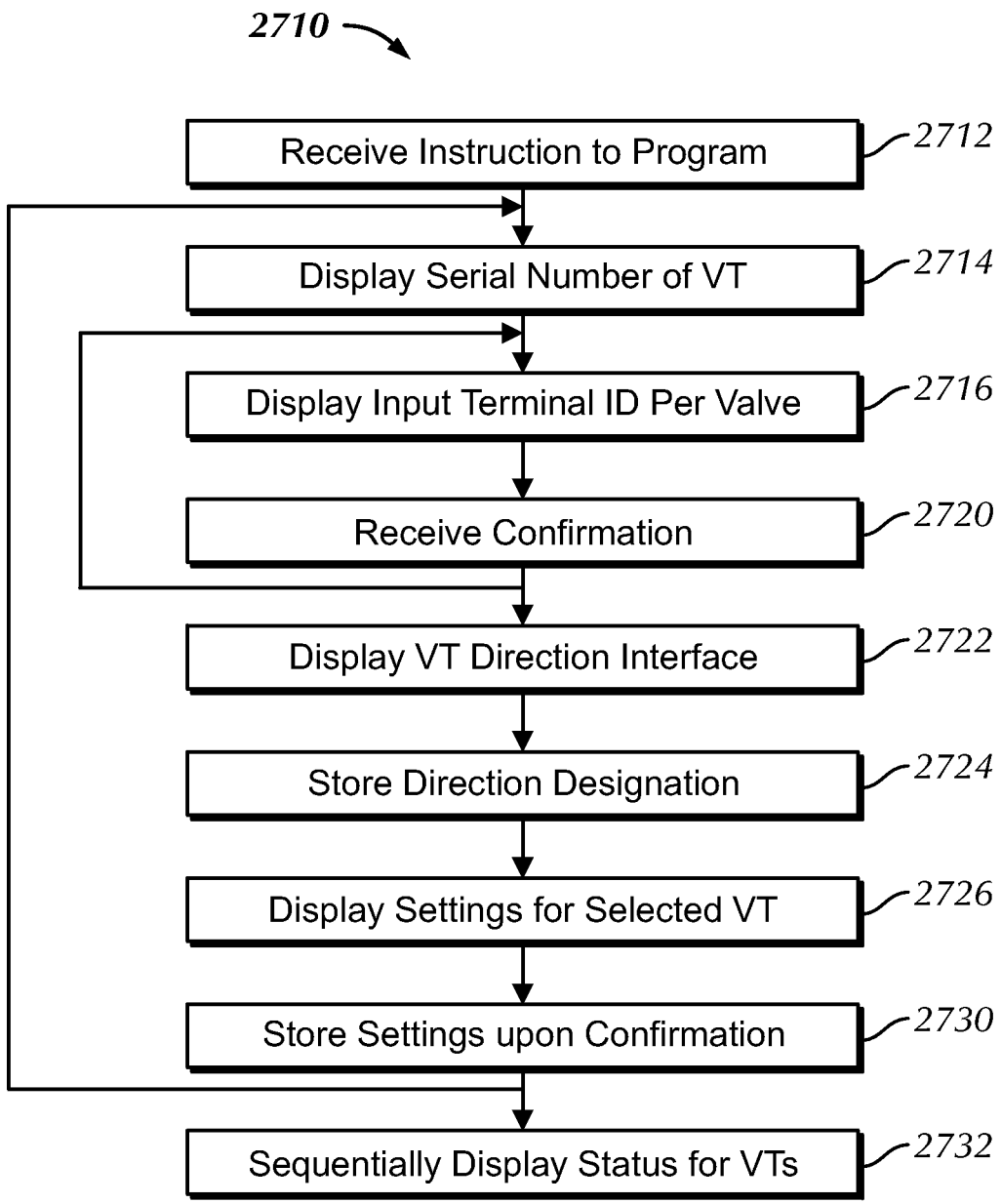
FIG. 27 illustrates a simplified flow diagram of a process of defining valve transceiver programming or mapping at a controller interface for a universal configuration, according to some embodiments.

FIG. 27 illustrates a flow diagram of a process 2710 of defining VT programming or mapping for a universal configuration (e.g., see FIGS. 1 and 22-23), according to some embodiments. As with the process 2610 of FIG. 26, the VT programming is performed at least in part by the user through the user interface at the CI 102. In step 2712, an activation of station and VT programming is detected at the CI 102. In step 2714, a VT 104 is determined and/or selected (e.g., the VT that has just paired with the CI 102) for which valve programming is to be defined, and a serial number or other identifier of the VT is identified. In step 2716, an input terminal identifier of an input terminal 430 of the CI 102 is identified and associated with each valve controlled by the identified VT 104, and a terminal coupling interface 1152 is displayed in some embodiments (see FIG. 11L) where the CI displays the VT identifier 1120 and each input terminal identifier 1154-1155 associated with a valve station designator (e.g., station designators 1112, 1113) corresponding to each valve controlled by the VT. The input terminal identifier 1154-1155 relates to the connector 202/204 of the CI 102 and directs the user to connect a wire to the input terminal 430 corresponding to the displayed input terminal identifier 1154, 1155 while connecting the other end of this wire to a station output terminal 112 of the irrigation controller 100 with which the user want associated with the valve 106. Accordingly, in operation when the irrigation controller 100 issues a valve activation signal on the station output terminal 112 the CI 102 detects the activation signal on the input terminal 430 and associates the valve activation signal with the remote valve designated in the VT programming. In some implementations, different colored wiring can be used with each input terminal 430. Steps 2716 and 2720 can be repeated in accordance with each valve associated with the VT as needed.

In step 2722, similar to the process 2610 of FIG. 26, the CI 102 displays a VT direction designation interface 1130 (see FIG. 11H). The user can use the buttons 222 (e.g., "+" button) to shift through the arrows and/or rotate an arrow 1132, such as in a clockwise direct (see FIG. 11I), until a direction designation (e.g., the arrow) points in a direction from the CI 102 toward the VT 104. In step 2724, the CI 102 stores the direction designation selected by the user through the direction designation interface 1130.

Some embodiments include step 2726, where the CI 102 displays the summary interface 1160 (see FIG. 11M) of the VT programming for the VT 104 allowing the user to review the defined settings and save the settings or return and make changes. FIG. 11M shows an example summary user interface 1160 with respect to direct wiring between station output terminals 112 of the irrigation controller 100 and the input terminals 430 of the CI 102, such as with the universal configuration. For example, the summary user interface 1160 in some embodiments displays a signal strength icon 1142 showing a current signal strength between the CI 102 and the VT 104, a battery strength icon 1144, input terminal identifiers 1154-1155 associated with valves designators 1112 associated with the valves 106 controlled by the VT, and a direction designation 1146. In step 2730, the CI 102 stores the VT programming for the VT 104. In some embodiments, the CI waits for confirmation from the user before storing the VT programming Steps 2714-2730 can be repeated for each VT 104 paired with the CI 102. Some embodiments further include optional step 2732, where the CI sequentially displays the status information and/or stored VT programming for each VT. Again, for example, FIG. 11K shows an example of a status interface 1150 that can be displayed on the display screen 220.

Board Layouts

Figure 7A:
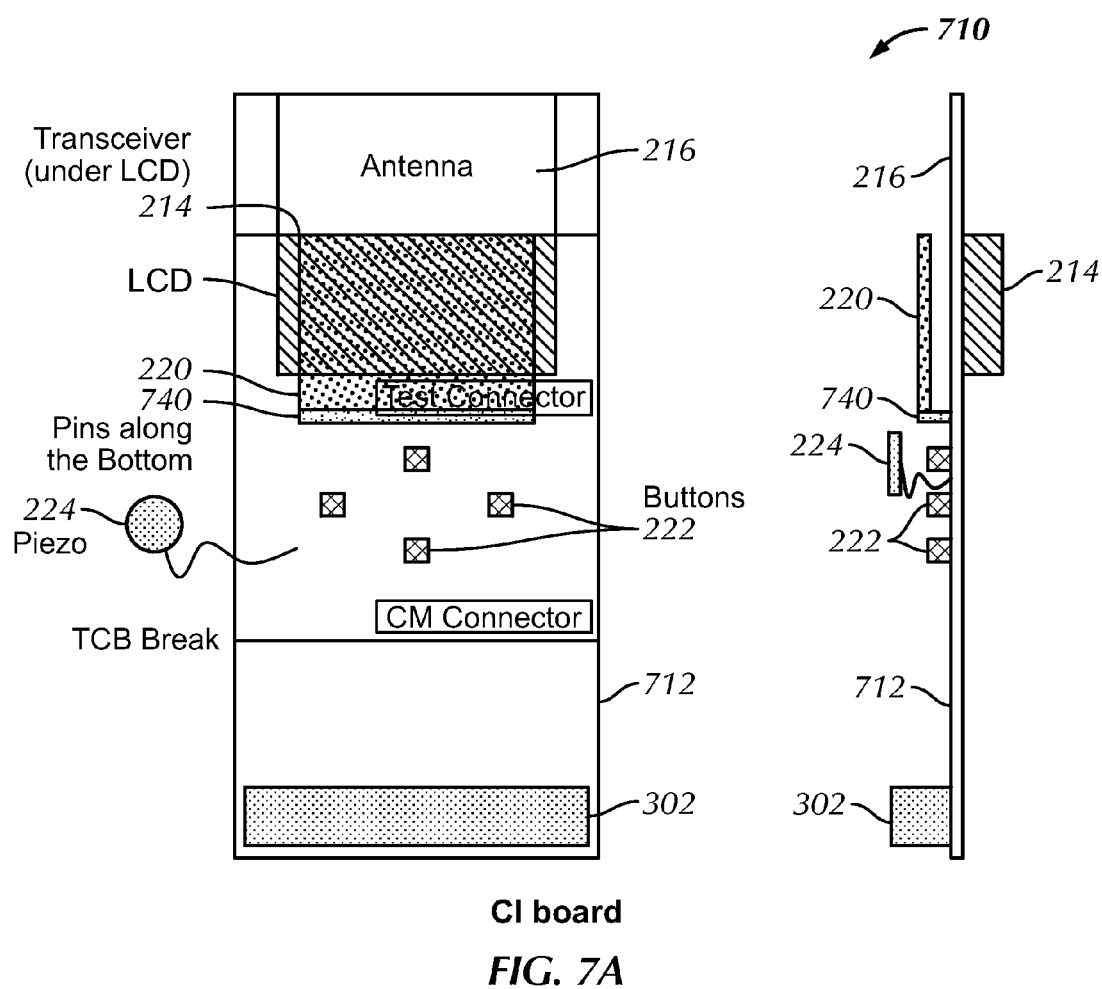
FIG. 7A is a diagram of an exemplary board layout of a controller interface in accordance with some embodiments.
Figure 7B:
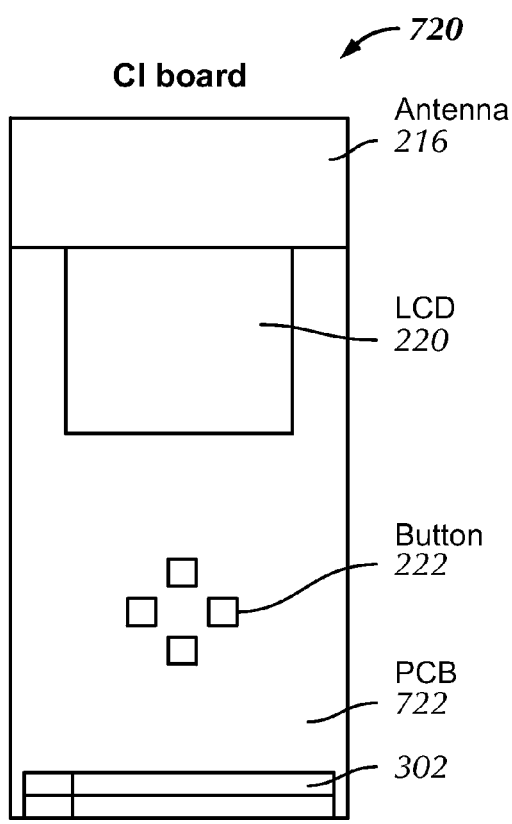
FIGS. 7B-7C illustrate a top plan view and perspective view, respectively, of a controller interface board layout according to some embodiments.
Figure 7C:
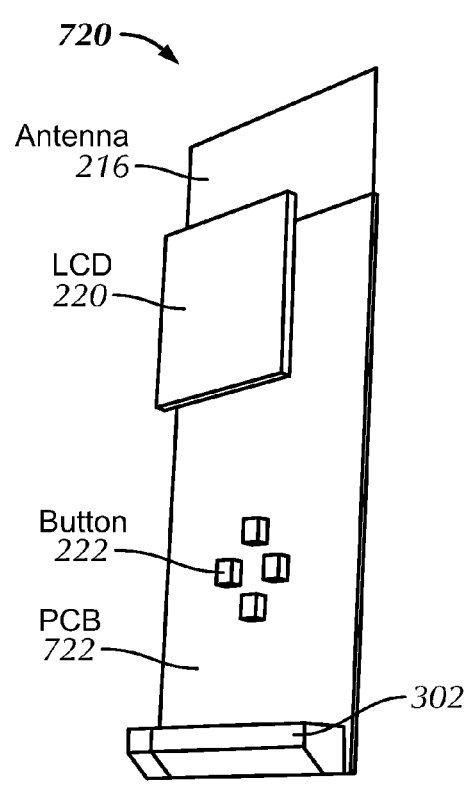

FIG. 7A shows a front plane view and a side plane view of an exemplary board layout 710 of a controller interface (CI) 102 in accordance with some embodiments. FIGS. 7B-C show a front plane view and a perspective view, respectively, of an exemplary board layout 720 of a CI 102 in accordance with some embodiments. Generally, the CI 102 takes the form of a small housing 412 with a user interface that can include, for example, a display screen 220 and user inputs, keyboard or buttons (e.g., 4 buttons) 222, and a connector 202/302. The housing contains the circuit board 712, 722 and electronic components. In the embodiments of FIGS. 7A-C, the antenna 216 is formed at the top portion of the board 712, 722, the display screen 220 below the antenna and in front of the board, and the transceiver 214 below the antenna and on the back side of the board. The CI board 712 in some embodiments includes a display connector 740 secured with the CI board that allows a display screen 220 (e.g., LCD display screen) to be coupled with CI board through the display connector 740.

The buttons 222 are located below the display screen on the board. Again, some embodiments include an audible element 224 ("piezo") that, in some implementations, couples to the front side of the board and separated from the board. The universal interface connector 302 is located at the bottom of the board. Other circuitry can be connected to or formed within the board.

FIG. 7D shows a perspective view of an exemplary two-board layout 730 of a controller interface (CI) 102 in accordance with some embodiments. The two-board layout includes a main CI board 732 that cooperates with any one of a plurality of different interface boards 734. These interface boards 734 connect as daughter boards to the main CI board 732, and each provide different connectors 302 to allow the two-board layout 730 to cooperate with different configurations for the CI 102. For example, a first interface board is configured to cooperate the CI two-board layout 730 into a modular CI configuration or all wireless configuration with the connector 302 of the first interface board 734 being configured to connect directly with the control panel 1614 (e.g., with an SIP port). A second interface board 734 can be configured to cooperate the CI two-board layout 730 into a universal CI configuration with the connector 302 of the second interface board 734 being configured with multiple input terminals 430 to connect directly with station output terminals 112 of the irrigation controller 100. Some embodiments may further provide a third interface board 734 that provides for an alternative all wireless configuration providing connections with a ribbon cable of the control panel of the irrigation controller or a backplane of the irrigation controller.

In some embodiments, the main CI board 732 includes an interface board connector 736. Further, the main CI board can include an antenna, a display connector 740 and a display screen 220 in front of the board, the transceiver, and the one or more buttons 222 located below the display screen. An audible element may also be included in some implementations. The interface board 734 includes a corresponding main board connector 738 and the connector 302. The main board connector 738 is configured to communicationally connect with the interface board connector 736 of the main board 732, while the connector 302 is configured to connect the CI 102 with the irrigation controller 100.

Again, depending on the type of interface board 734 selected, the CI can be adapted for the different CI configurations. In some embodiments of the modular configuration, the main CI board 732 and the interface board 734 are configured to be enclosed within the housing 412 of the CI 102, with the connector 302 internal to the housing and one or more wires extending from the housing to couple with the irrigation controller (e.g., to connect to the SIP port of the control panel and/or to obtain power). In some embodiments of the all wireless configuration, the main CI board 732 may be configured to be enclosed within the housing 412 of the CI 102 while the interface board 734 is configured to cooperate with a chassis and/or backplane of the irrigation controller such that the interface board 734 is external to the housing 412 of the CI 102, while still providing effective coupling between the control panel and the main CI board 732. The connector 302 can couple with the SIP port of the control panel 1614, a backplane of the irrigation controller 100, a ribbon cable from the control panel, or other such relevant connection. Further, the connector 302 can in some embodiments be configured to connect to a power source of the irrigation controller to deliver power to the CI 102. In some embodiments of the universal configuration the two-board layout is enclosed within the housing 412 of the CI 102 while providing a user with access to the input terminals 430 of the connector 302 of the interface board 734 to connect wires to the station output terminals 112 of the irrigation controller 100. For example, the input terminals 430 can be accessible behind a door or cover 432 that secures with the CI housing 412.

Figure 8:
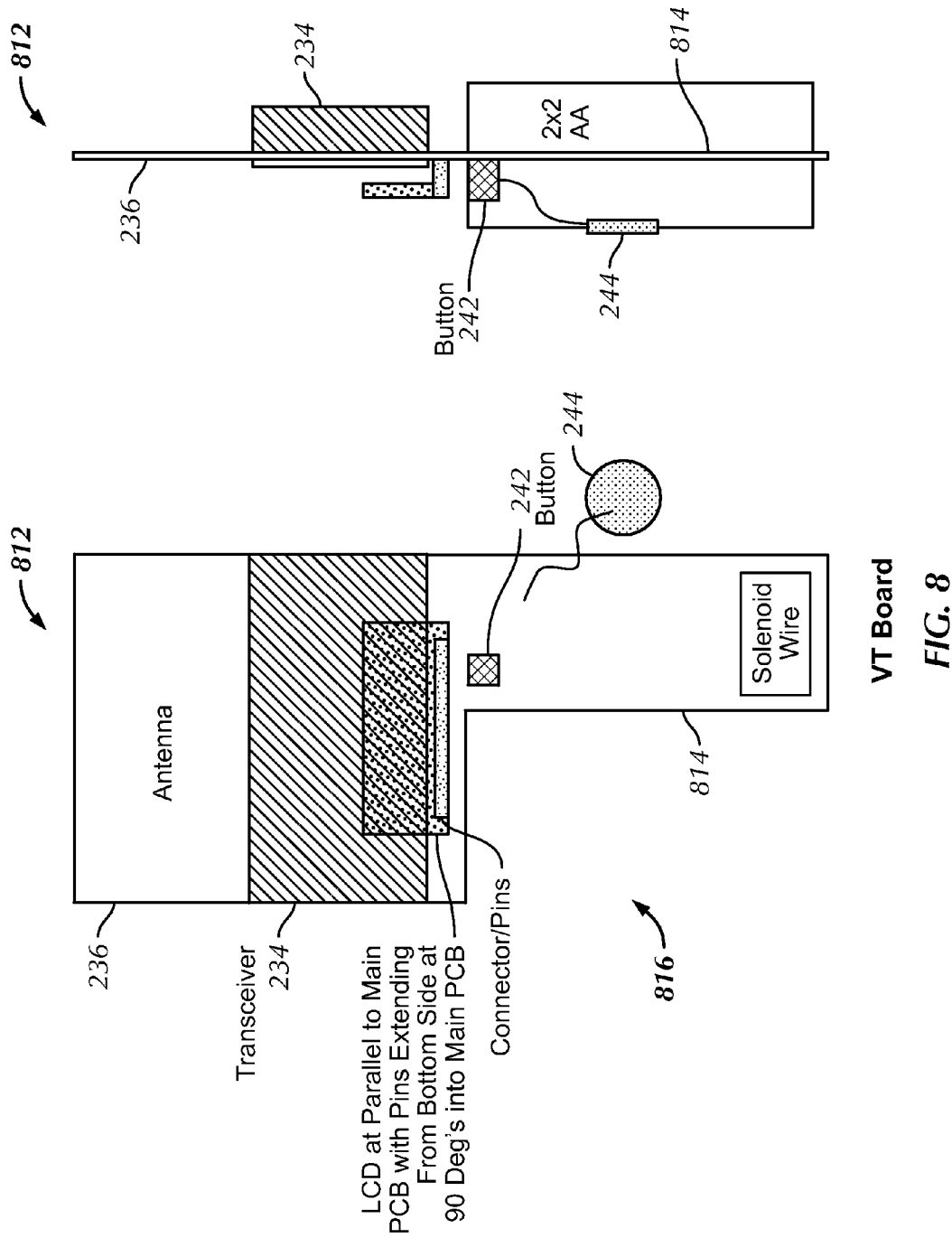
FIG. 8 is a diagram of an exemplary board layout of a valve transceiver in accordance with some embodiments.
Figure 9:
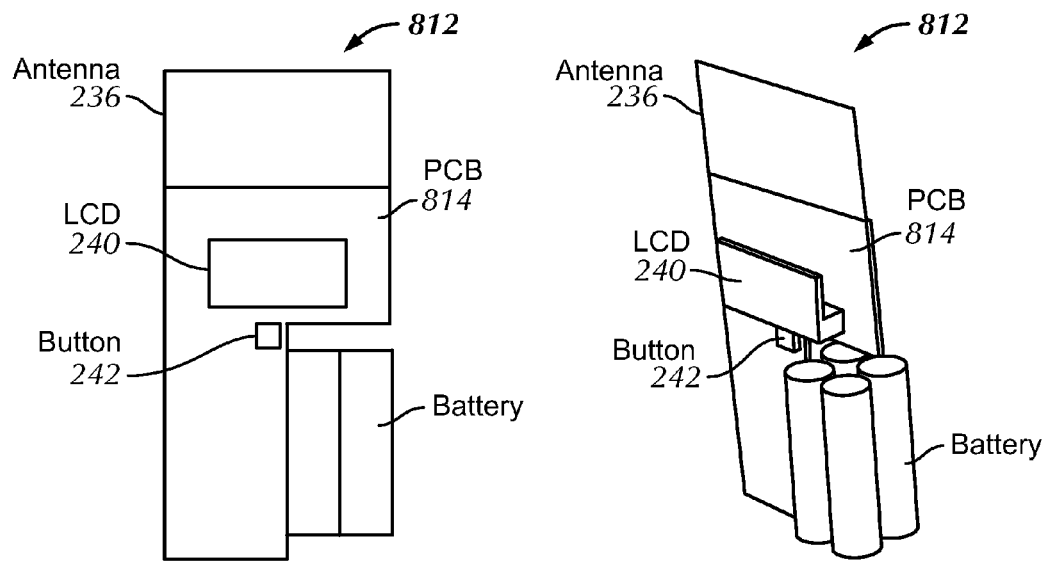
FIG. 9 is a top plan view and perspective view of a front side of a valve transceiver board layout according to some embodiments.
Figure 10:
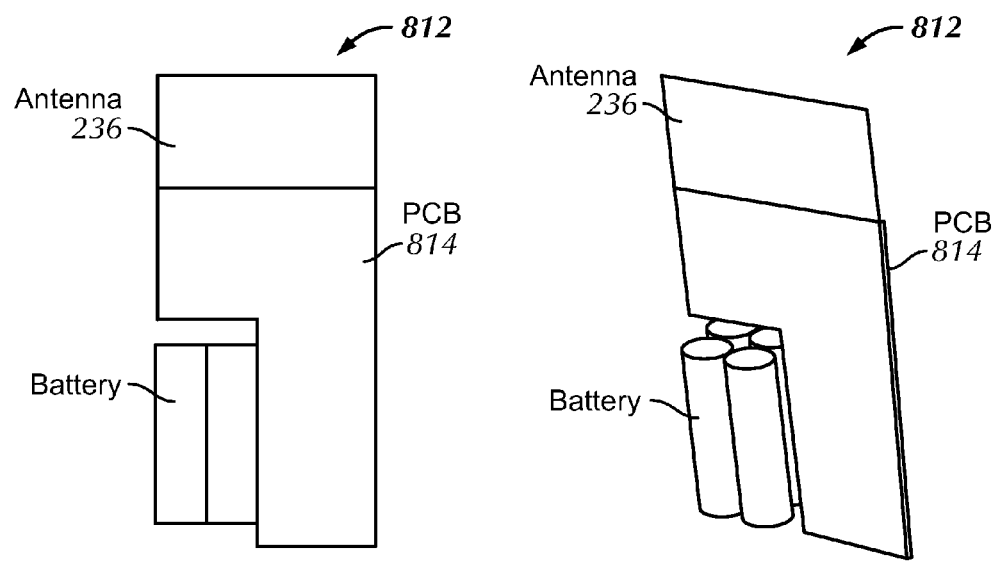
FIG. 10 is a top plan view and perspective view of a back side of a valve transceiver board layout according to some embodiments.

FIG. 8 shows a plane view and side view of an exemplary board layout 812 of a VT 104 in accordance with some embodiments. FIG. 9 illustrates a front plane view and perspective front view of an exemplary board layout 812 of a VT similar to that in FIG. 8. FIG. 10 illustrates a back plane view and perspective back view of an exemplary board layout 812 of a VT similar to that in FIGS. 8-9. Referring to FIGS. 8-10, generally, the VT 104 takes the form of a small housing 612 with a user interface that includes one or more user input buttons 242 (e.g., 1 button), and in some embodiments one or more LEDs 240, a display screen (LCD), indicators or the like. The housing contains a circuit board 814 (e.g., PCB board) and electronic components. In the illustrated form, the antenna 236 is formed at the top portion of the circuit board 814, the display screen below the antenna and in front of the board, the transceiver 234 below the antenna and on the back side of the board. The button 242 is located below the display screen on the board. Some embodiments include an audible element 244 ("piezo") coupled to the front side of the board, and in some implementations separated from the board. Additionally, solenoid driver circuitry 246 and solenoid wires are located in the lower region of the board. In some embodiments the circuit board 814 includes a cutout 816 in the lower left region to allow positioning of a power source (e.g., 4 AA batteries to be positions therein). Other circuitry can further be connected to or formed within the circuit board 814. FIGS. 6A-6B illustrate an exemplary form factor for a VT 104 in accordance with some embodiments that can receive the circuit board 814 with the display. As described above, some embodiments include one or more LEDs 640-643 (not shown in FIGS. 8-10), and in some implementations correspond to the wires 650 of the VT. The circuit board 814 is enclosed within the housing 612 when put together.

Exemplary Display Screens

Figure 11A:
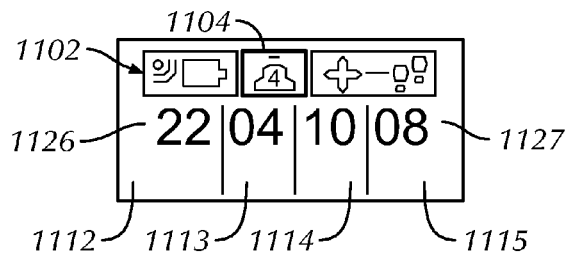
FIGS. 11A-11Q are exemplary display screens of a controller interface according to some embodiments.

Some of the exemplary user interface or display screens of the CI 102 were discussed above with reference to FIGS. 11A-M and FIG. 12. Left, right and "+" and "−" buttons 222 are used by a user to navigate the user interface screens, make selections, change values, implement pairing, define VT programming and other such interaction and/or control over with the CI 102 and potentially the VT 104 through communication from the CI. In FIG. 11A, a configuration user interface screen is displayed, in accordance with some embodiments, which allows the user to navigate left to right through a top horizontal bar of icons 1102 (e.g., using the push buttons). As shown, the VT icon 1104 with a "4" in the top horizontal icon bar is highlighted, the "4" indicating that the selected VT is a 4 station VT. The configuration interface screen further shows appropriate numbers of valve station designators 1112-1115 (e.g., 4 corresponding to the number of valves controlled by the selected VT), and further includes irrigation controller station identifiers or numbers 1126-1127 associated with each valve station designator. The displayed station identifiers 1126-1127 represent the irrigation controller station numbers assigned to each of the four valves 106 controlled by the selected VT. To define and/or change a station identifier assignment, the user uses the left/right buttons to navigate to one of valve station designators and enters or changes the corresponding station identifier numbers (e.g., 22, 04, 10 and 08) using the + and − buttons to adjust the selected number to the desired station identifier. It is noted that even though the CI 102 of some embodiments supports 8 or more stations and/or VTs, the CI may be connected to an irrigation controller having more than 8 stations or more stations than can be supported by a CI. In the illustrated embodiment, the given VT 104 controls 4 stations, which have been associated in the VT programming to correspond to the stations identifiers "4", "8", "10" and "22" of the irrigation controller 100.

Figure 11B:
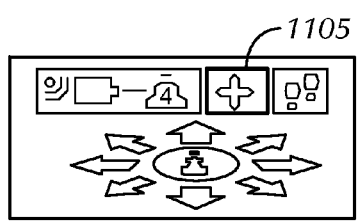
FIGS. 11R-11T are exemplary icons of an exemplary display screen of FIG. 11A of a controller interface according to some embodiments.
Figure 11C:
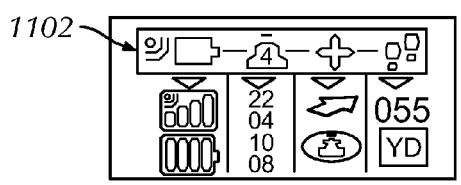
Figure 11D:
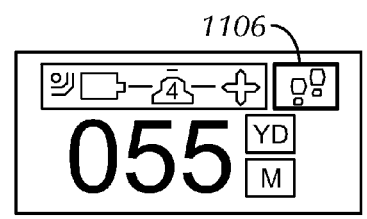
Figure 11E:
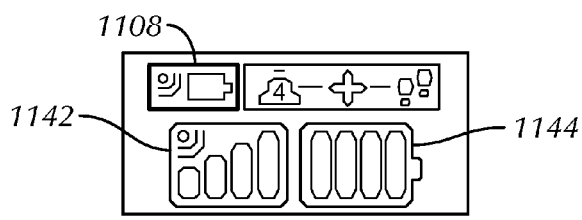

In some embodiments, after completing the VT programming and/or configuration through the configuration user interface of FIG. 11A, the direction designation interface of FIG. 11B is displayed including the highlighted valve locator icon 1105, in accordance with some embodiments. The user manually enters the direction of the VT 104 from the perspective of the CI 102 so that others will know in what direction the VT is located from the CI. This is done, for example, by using the four buttons to navigate to and select a given direction. In FIG. 11D, the footsteps icon 1106 is highlighted and the screen displays the distance to the VT 104 from the CI 102, in accordance with some embodiments. In some embodiments, this distance is manually entered by the user. For example, the user counts or estimates the number of steps or feet from the CI to the VT in the direction selected in FIG. 11B. The user the manually enters the distance, e.g., using the push buttons 222. In FIG. 11E, a pairing mode display is shown, in accordance with some embodiments, with an antenna/battery icon 1108 highlighted. This pairing mode display shows the signal strength icon 1142 indicating the signal strength of wireless signals between the CI 102 and the VT 104 and shows the battery strength icon 1144 indicating the battery strength of the battery power source at the VT (the VT sends data to provide this information to the CI). The pairing mode screen is displayed during pairing of a VT 104 with a CI 102 in accordance with some embodiments. In FIG. 11C, a status interface, in accordance with some embodiments, displays the respective status under each of the 4 icons in the top horizontal bar 1102, showing for example the signal and battery strength, the valve station identifier assignments, VT direction designation or locator, and distance to valve. In some embodiments, the status interface of FIG. 11C is displayed when a predefined button is pressed, a sequence of buttons are pressed, any button on the CI is pressed, or the like.

The CI 102 may, in some embodiments, display alarm states and/or conditions. For example, in some embodiments when a battery strength or signal strength drops below relevant thresholds, an alarm interface 1170 and a status interface 1150 may alternately be displayed (see FIG. 11N), such as each being displayed for one seconds. The status interface 1150 provides the VT identifier 1120 to notify the user and additionally can illustrate to the user, through the signal strength icon 1142 or the battery strength icon 1144, why the alarm is being generated. Further, an audible element 224 at the CI 102 and/or at the VT 104 may be activated. FIG. 11O shows an alternative alarm interface 1172, in accordance with some embodiments, displaying the VT identifier 1120 and an alarm condition 1174.

In some embodiments, display screen indications may include but are not limited to the following: NO SIGNAL/lost signal between CI 102 and VT 104, signal strength, battery strength and low battery warning indication, valve status and an indication where the valve is located. In some embodiments, in normal mode, the CI 102 display screen permits viewing the status interface (valve #, signal and battery strength, distance and direction) of all programmed VTs. In one embodiment, VT status interface screens advance automatically at 5 second intervals when commanded, but allow manual interruption of this sequence by pressing any button on the key pad. Subsequent button pushes will advance views of the remaining status screens.

Further, in some embodiments, the CI 102 displays user interfaces relevant to cooperating the CI with a remote sensor 108. For example, FIG. 11P shows a sensor pairing and/or home interface 1180, in accordance with some embodiments. This sensor pairing interface 1180 can be displayed upon activating the CI 102 to pair with a sensor 108. FIG. 11Q shows sensor interface 1182, in accordance with some embodiments, that can be displayed upon establishing the pairing with the sensor 108 and/or activated by the user to be displayed. In some embodiments, the sensor interface displays sensor status information, which can include signal strength through a signal strength icon 1184 and battery strength through a battery strength icon 1186. Further, the sensed conditions can be displayed, such a temperature status icon 1188, detected rain status icon 1190 and an interrupt state 1192 indicating whether irrigation is interrupted as a result of a threshold being exceeded.

FIG. 11R shows an enlarged view of the temperature status icon 1188, according to some embodiments. Further, in some implementations, the temperature status icon indicates a sensed temperature 1194 and a set temperature threshold 1195. FIG. 11S shows an enlarged view of the rain status icon 1190, according to some embodiments. Further, in some implementations, the rain status icon indicates a sensed amount of rainfall 1196 and a set rainfall threshold 1197. FIG. 11T shows an enlarged view of the interrupt status icon 1192, according to some embodiments, where the "X" indicates irrigation is interrupted due to threshold sensor conditions being meet (e.g., rain or temperature), while the absence of the "X" indicates that irrigation is not interrupted. Other sensor icons and/or information may be displayed, such as icons and the reasons for displaying the icons or information described in U.S. application Ser. No. 13/277,224, filed Oct. 20, 2011 to Redmond et al. and assigned to Rain Bird Corporation (the '224 application), which is incorporated herein by reference in its entirety. The '224 application adds additional details describing icon driven displays, push button manipulated menus, setting of rainfall accumulation and temperature cutoff thresholds, pairing of wireless devices, and so on.

FIG. 12 is an exemplary status interface 1210 displayed on a display screen 240 of a VT 104 according to some embodiments. This status interface has a corresponding signal strength indicator 1212 and battery strength indicator 1214, as well as station or valve identifier assignments 1216 for the valves controlled by the respective VT. Again, the '224 application adds additional details.

Example Configurations

Figure 13:
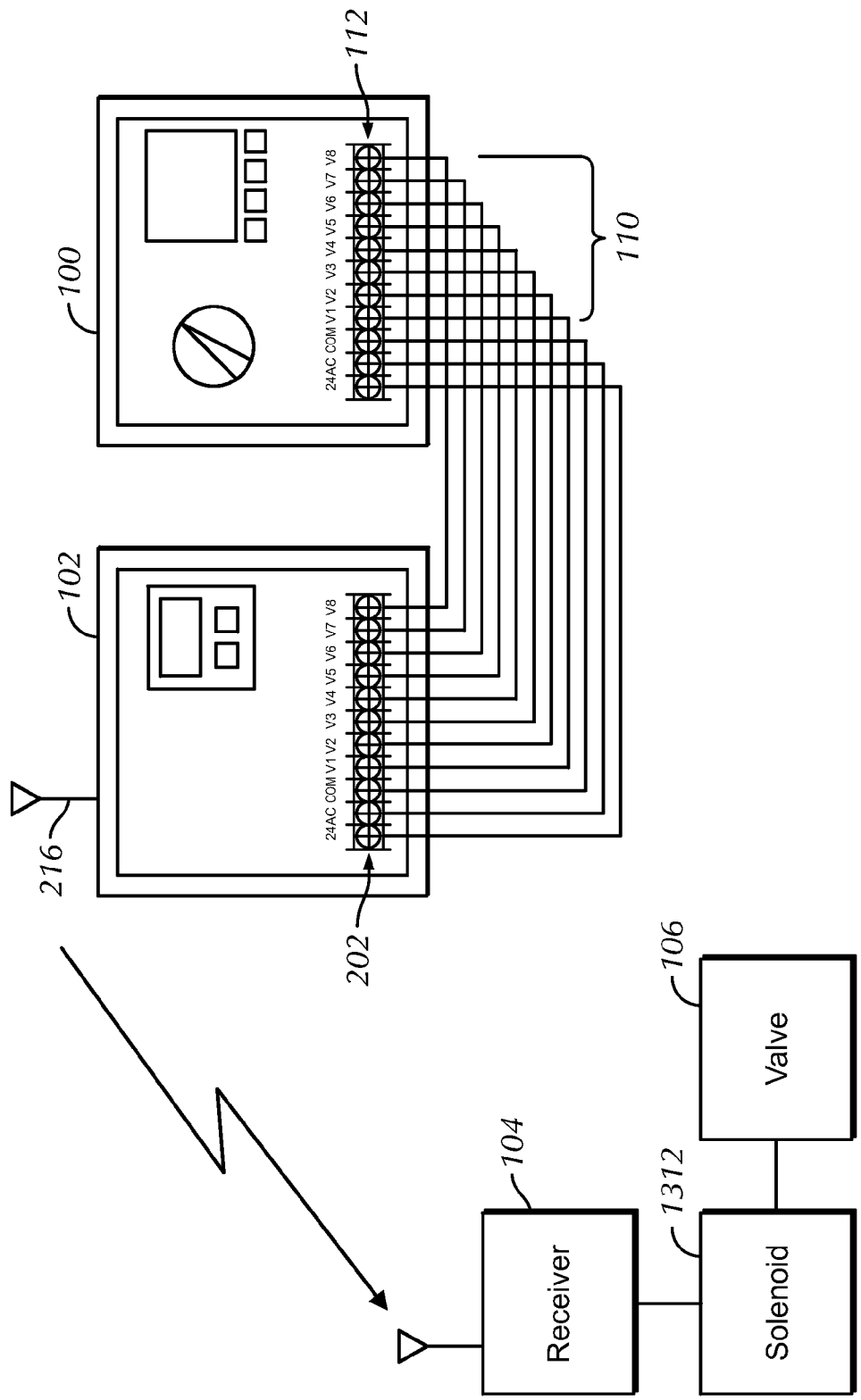
FIG. 13 is a diagram of a wireless control system according to some embodiments.
Figure 14:
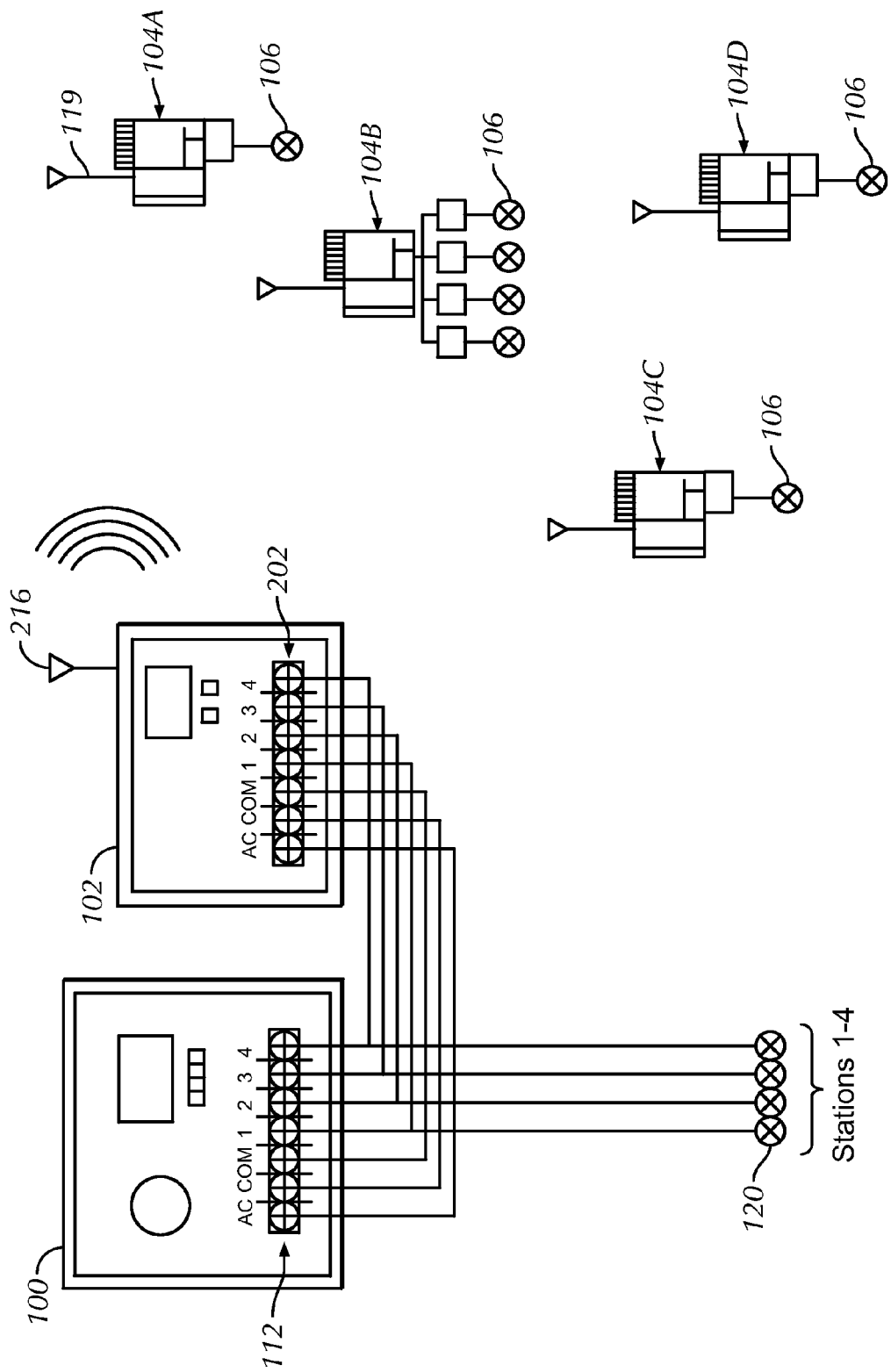
FIG. 14 is a diagram of a wireless control system indicating that a given controller interface can be paired to multiple valve transceivers according to some embodiments.
Figure 15:
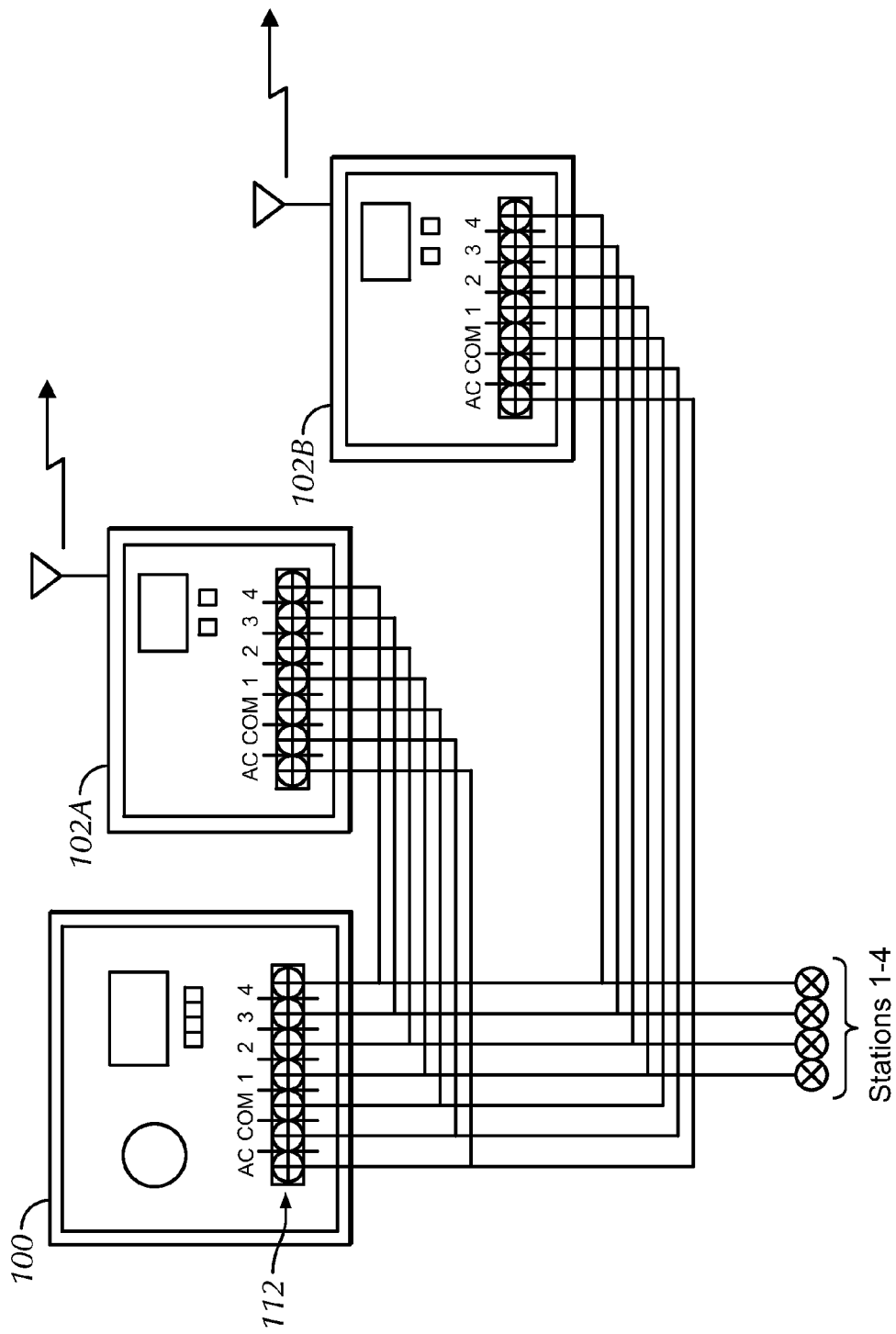
FIG. 15 is a diagram of a wireless control system indicating that multiple controller interfaces may be connected to a single irrigation controller according to some embodiments.
Figure 31:
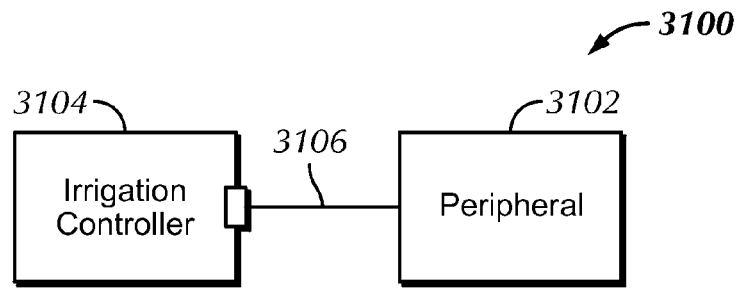
FIG. 31 is a block diagram of an irrigation control system in which a peripheral device is coupled to and cooperates with an irrigation controller according to some embodiments.
Figure 32:
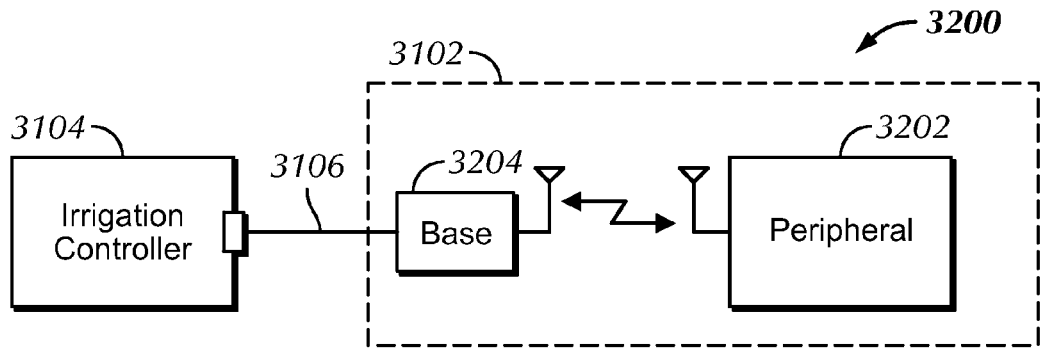
FIG. 32 is a block diagram of an irrigation control system in which a peripheral device is wirelessly coupled to a receiver unit coupled to an irrigation controller such that the peripheral cooperates with the irrigation controller according to some embodiments.

FIGS. 13-15 are slightly modified versions of FIGS. 1, 31 and 32, respectively, in U.S. Pat. No. 7,558,650 to Thornton et al. and assigned to Rain Bird Corporation (the '650 patent), which is incorporated herein by reference in its entirety. The '650 patent includes description of other possible implementations and variations of the CI 102 and VTs 104 described herein.

FIG. 13 is a diagram of a wireless control system according to some embodiments. This is an example of the wireless control system of FIG. 1 herein wherein the CI is embodied as 102. Control wires 110 are coupled from the output terminals 112 of the irrigation controller 100 to the universal interface connector 202 of the CI 102. The CI determines that irrigation is intended on a given control line 110, identifies from the VT programming one or more valves associated with the station identifier of the control line, and sends a wireless signal to the receiver of one or more respective VTs 104 associated with the identified valve and the control line or station identifier. In turn, the VT 104 outputs signaling to control the solenoid 1312 to open and close the valve 106.

FIG. 14 is a diagram of a wireless control system indicating that a given CI 102 can be paired to and communicate with multiple VTs 104A, 104B, 104C and 104D according to some embodiments. Each VT 104 may control 1, 2 or 4 (or other number) solenoid controlled valves 106. Additionally, it is shown that a given station output terminal 112 of the irrigation controller 100 can be wired to a traditional non-latching solenoid controlled valve 120 and also be wired to the CI 102. In one embodiment, the CI supports up to 22 VTs 104.

FIG. 15 is a diagram of a wireless control system indicating that multiple CIs 102A and 102B may be connected to a single irrigation controller 100 according to some embodiments. Each CI 102 is connected by wireline to a given output terminal 112 of the irrigation controller 100. Each CI can be paired with and communicate with one or more VTs 104 (not shown in FIG. 15). In this and other embodiments, in order to avoid interfering with other wireless devices, the transceivers of the CIs 102 may employ an access mechanism to avoid interference and share bandwidth. For example, in some embodiments, a time division duplex (TDD) frequency hopping scheme is used by the wireless terminals. It is understood that any other known multiple access schemes may be used.

As described above, FIGS. 16-23 show other configurations of irrigation systems in accordance with some embodiments that include CIs 102 that cooperate with irrigation controllers 100 to provide an addition of wireless communication to remote VTs 104 to control remote valves 106. Typically, the cooperation of the CI 102 provides this additional wireless communication without any changes to the control panel 1614 of the irrigation controller 100 and without any further modifications to irrigation programming and/or scheduling at the irrigation controller. Further, the irrigation program and/or scheduling is typically entered by the user through a user interface of the control panel, while the wireless VT programming is separately defined by the user through the separate user interface of the CI 102. Accordingly, the control panel 1614 continues to operate as though it were activating valves directly coupled with the irrigation controller, and is unaware that the CI 102 wirelessly transmits corresponding instructions and/or wireless activation signals to the VTs 104.

Again, FIG. 16 shows a simplified diagram of a wireless irrigation control system 1610 in accordance with some embodiments. The irrigation system 1610 includes the CI 102 that cooperates with one or more specific makes and/or models of irrigation controllers 100 or control panels 1614 of a specific manufacturer (sometimes referred to as a manufacturer or controller specific configuration). In some instances, the irrigation controller 100 is a modular irrigation controller into which a plurality of one or more types of modules 1612 are inserted and that couple with the backplane of the irrigation controller 100 to communicate with the control panel 1614. At least some of the modules 1612 can include station output terminals 112 that are configured to connect directly by valve wires or lines 122 to one or more wired valves 120. The CI 102 typically does not couple with the station output terminals 112 and instead directly couples with and communicates with, via the protocol communication line 1616, the control panel 1614, for example through an SIP port or interface of the control panel (not shown in FIG. 16). The station output terminals 112 can, in some embodiments, continue to directly couple with and control valves via station or valve wires 122.

Further, because the CI 102 can be configured to cooperate with a specific irrigation controller (e.g., make and model), the CI can be configured to communicate with a specific protocol, and interpret communications from the irrigation controller 100. As such, a single protocol communication line 1616 can be used and the CI can evaluate valve activation signals from the control panel 1614 to extract station designations that are associated by the CI with one or more remote valves 106 controlled by one or more VTs 104. Additionally, in some embodiments, the CI 102 in the modular configuration allows for the reuse of existing irrigation controllers and/or control panels while still providing for the use of valves controlled wirelessly.

The CI 102 receives communications from the control panel 1614 and detects valve activation signals and/or extracts relevant information to determine station identifiers that are associated with valve activation signals. Through the VP programming, the CI identifies which remote valves 106 and corresponding VTs 104 are to be activated. In some embodiments, the control panel 1614 issues commands and/or station activation signals that are received via the SIP port by the CI 102. The CI can identify a station associated with the station activation signal, and through the VT programming identify one or more relevant VTs and valves. In other embodiments, the CI 102 queries the control panel 1614 requesting irrigation status information from the control panel. The control panel can respond by providing irrigation status information that specifies, for example, which station identifiers and/or output terminals 112 the control panel believes are activating valves, and which are not actively irrigating. This information can be based on the irrigation schedule and/or programming being implemented by the control panel 1614, status information and/or log maintained by the control panel, an evaluation of current status of control signals and/or other relevant determinations. The CI can interpret the irrigation status information to identify the station identifiers associated with the stations the control panel believes are active, and using the VT programming identify one or more corresponding valves 106 and VTs 104 that the CI should have active. Similarly, the CI 102 can identify from its evaluation of the query status information from the control panel which remote valves that are currently active should instead be turned off, and wirelessly communicate valve off signals.

Still further, in some embodiments, the CI 102 wirelessly transmits a broadcast signal based on the status information received from the control panel 1614, where the wireless activation signals and wireless shutoff signals are defined in the status information from the control panel 1614 from a listing identifying which valves are to be in an "on" state and which are to be in an "off" state. The CI uses the status information and generates the status broadcast signal. In some embodiments, the CI does not evaluate the status information, and instead merely generates and transmits the status broadcast signal leaving the VTs 104 to determine whether action is to be taken. In some implementations, the status broadcast signal includes for example a series of bits with the position of each bit corresponding to a predefined valve, and with the bit being set to a one (1) or a zero (0) to indicate on and off states, respectively, or vise versa. The VTs 104 upon receiving this status broadcast knows which one or more of the series of bit correspond to the one or more valves controlled by the VT, and the VT takes appropriate action to activate a valve, maintain a valve in an on state, turn a valve off, or maintain a valve in an off state according to the state designated by the bit.

FIG. 17 shows the simplified diagram of an all wireless irrigation control system 1710 in accordance with some embodiments. The CI 102 in the all wireless configuration similarly couples directly with the control panel 1614 through a protocol communication line 1616 while wirelessly communicating with the one or more VTs 104 and sensor/s 108. Again, because the CI interfaces directly with the control panel 1614, the CI 102 in at least some embodiments of the all wireless configuration operates similar to the CI in the modular configuration. Accordingly, the CI can receive communications from the control panel 1614 and interpret those communications. Further, the CI can cooperate with existing control panels allowing the control panel to be reused and implemented in this configuration. Additionally, in some embodiments, the CI 102 can query the control panel 1614 requesting the status information. Based on the status information the CI can transmit wireless signals to relevant VTs 104 and/or transmit a status broadcast signal with relevant information that can be interpreted by the VTs allowing the VTs to determine whether valves it controls should be activated, deactivated or maintained.

The CI 102 is positioned within a housing of the irrigation controller 100 and communicates with the control panel 1614 via the SIP port 1720. The valve activations are implemented through wireless communications from the CI to one or more VTs 104. In this configuration, the irrigation controller 100 is not configured to be directly wired to irrigation stations, valves or other actuation devices. The control panel 1614, however, continues to operate as though it were driving activation circuits to cause station activation signals to be applied to station output terminals, and the control panel is unaware that it is not directly activating valves. Accordingly, in at least some implementations, the all wireless configuration allows a control panel configured for direct wiring with wired valves to be reused in the wireless configuration, and typically without reprogramming or changing the control panel. Further, the irrigation programming and/or schedules is defined through a user interface of the control panel 1614, while the separate CI 102 is used to define the wireless VT programming through the user interface of the CI 102. Again, in some embodiments, the CI 102 can be configured to query the control panel to obtain status information, and then use that status information and the VT programming to determine whether wireless activation signals and/or wireless shutoff signals are to be wirelessly transmitted. In other embodiments, the CI receives valve activation signals and identifies one or more valves 106 and corresponding VTs 104 through the VT programming.

Figure 18:
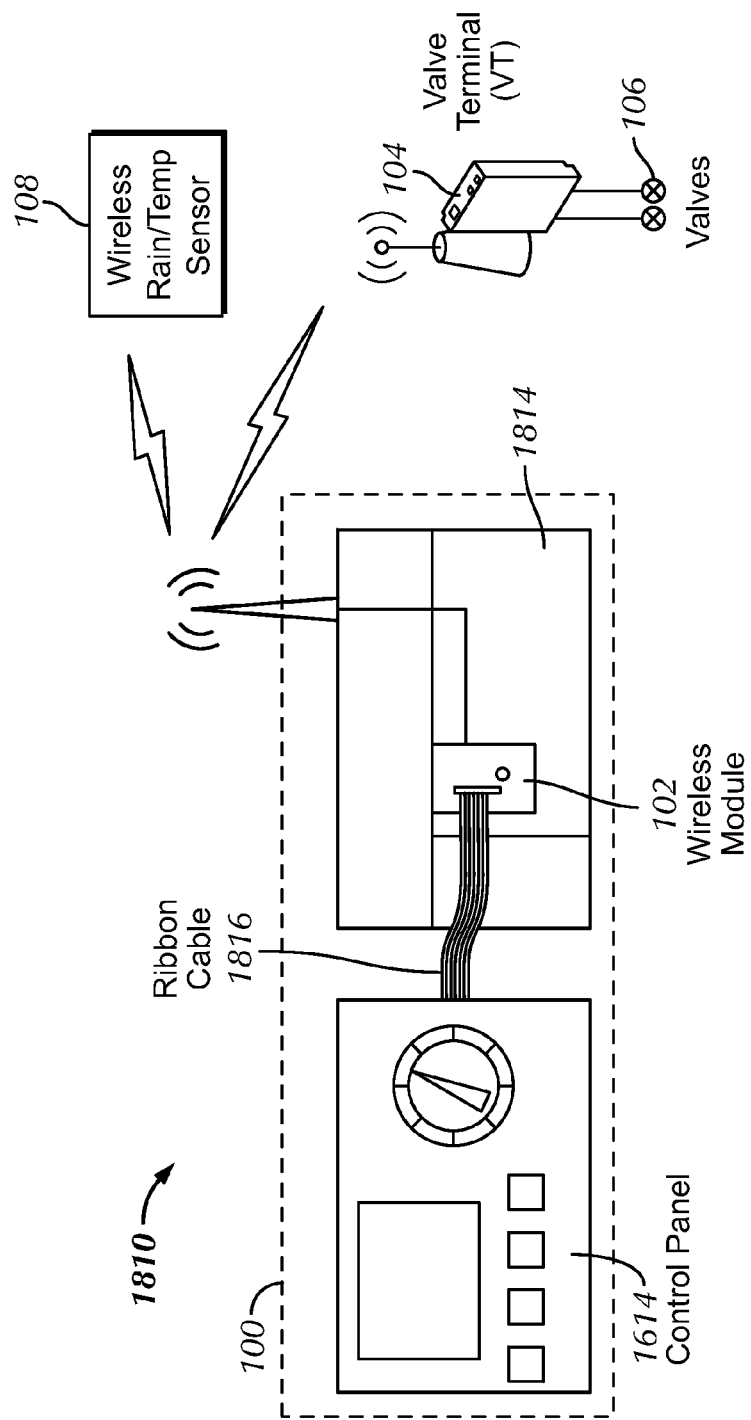
FIG. 18 shows an embodiment of an irrigation system in accordance with some embodiments.

FIG. 18 shows an embodiment of an irrigation system 1810 with an all wireless configuration in accordance with some embodiments. The irrigation system includes an irrigation controller 100 with a control panel 1614, a CI 102 and one or more VTs 104. Optionally, the CI 102 can further communicate with a sensor 108 as described above. The CI 102 is positioned within the housing of the irrigation controller 100. In some embodiments, the CI 102 is mounted on a backplane 1814 of the irrigation controller and couples with the control panel 1614 through a ribbon cable 1816 that directly couples between the CI and the control panel or couples with the CI through the backplane. The CI wirelessly communicates with the VTs 104 to control the VTs. Accordingly, this wireless configuration allows for the reuse of a control panel and backplane of existing irrigation controllers.

Figure 19A:
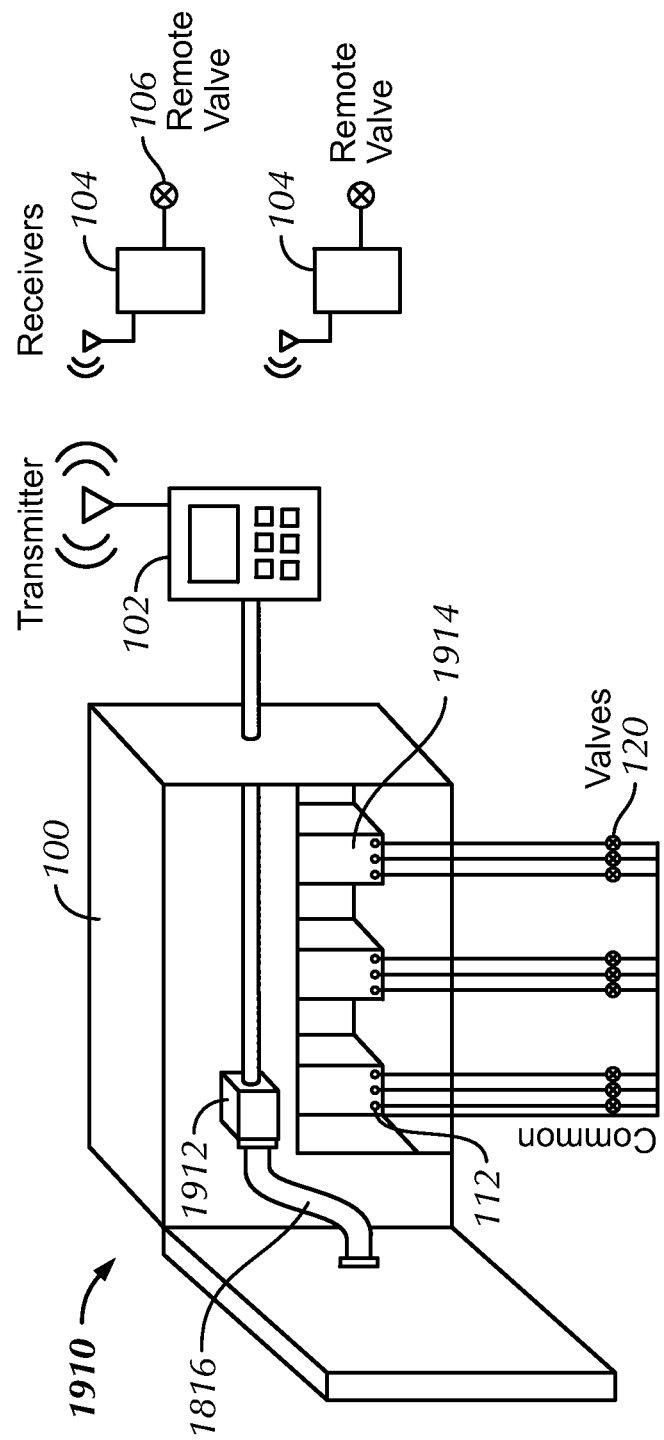
FIG. 19A shows a simplified perspective view of an irrigation system in accordance with some embodiments.
Figures 19B, 19C:
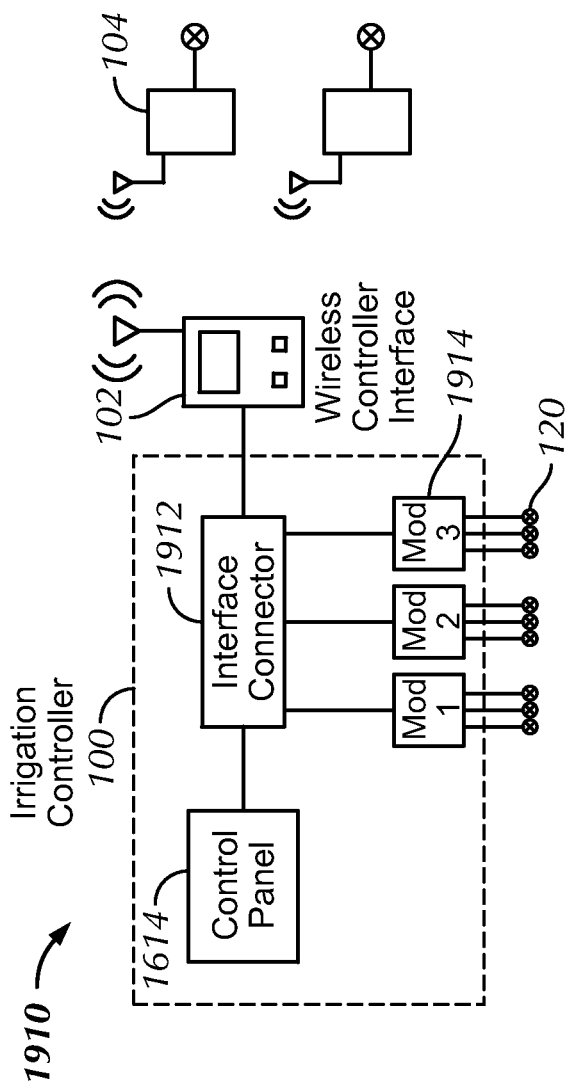
FIG. 19B shows a simplified block diagram of the irrigation system of FIG. 19A.
FIG. 19C shows a representation of valve transceiver programming at a controller interface of the system of FIGS. 19A-19B, in accordance with some embodiments.

FIG. 19A shows a diagram of an irrigation system 1910 in accordance with some embodiments. FIG. 19B shows a simplified block diagram of the irrigation system 1910 of FIG. 19A. FIG. 19C shows a representation of wireless VT programming 1920 at the CI 102 in accordance with some embodiments. Referring to FIGS. 19A-19C, the irrigation system 1910 includes an irrigation controller 100 with a control panel 1614, station output terminals 112, an interface connector 1912, and a CI 102 in wireless communication with one or more VTs 104 and/or sensors. In some embodiments, the irrigation controller 100 is a modular irrigation controller with station modules 1914 coupled with a backplane of the irrigation controller and including the station output terminal 112. Further, the station output terminals 112 may be connected to one or more wired valves 120.

The interface connector 1912 is separate from the CI 102, and couples between the control panel 1614 and the station modules 1914. For example, the interface connector 1912 can couple with the ribbon cable 1816 that couples with the control panel 1614 or through the backplane of the irrigation controller. The CI 102 can be positioned exterior to the irrigation controller 100; however, in other embodiments, the CI may be positioned within the housing of the irrigation controller. Accordingly, the CI provides an add-on wireless transmitter to transmit to wireless enabled valves through the VTs 104. The interface connector 1912 couples with the control panel 1614 and sends signals to the CI by wireline connection. The CI makes the decisions regarding whether to wirelessly activate one or more valves through the wireless communication.

In some embodiments, the interface connector 1912 couples with the ribbon cable 1816 from the control panel 1614 and to the backplane of the irrigation controller 100, and is positioned in the control path from the control panel to the station modules 1914. The interface connector 1912 is further connected to the CI 102 (e.g., using an RJ-11 cable and connector). The interface connector 1912 intercepts signals from the control panel 1614 destined for the station modules 1914, and forwards the signals to the CI. Based on response signaling from the CI 102, the interface connector 1912 either allows a control signal to pass therethrough to one or more station modules 1914 or continues to block that signal, with the CI 102 typically communicating a corresponding wireless activation signal. The VT programming or mapping 1920 is performed at the CI 102 through the user interface of the CI. For example, the user can assign station numbers 1-5 and 7 as wired stations, and assigns station numbers 6 and 8-9 as wireless stations. FIG. 19C shows a simplified graphic representation of the VT programming according to some embodiments.

In some embodiments, the signals from the control panel 1614 are passed to the CI 102 by the interface connector 1912 and processed by the CI. In other embodiments, the CI queries the control panel 1614 through the interface connector 1912. When the CI receives a valve activation or shutoff signal or control signal destined for one of the wired stations (e.g., stations 1-5 or 7), the CI sends signaling to the interface connector 1912 and the interface connector allows that control signal to pass therethrough to go to the appropriate module 1914, and the module will power the valve activation signal. When the CI 102 receives a valve activation signal or other control signal for one of the wireless stations (e.g., stations 6 or 8-9), the CI sends a signal to the interface connector 1912, in some embodiments, to not pass the signal to the module, and instead, the CI generates and wirelessly transmits a wireless activation (or shutoff) signal to the corresponding VT according to the VT programming. Alternatively, the interface connector 1912 can also forward the activation signal to the module to additionally activate a wired valve 120. Similarly, in some embodiments, the CI 102 and/or the connector interface 1912 can detect the termination of an activation signal from the control panel and interpret this as a shutoff signal.

Figure 20:
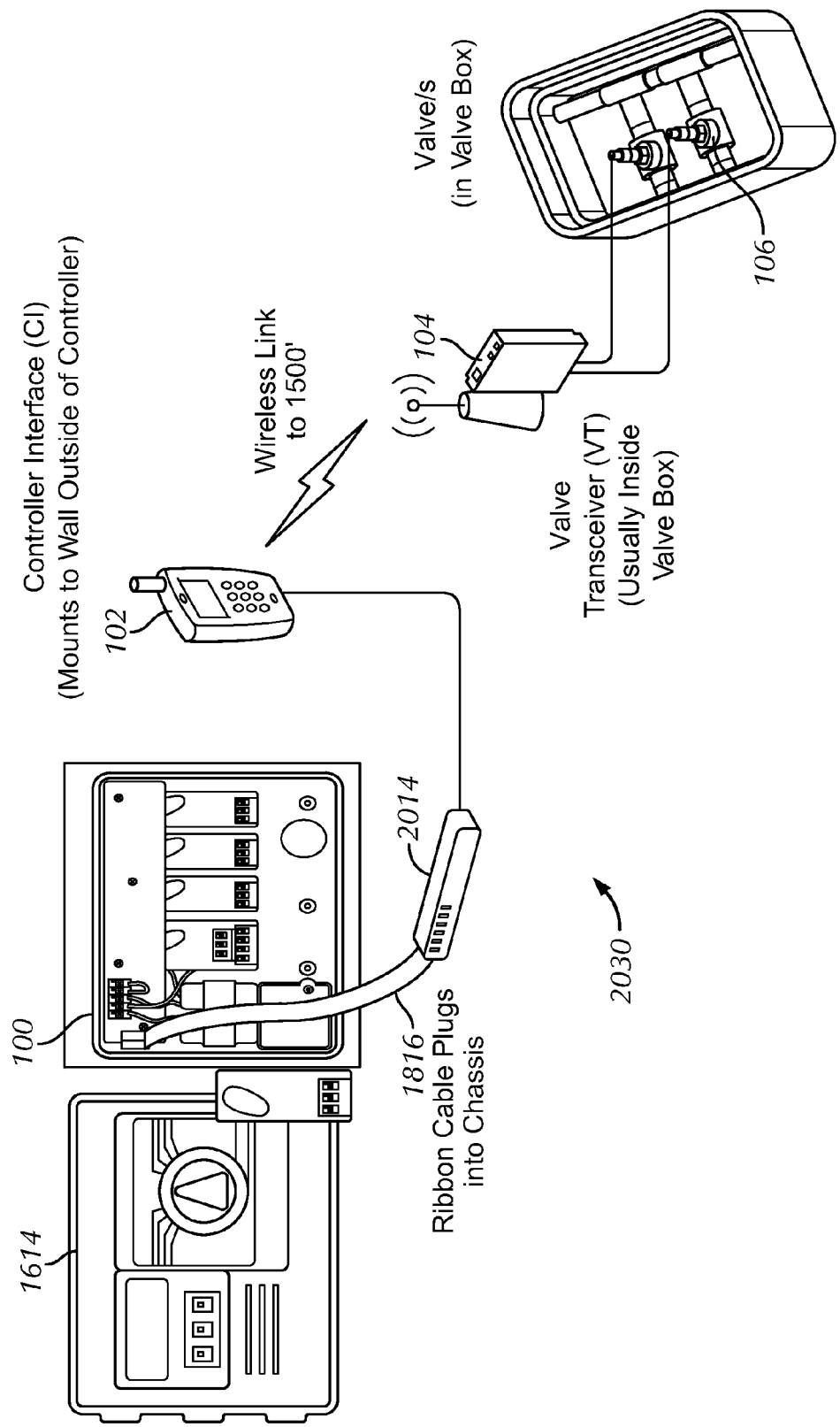
FIG. 20 shows a simplified block diagram of a wireless irrigation control system, in accordance with some embodiments.

FIG. 20 shows a simplified block diagram of an irrigation control system 2030 similar to the irrigation system of FIG. 19A, in accordance with some embodiments. This configuration allows wireless control of valves 106 as an add-on to an existing modular irrigation controller system 100. The interface connector 2014 (sometimes referred to as a modular connector) is within the irrigation controller housing and couples to the ribbon cable 1816 from the control panel 1614 to the backplane of the irrigation controller, in the control path from the control panel to the station modules 1914. The interface connector 2012 is also connected to the CI 102 via a cable and connector. The CI is typically outside of the irrigation controller housing. The interface connector 2012 intercepts signals from the control panel destined for the modules, and passes signals associated with one or more valves to the CI.

No programming changes are needed at the control panel 1614. VT programming and/or mapping is defined through the user interface of the CI 102 associating relevant station numbers to either a wired station (wired valve) and/or a valve 106 (wireless VT attached to a valve). The VT programming is done at the CI 102. The CI has a simple user interface including a few buttons 222 and a small display 220.

Once mapped and in operation, signals from the control panel 1614 that are associated with mapped wirelessly controlled valves are passed to the CI 102 by the interface connector 2012 and processed by the CI. When the interface connector 2012 receives a control signal destined for any one of wired stations (e.g., 1-5 or 7), the interface connector 2012 allows that control signal to pass through to the appropriate module in response to instructions from the CI, and the module will activate the appropriate valve and irrigate the selected station. When the interface connector 2012 receives a control signal for one of wireless stations (i.e., 6 or 8-9), the interface connector 2012 sends a signal to the CI and the CI generates and transmits a wireless control signal to the corresponding VT 104 assigned to that station. The VT receives the signal, determines which valve to operate, and applies a pulse to a latching solenoid that opens the valve. Typically, when the irrigation controller 100 wants to stop irrigation, stop irrigation commands are sent from the control panel 1614 which are intercepted by the interface connector 2012 and transferred to the CI 102, which then sends a wireless signal with a stop irrigation command to the corresponding VT.

FIG. 21A shows a simplified diagram of a wireless irrigation control system 2110 in accordance with some embodiments. FIG. 21B shows a simplified perspective view of a CI 2102 of the irrigation system 2110 of FIG. 21A. FIG. 21C shows a simplified block diagram representation of the irrigation system 2110 of FIG. 21A. FIG. 21D shows a representation of wireless VT programming 2120 at the CI 2102 in accordance with some embodiments. Referring to FIGS. 21A-21D, the irrigation system 2110 includes an irrigation controller 100 with a control panel 1614, station output terminals 112, and a CI 2102 in wireless communication with one or more VTs 104 and/or sensors. In some embodiments, the irrigation controller 100 is a modular irrigation controller with station modules 1914 coupled with a backplane of the irrigation controller and including the station output terminal 112. Further, the station output terminals 112 may be connected to one or more valves 120.

The CI 2102 couples between the ribbon cable 1816, which couples with the control panel 1614, and the backplane of the irrigation controller 100. The CI includes one or more connectors 2114 to couple with the control panel 1614 and backplane. The CI 102 is positioned within the interior of the irrigation controller 100 and wirelessly communicates with the remote VTs 104. The control panel 1614 continues to output controls signals to the modules 1914 to cause them to send valve activation power signals on certain station wires. The signals from the control panel to the modules 1914 are received by the CI 2104. Again, there are no programming changes needed at the control panel 1614. Instead, the user defines the VT programming through a user interface 2116 of the CI 2102, which includes identifying at least those station numbers corresponding to wirelessly controlled valves, and in some instances defining each station number as either a wired valve or a wirelessly controlled valve 106 (e.g., stations 1-5 and 7 as wired stations, and assigns stations 6 and 8-9 as wireless stations, see FIG. 21D). In some instances, the user interface including a buttons 222 and a small display 220. Further, the user separately defines irrigation programs and/or schedules through the control panel 1614 or a separate computer or central controller in communication with the control panel.

Once mapped and in operation, when the CI 2102 receives a control signal destined for one of the wired stations (e.g., one of stations 1-5 or 7), the CI passes that control signal to the backplane to go the appropriate module 1914, and the module will issue a valve activation signal on the relevant output terminal to irrigate the selected station. When the CI receives a control signal for one of the stations associated with a wirelessly controlled valve 106 (e.g., one of stations 6 or 8-9), the CI transmits a wireless control signal to the corresponding VT 104 associated with the relevant valve. In some embodiments, the CI does not pass the signal to the backplane, and instead, simply transmits the wireless signal. In other embodiments, the CI may transmit the wireless signal while also passing the control signal to one or more modules to activate wired stations when appropriate.

In some embodiments, the CI 2102 can retrofit to an existing wired irrigation controller 100. For example, an original plastic backplane cover can be replaced with a new cover that can accept the CI with the CI connected to the ribbon cable from the control panel and to the backplane.

Figure 22:
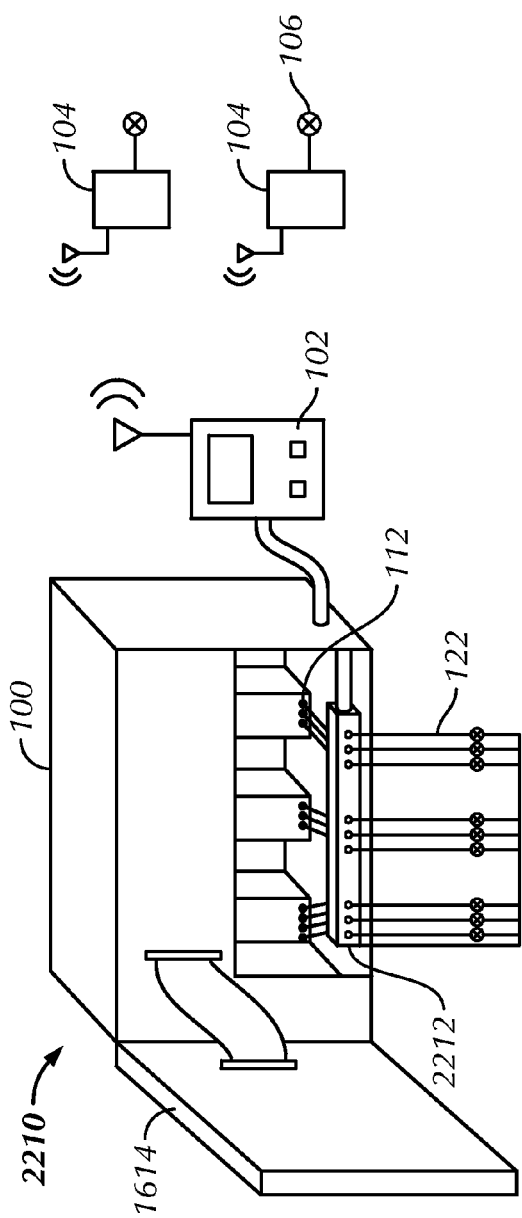
FIG. 22 illustrates an irrigation system, in accordance with some embodiments, providing a universal configuration.
Figure 23:
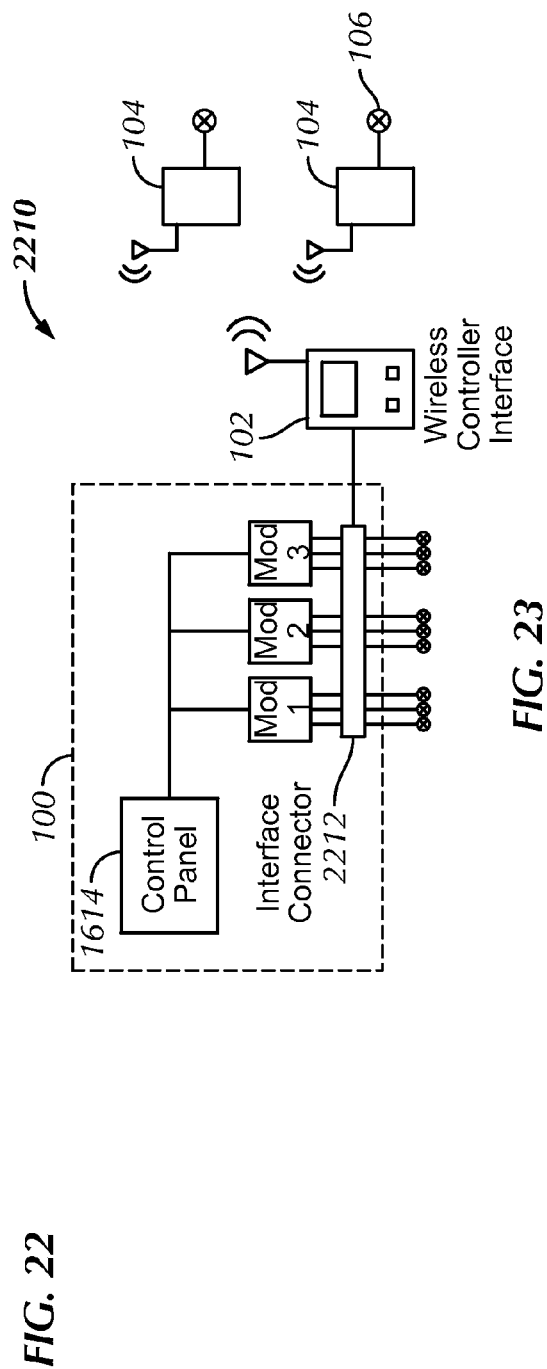
FIG. 23 shows a simplified block diagram representation of the irrigation system of FIG. 22.

FIG. 22 shows a simplified view of an irrigation system 2210, in accordance with some embodiments, providing a universal configuration to allow a CI 102 to cooperate with station output terminals 112 of substantially any relevant irrigation controller 100. FIG. 23 shows a simplified block diagram representation of the irrigation system 2210 of FIG. 22. Referring to FIGS. 22-23, in these embodiments an interface connector 2212 couples between the station output terminals 112 and the valve wires 122. In some embodiments, the interface connector 2212 is positioned within the housing of the irrigation controller. The CI 102 couples with the interface connector 2212.

The interface connector 2212 can couple with substantially any irrigation controller 100 and interrupts the signals from the station output terminals 112 (e.g., outputs from modules 1914). Again, no programming changes or special irrigation programming is needed at the control panel 1614. The user defines through the CI 102 the wireless VT programming identifying at least those station identifiers and/or station outputs with relevant valves 106 controlled by wireless VTs 104. As described above, in some implementations, the VT programming may further define each station output terminal as wired, wireless or in some instances both. In operation, the control panel 1614 sends irrigation activation commands and/or signals to station output terminals 112 and/or to one or more modules that in turn generate the activation signal on a given station output terminal. The interface connector 2212 intercepts these signals, and then signals the CI 102 that a given station identification is activated. The CI processes this signal and determines whether the station is associated with a valve 106 to be activated. If the station activated has been programmed as a wired station (e.g., one of wired stations 1-5 or 7 above), the CI sends signaling to the interface connector 2212 to allow the activation signal to pass therethrough and go to the appropriate valve. When the station activated has been defined as being associated with a wirelessly controlled valve or station (e.g., one of wireless stations 6, 8 or 9 above), the CI 102 sends signaling to the interface connector 2212 to not pass the activation signal to the valve, and instead, the CI 102 generates and transmits a wireless control signal to the corresponding VT 104 assigned to the relevant valve 106.

Further, when the station identifier is also associated with a wired valve 120 as well as associated with a wirelessly controlled valve 106, the CI allows the interface connector 2212 to pass the valve activation signal. The VT 104 receives the wireless signal, decodes it and activates the relevant valve (e.g., applying a pulse to a latching solenoid causing it to open the valve). In some implementations, the wireless activation signal sent from the CI 102 can be periodically retransmitted by the CI minute (e.g., every minute), until it is desired to stop irrigating.

Figure 24:
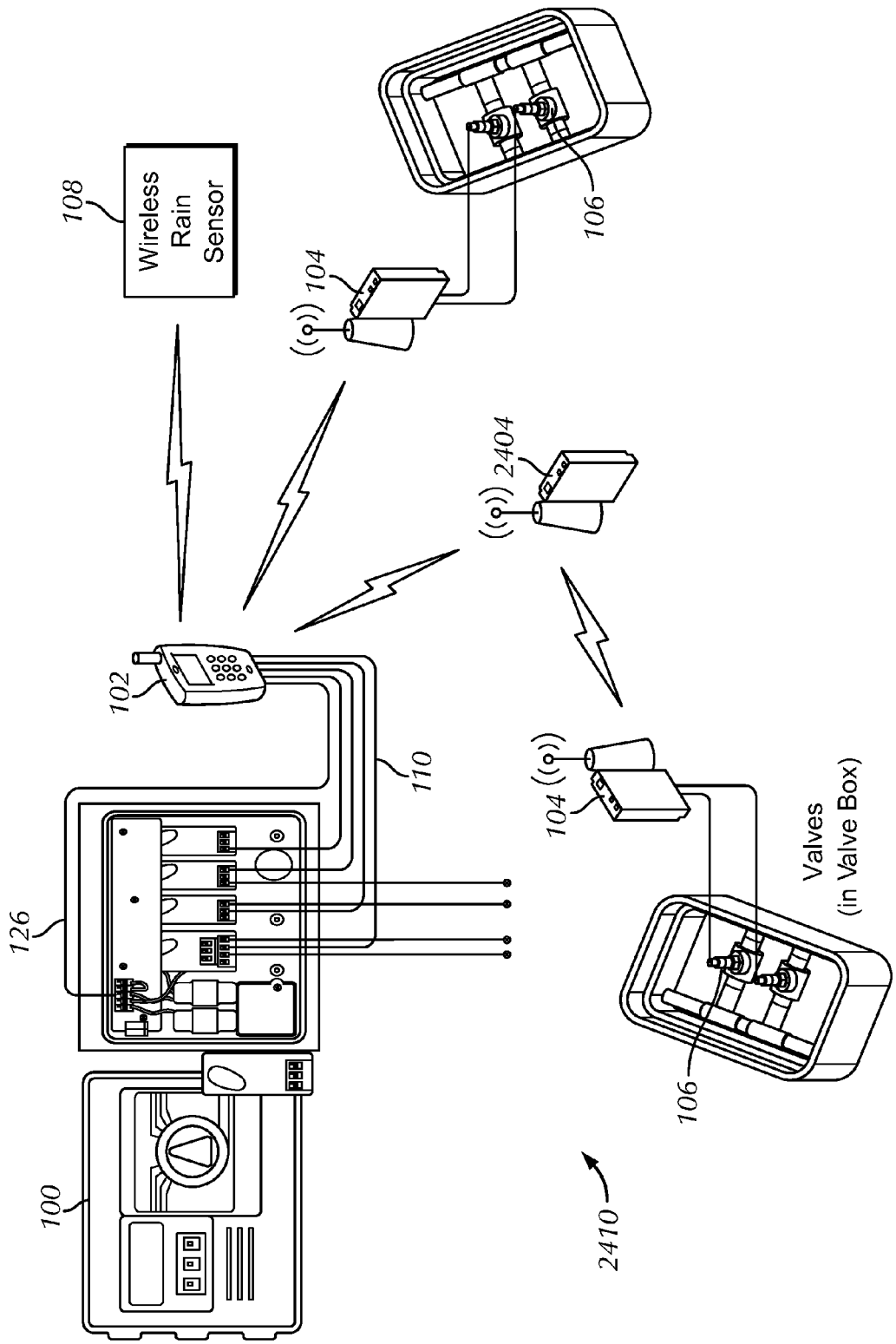
FIG. 24 shows a simplified block diagram of an irrigation system, in accordance with some embodiments, that is similar to the irrigation system of FIG. 1 and further includes one or more repeaters.

FIG. 24 shows a simplified block diagram of an irrigation system 2410, in accordance with some embodiments, that is similar to the irrigation system of FIG. 1 and further includes one or more repeaters 2404. The irrigation system 2410 includes an irrigation controller 100 with a CI 102 in communication with the irrigation controller. As with the other configurations, the CI identifies that wirelessly controlled valves 106 are to be activated and wirelessly transmits wireless activation signals to one or more VTs 104. In some implementations a VT may not be in wireless range and/or one or more obstructions may limit the signal strength and/or quality at a VT. Accordingly, some embodiments include one or more repeaters 2404 that receive the wireless activation signals and/or other communications and retransmit the signal. Similarly, the repeater 2404 can receive communications from the VTs and retransmits those to be received by at least the CI 102. Accordingly, the repeater 2404 extends the range of the CI to effectively communicate with remote VTs 104. Multiple repeaters can be included and provide a chain of repeated communications.

In some embodiments, the repeater 2404 can be simply a repeater that receives and retransmits communications. In other embodiments, the repeater 2404 may be a VT that not only retransmits communications but can activate one or more valves 106 and effectively communicate with the CI 102. It is noted that the embodiment depicted in FIG. 23 shows a universal configuration to allow a CI 102 to cooperate with station output terminals 112 of substantially any relevant irrigation controller 100. The repeater 2404, however, can be used with any CI 102 in any configuration.

Figure 28:
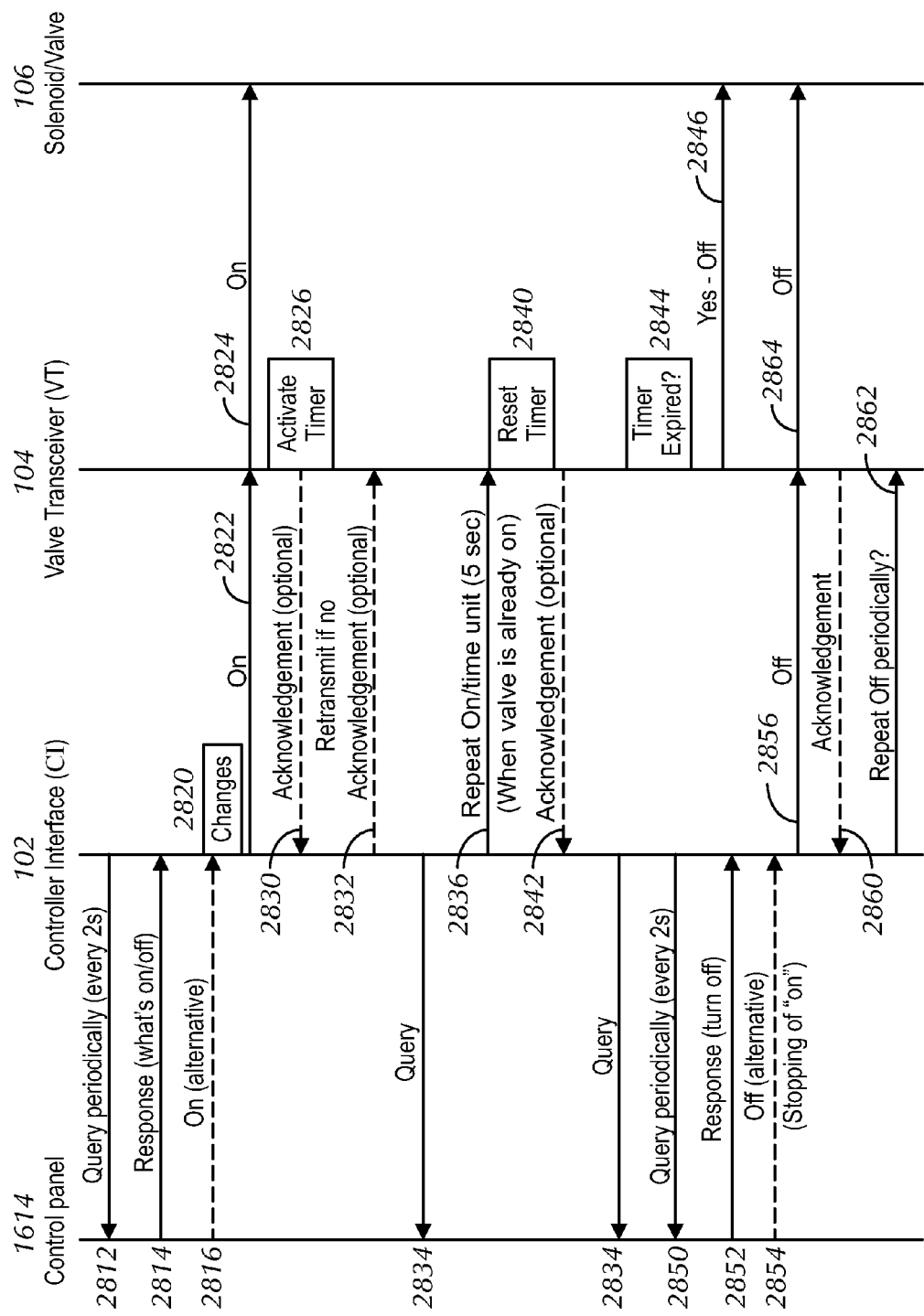
FIG. 28 depicts a simplified graphic representation of communication protocol between components of an irrigation system with a controller interface configured in a modular or all wireless configuration, in accordance with some embodiments.

FIG. 28 depicts a simplified graphic representation of communication protocol between components of an irrigation system with a CI 102 configured in a modular or all wireless configuration, such as the system of FIGS. 16-21 and other such configurations, in accordance with some embodiments. At step 2812, a CI 102 queries the control panel 1614 (or other control structure of the irrigation controller) requesting the current irrigation status information. These queries may be repeated by the CI. For example, the CI can issue a query to the control panel every two (2) seconds. Other time durations may be used depending on a desired accuracy, processing requirements, and other such factors. The control panel 1614 responds to the query at step 2814 delivering irrigation state or status information to the CI. In some embodiments, the status information includes a listing of all the station identifiers the control panel 1614 believes are currently activated. As described above, in many embodiments, the control panel is unaware that a wired valve 120 may not even be connected with the irrigation controller. Further, in some embodiments, the status information may also identify those station identifiers that according to the control panel 1614 are turned off or in an off state. Other information may also be included. In an alternative implementation, the control panel 1614 issues a specific valve activation or on signal in optional step 2816. The valve activation signal may be issued in response to the query of step 2812, or may be issued as a result of the irrigation programming and/or schedule dictating the activation of a valve.

In an optional step 2820, the CI 102 evaluates the status information to determine whether there are changes from a previous status information. When the CI is to activate one or more valves 106, the CI transmits one or more wireless activation or "on" signals in step 2822. In some embodiments, the CI 102 transmits one or more specific valve activation signals addressed to one or more specific VTs identified by the CI through the VT programming at the CI. In other embodiments, the CI 102 broadcasts valve activation signal that is in the form of and/or comprises a wireless activation listing that identifies the status or state of each valve controlled through the CI 102. For example, the wireless activation listing can include a series of bits with each bit being associated with each valve 106 controlled through the CI, where a bit set with a one (1) indicates a valve "on" state or set to a zero (0) indicates a valve "off" state (or vise versa). In these configurations, the CI 102 previously provides each VT 104 with at least a portion of the VT programming relevant to the VT and identifies the relevant bits in the wireless activation listing corresponding to each valve 106 activated by the VT. Further, in some embodiments, the CI evaluates the status information received in the response to the query to identify the states associated with station identifiers, and uses the VT programming to identify the wirelessly controlled valves 106 associated with the station identifiers in order to accurately configure the activation listing and set the bits accordingly.

In step 2824, the VT 104 activates the solenoid to open the relevant wirelessly controlled valve 106 in response to the wireless activation signal received in step 2822 (or in response to identifying from the activation listing that the valve should be in an "on" state). In step 2826, the VT further activates a counter 518 and/or timer 520 in response to the wireless activation signal and/or determination that a valve is to be activated. As described above, in some embodiments, when the counter 518 is at zero when the wireless activation signal is received, the VT sends a signal to the valve solenoid 512 to turn on a corresponding valve 106. The valve will continue to remain on until a timer expires and/or a timer 520 decrements the count in a counter 518 to zero, at which time a signal is sent to the valve solenoid 512 to turn the valve off. When a wireless activation signal is received and the counter 518 is not at zero, it is assumed that the valve is already on and no signal is sent to the valve solenoid. In this case, regardless of the count, the counter 518 is set back to the predetermined time interval (e.g., 8 minutes). The counter value continues to decrement when irrigation is on. By using the counter 518 and/or timer 20 with the VT 104 can automatically turn off a valve when the counter decrements to zero or a predetermined time interval expires, a fail-safe is provided to automatically turn off irrigation when there is a loss of communication from the CI 102 to the VT 104.

In some embodiments, the VT 104 may optionally issue an acknowledgement back to the CI 102 in step 2830. Similarly, the CI 102 may retransmit the wireless activation signal and/or activation listing in step 2832 when an acknowledgement is not received from the VT 104. In some embodiments the query 2812 or a separate query 2834 can be periodically sent and/or repeated.

In some embodiments, the CI 102 periodically retransmits the wireless activation signal in step 2836. In step 2840, the VT 104, in response to receiving the repeated wireless activation signal, resets the counter 518 and/or a timer. This allows the VT to maintain the valve 106 in an on state for more than a predefined time interval (e.g., 8 minutes) defined by the counter 518 or other timer. For example, in some embodiments, the wireless activation signal sent from the CI 102 is repeated every minute, until the CI receives a stop or shutoff signal from the control panel 1614 indicating a desire to stop irrigating. The VT 104 is configured to irrigate until it stops receiving the periodic wireless activation signals and/or it receives a valve shutoff signal. In optional step 2842, the VT may also wirelessly transmit an acknowledgement. In step 2844, the VT 104 continues to monitor the counter 518 and determines whether the counter reached zero or threshold time period expire. When the counter has counted down, the VT in step 2846 issues an irrigation shutoff command to the solenoid.

Again, the status query from the CI 102 to the control panel 1614 may be periodically sent. Steps 2850 show the representation that the query from the CI is periodically transmitted to the control panel 1614. In step 2852, the control panel responds to the query. Again, the query may identify that a valve 106 that was previously on should be shut off, or the wireless activation listing or other listing may designate that a valve should be in an off state. Alternatively, in step 2854, the control panel 1614 can communicate an irrigation off signal and/or stop asserting a valve activation signal that is detected by the CI.

In step 2856, the CI 102 detects the off or change of status and transmits a wireless shutoff signal, or broadcast status information to the VTs 104. In step 2860, the VT may optionally send an acknowledgement. Similarly, in step 2862 the CI 102 may retransmit the wireless shutoff when an acknowledgement is not received (e.g., within a threshold period of time). In step 2864, the VT 104, in response to receiving the wireless shutoff signal and/or in determining from the broadcast status information that the valve is to be shut off, issues a shutoff command to the solenoid 512.

Figure 29:
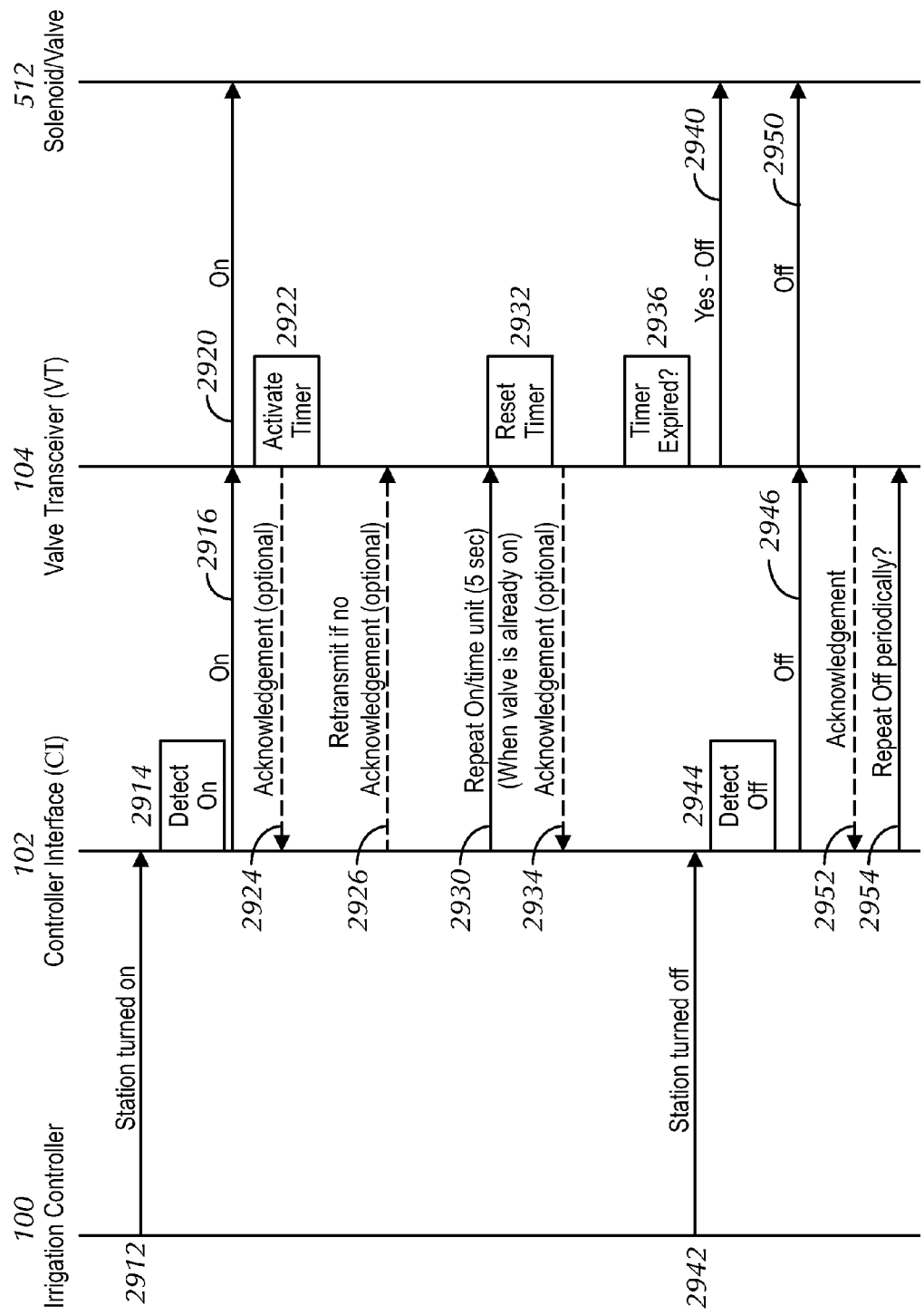
FIG. 29 depicts a simplified graphic representation of communication protocol between components of an irrigation system with a controller interface configured in a universal configuration, in accordance with some embodiments.

FIG. 29 depicts a simplified graphic representation of communication protocol between components of an irrigation system with a CI 102 configured in a universal configuration, such as the system of FIGS. 1, 14-16, and 22-23 and other such configurations, in accordance with some embodiments. In step 2912, the irrigation controller 100 activates a station output terminal 112. In step 2914, the CI 102 detects the station activation signal on the station output terminal. In step 2916, the CI uses the VT programming to determine which one or valves are to be activated in response to the valve activation signal, identifies the corresponding one or more VTs, and transmits a wireless activation signal to the one or more VTs. In step 2920, each of the VTs activates the solenoid to turn on the relevant one or more valves. It is noted that in some implementations the VT may periodically transition to a sleep state to save power. Accordingly, the CI 102 may transmit the valve activation signal for a period of time or repeat the signal multiple times. In step 2922, the VT further activates a counter and/or timer. In some embodiments, the VT 104 optionally further transmits an acknowledgement back to the CI 102 in step 2924. Further, the CI 102 may retransmit the wireless activation signal in step 2926 when an acknowledgement is not received.

In some embodiments, the CI in step 2930 may periodically repeat the wireless activation signal. In step 2932, the VT 104, in response to receiving the wireless activation signal while the counter is actively counting with respect to at least a specific valve 106, resets the counter 518 and/or a timer. This allows the VT to maintain the valve 106 in an on state for more than a predefined time interval (e.g., 8 minutes) defined by the counter 518 or other timer. In optional step 2934, the VT may also wirelessly transmit an acknowledgement. In step 2936, the VT 104 continues to monitor the counter 518 and determines whether the counter reached zero or threshold time period expire. When the counter has counted down, the VT in step 2940 issues an irrigation shutoff command to the solenoid.

Typically, however, the irrigation controller 100, in step 2942, turns off the valve activation and/or stops powering the station output terminals. In step 2944, the CI 102 detects the change in state at the station output terminal. In step 2946, the CI 102 transmits a wireless shutoff signal, or broadcasts status information to the VTs 104. In step 2950, the VT 104 issues a shutoff command to the solenoid 512. In some embodiments, the VT 104, in optional step 2952, may send an acknowledgement. Similarly, in step 2954, the CI 102 may retransmit the wireless shutoff when an acknowledgement is not received (e.g., within a threshold period of time).

As described above, the CI 102 is cooperated with an irrigation controller 100 to allow control of additional valves 106 in accordance with an irrigation schedule and/or programming implemented by the irrigation controller. In some embodiments, the irrigation program and/or schedule continues to be defined by the user through the user interface of the control panel 1614 of the irrigation controller 100. The CI 102 provides an additional and separate user interface that the user utilizes to separately define the VT programming used by the separate CI 102 coupled with the irrigation controller to wirelessly transmit wireless activation signals to VTs 104. Accordingly, in some embodiments the control panel 1614 of the irrigation controller 100 is unaware that the CI 102 is wirelessly activating valves 106, and the control panel continues to issue valve activation signals in accordance with the irrigation program and/or schedule as though the CI 102 was not coupled with the irrigation controller and as though the control panel is activating valves coupled with the station output terminals 112.

Generally referring to FIGS. 30-34, embodiments are described in which a peripheral device (e.g., devices such as controller interfaces (CIs) 102, handheld remote controls or other peripheral devices) can be coupled to and cooperate with and/or function with an irrigation controller that controls watering at one or more sprinkler devices. In some embodiments, the peripheral can be coupled to a variety of different models and/or makes of irrigation controllers and can supplement or effect operation of the irrigation control system. In some embodiments, the peripheral is configured to query the irrigation controller for information useful in performing the functionality of the peripheral. In some embodiments, the information queried includes one or more of: the make/manufacturer of the irrigation controller; the model of the irrigation controller; the type of control offered by the controller (e.g., time-based control, weather-based control and so on); the capabilities of the controller; the number of irrigation stations controlled by the controller; information indicating when the controller has activated or deactivated a given station; which stations are currently active (which stations are irrigating or not); irrigation schedule or program data stored by and/or executed by the irrigation controller; whether the irrigation controller is coupled to and under partial or full control by a central control computer system, and so on. These examples are provided for illustrative purposes and it is understood that additional information may be queried by the peripheral and provided to the peripheral by the irrigation controller. Upon receiving the queried information from the controller, the peripheral takes some action. Examples of such action taken include: selecting from pre-stored sets of peripheral functions that correspond to the make, model, capabilities of the irrigation controller; copying the information to internal memory; interrupting irrigation; allowing users to map irrigation controller stations to additional wireless stations controlled by the peripheral; allow the user to program the peripheral with information to compliment the programming at the irrigation controller, and so on. Again, it is understood that additional actions may be taken by the peripheral based on the received information responsive to the query.

Figure 30:
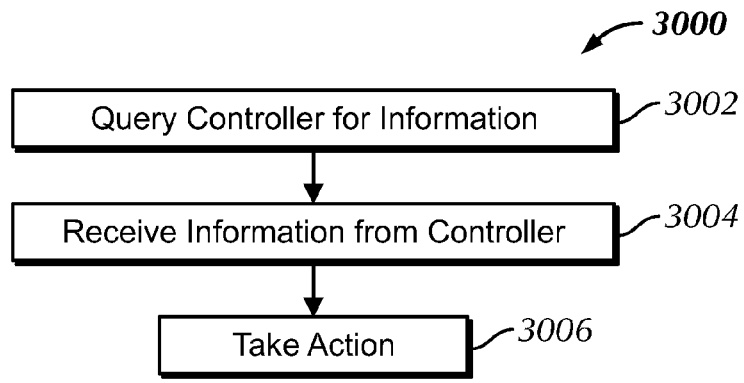
FIG. 30 is a flowchart of steps performed, for example by a peripheral interacting with an irrigation controller, for example, such as described in one or more of FIGS. 31-34 according to some embodiments.

FIG. 30 illustrates a general flowchart of steps performed, for example by a peripheral interacting with an irrigation controller, for example, such as described in one or more of FIGS. 31-34 according to some embodiments. Before referring to the method, the devices of FIGS. 31-34 are first described.

FIG. 31 illustrates a block diagram of an irrigation control system 3100 in which a peripheral device 3102 is coupled to (e.g., via wireline connection 3106) and cooperates with an irrigation controller 3104 according to some embodiments. FIG. 32 illustrates a block diagram of an irrigation control system 3200 in which a peripheral device 3202 is wirelessly coupled to a receiver unit 3204 coupled to the irrigation controller 3104 (via wireline connection 3106) such that the peripheral 3202 cooperates with the irrigation controller 3104 according to some embodiments. It is noted that the combination of the peripheral 3202 and the receiver 3204 is an alternative of the peripheral 3102 of FIG. 31.

Figure 33:
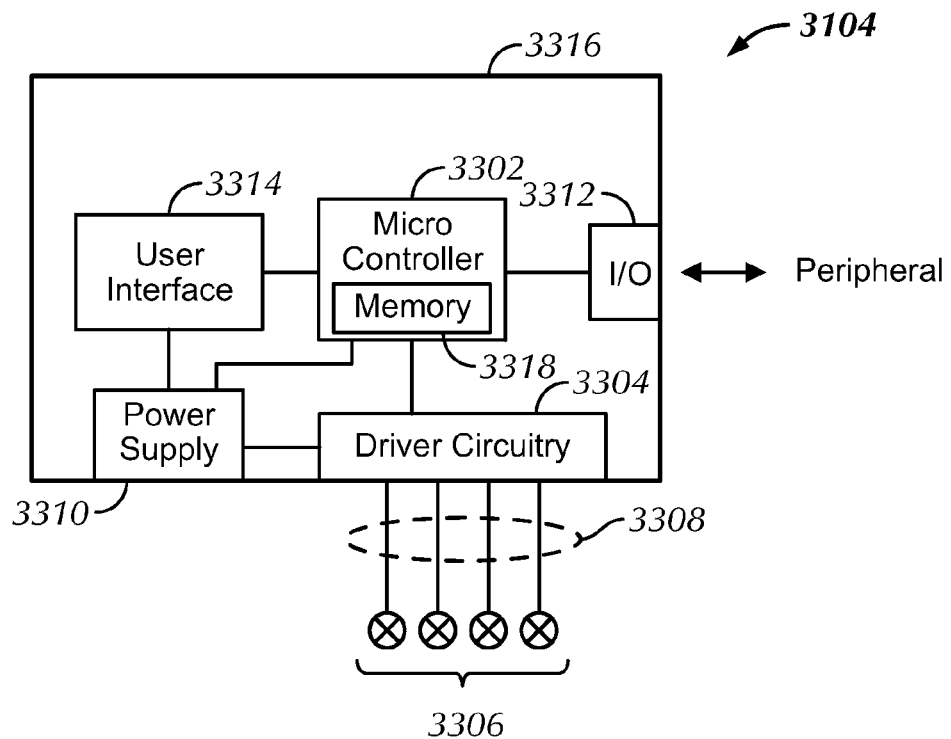
FIG. 33 is a functional block diagram of one embodiment of the irrigation controller of FIGS. 31 and 32.

FIG. 33 is a functional block diagram of one embodiment of the irrigation controller 3104 of FIGS. 31 and 32. The irrigation controller 3104 is a typical irrigation controller such as those described herein. For example, the controller 3104 includes a housing 3316 containing a microcontroller 3302 (also referred to as a control unit 3302) including a processor and memory 3318, driver circuitry 3304, a power supply 3310, and a user interface 3314. In operation, in some embodiments, the user manipulates the user interface 3314 to program the controller. For example, the interface 3314 includes a display screen and one or more dials, buttons, switches, etc. to allow the user to enter schedules, programs, and other data. In some embodiments, the controller 3104 is coupled to and is partially or fully controlled by a central control computer system (not shown). In some embodiments, the microcontroller 3302 stores and executes the irrigation schedules and/or programs. In other embodiments, the microcontroller receives schedules or command from the central control computer and/or from manual user commands at the user interface 3314. In a typical controller, the microcontroller 3302 uses the driver circuitry 3304 to selectively switch power (e.g., 24 VAC) from the power supply 3310 to the appropriate activation control line 3308. Each line 3308 is coupled to a given valve 3306. When power is applied to a given line 3308, the valve is activated to open, allowing water to flow therethrough to one or more sprinkler or watering devices. In this illustrated example, the controller 3104 is a 4-station (or zone) controller since it has 4 activation lines 3308 to control 4 stations (or zones).

Also illustrated, the controller 3104 includes a communication port 3312 that allows for communications to and from an external device, such as peripherals 3102, 3202 and other peripherals, such as the various controller interfaces (CIs) described herein.

Figure 34:
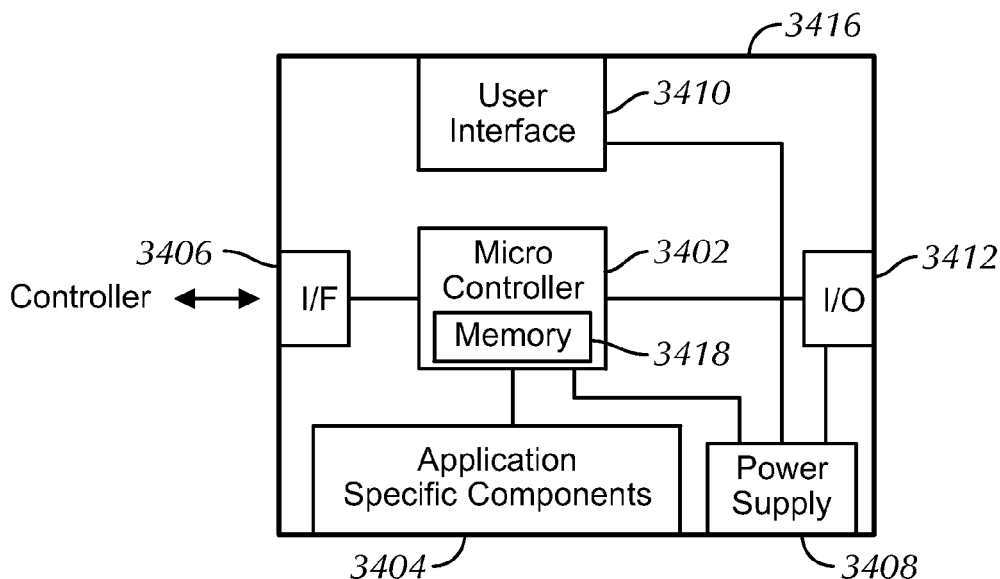
FIG. 34 is a functional block diagram of one embodiment of the peripheral of FIGS. 31 and 32.

FIG. 34 illustrates a functional block diagram of one embodiment of the peripheral of FIGS. 31 and 32. The peripheral 3102 includes a housing 3416 containing a microcontroller 3402 (also referred to as a control unit 3402) including a processor and memory 3418, an optional power supply 3408, a user interface 3410, a communication interface 3406, an external interface 3412 and any application specific components 3404. It is noted that when referring to the peripheral of FIG. 34, reference numeral 3102 will be used although it is understood that reference may also be made to the peripheral 3202. In operation, in some embodiments, the user can manipulate the user interface 3410 to program the peripheral, send commands to the controller 3104, read data stored in the peripheral 3102 and/or controller 3104, for example, depending on the functionality of the peripheral. In some examples, the peripheral 3102/3202 functions similar to the various CIs described herein such that the interface 3410 includes a display screen and one or more dials, buttons, switches, etc. to allow the user to program wireless stations, e.g., that correspond to one or more wired stations 3306 of the controller. The microcontroller 3402 controls the operation of the peripheral. The communication interface 3406 provides a port or connection to the irrigation controller 3104. In the event of a wireline connection to the controller, the communication interface 3406 allows for the wireline connection 3106 to the controller 3104. In the event of a wireless connection (i.e., peripheral 3202), the communication interface 3406 includes a wireless transceiver to communicate with a wireless transceiver at base 3204. The base translates signaling to and from the irrigation controller 3104. The power supply 3408 is optional depending on the peripheral. For example, in some embodiments, the peripheral receives operational power from the irrigation controller 3104 via the wireline connection 3106. In other embodiments, the peripheral includes its own power supply 3408. Depending on the functionality of the peripheral, an external interface 3412 is provided. For example, when the peripheral 3102/3202 functions similar to the CIs 102, 2102 described herein, the external interface 3412 includes a wireless transceiver, e.g., to communicate with valve transceivers (VT) 104, such as described in more detail throughout this specification. Additionally, there may be further functional components of the peripheral depending on its functionality, e.g., illustrated as the application specific components 3404. Such components 3404 may include sensors, additional memory, additional wireless devices, pagers, cutoff switches (e.g., to bypass or interrupt an activation line 3308 or common line), and so on.

Generally, the irrigation controller 3104 is a typical stand-alone irrigation controller configured to operate without the assistance of the peripheral 3102, 3202. However, the controller 3104 is configured to receive commands or queries for information from remote devices coupled to its communication port 3312, and output the requested information. In some embodiments, this port 3312 allows for 2 way data communications using a defined communication protocol known to the controller 3104 and any peripherals coupled thereto. The port may be any standard or proprietary type of data port that allows for the two way flow of information.

Concurrent reference is now made to FIG. 30, which shows a flowchart of steps performed, for example by the peripheral interacting with the irrigation controller of one or more of FIGS. 31-34, according to some embodiments. Once the peripheral device (e.g., peripherals 3102, 3202, CIs 102, 2102) is coupled to the controller 3104, the peripheral queries the controller for information (Step 3002). The query may be a one-time request for information or may be periodic such that the query is repeated at an interval, e.g., a status query. The specific type of requested information depends on the functionality of the peripheral. For example, in some embodiments, the information queried includes one or more of: the make/manufacturer of the irrigation controller; the model of the irrigation controller; the type of control offered by the controller (e.g., time-based control, weather-based control and so on); the capabilities of the controller; the number of irrigation stations controlled by the controller; information indicating when the controller has activated or deactivated a given station; which stations are currently active (which stations are irrigating or not); irrigation schedule or program data stored by and/or executed by the irrigation controller; whether the irrigation controller is coupled to and under partial or full control by a central control computer system, and so on. These examples are provided for illustration and it is understood that additional information may be queried by the peripheral and provided to the peripheral by the irrigation controller.

In some embodiments, the query is transmitted to the controller (e.g., via the port 3312). The microcontroller 3302 processes the query and responds with the requested information. The response is transmitted back to the peripheral (e.g., via the 3312). The peripheral receives the requested information from the controller (Step 3004) and takes the appropriate action (Step 3006). In one example, upon learning one or more of the make, model, capabilities of the controller 3104, the peripheral selects a given set of functions from several pre-stored sets of functions stored in the peripheral memory 3418, the selected set corresponding to the make, model, capabilities of the controller. That is, the peripheral includes several different function sets stored in memory, each that correspond to one or more different controller models and that correspond to the functions or features provided by the controller (or not provided by the controller to the extent the peripheral will supplement the controller with additional features not present in the programming of the controller). In this way, the functions of (and user programmability of) the peripheral can be tailored to and variable depending on the controller to which it is connected. In this way, the peripheral may function as a universal peripheral that can interact with multiple different irrigation controllers of different makes, models and capabilities. In a simple example where the requested information indicates that the controller is a 4 station controller (as opposed to a 6 or 8 station controller), the displayed user interface and menu options of the peripheral will only reflect 4 stations. Furthermore, if the given controller is a time-based or weather-based controller, the function set of the peripheral and/or the user interface programming options will vary with the functions of the controller (e.g., allowing the user to enter time based schedule adjustments at the peripheral, or enter or adjust crop coefficients or other weather based data at the peripheral). In a further example, if the requested information indicates that the controller has a seasonal adjust feature (or rain delay feature or other feature), the peripheral may present the user with the ability to change the seasonal adjust (or other) value at the controller by interacting with the peripheral. For example, the user interface of the peripheral presents an option to change the seasonal adjust value to the user via the user interface 3410. Once adjusted at the peripheral, the peripheral then sends a signal to the controller 3104 causing the controller to change the programmed seasonal adjust value. Thus, in some embodiments, the peripheral can function as a remote control device whose functionality changes to match that of the controller 3104 it is coupled to. Such a remote control may be useful to view information stored at the controller, or to command or adjust the controller. For example, the peripheral may be used to change programming at the controller or initiate a manual watering event or program, suspend irrigation, enter local site information into the controller. While this may be done at the controller, it may be more convenient for the user to utilize the peripheral for such actions. This may be a matter of convenience for a contractor who interacts with several different model irrigation controllers but may be more familiar with the menu options as presented in the user interface 3410 of the peripheral relative to the user interface 3314 of the controller 3104.

In some embodiments, when the peripheral is similar to several of the CIs 102 described herein, the requested information may include how many stations are controlled by the controller or can be controlled by the controller. When receiving this information, the peripheral stores the information and alters the menus and user interface options to the peripheral user. For example, if the peripheral is used to map a wired station controlled by the irrigation controller to a wireless station controlled by the peripheral, the user can only map wireless stations to existing wired stations. In another example, when queried for which stations are currently running, the peripheral can use this information to send wireless on or off signals to the remote VTs mapped to those stations that are on or no longer on. This is not meant to be an exhaustive list of all actions that may be taken by the peripheral. The peripheral can take any of the actions described herein and otherwise based on information requested from the controller.

In some embodiments, the peripheral 3102, 3202 is located nearby in the vicinity of the controller. In some cases, the peripheral can be mounted within the housing of the controller (e.g., see the device of FIG. 17). It is noted that in some embodiments, the controller 3104 is a fully functioning controller that is capable of executing irrigation according to one or more watering schedules. That is, the controller 3104 may be fully controlled via its user interface 3314 or via connection to a central control computer coupled to the controller 3104 via a local or wide area network.

Accordingly, in some embodiments, a peripheral is provided for use in irrigation control, the peripheral comprising a housing and a control unit comprising a processor and a memory. The control unit is configured to query an external irrigation controller for information, receive the information from the irrigation controller and take action. In some embodiments, a peripheral is provided for use in irrigation control, the peripheral comprising a housing and a control unit comprising a processor and a memory, wherein the control unit is configured to periodically query an external irrigation controller for status information, the status information indicating which irrigation stations controlled by the irrigation controller are currently irrigating and currently not irrigating, receive the status information from the irrigation controller, and transmit one or both of a wireless activation and a wireless deactivation signal to one or more remote VTs that each control one or more remote irrigation stations not coupled by wireline to the irrigation controller. In some embodiments, a peripheral is provided for use in irrigation control, the peripheral comprising a housing and a control unit comprising a processor and a memory, wherein the control unit is configured to query an external irrigation controller for information corresponding to capabilities of the external irrigation controller, receive the information from the irrigation controller, and select one of a plurality of stored peripheral function sets from the memory, the selected peripheral function set causing the peripheral to function in a manner corresponding to at least one function available at the external irrigation controller. For example, the peripheral will operate in accordance with the selected peripheral function set, which can result in controller specific user displays and menus, controller specific commands, additional functions not present in the abilities of the controller, for example.

Additionally, some embodiments provide apparatuses for use in implementing irrigation. For example, the apparatus can comprise a wireless receiver of a valve transceiver (VT) located remotely from a transmitter unit, wherein the wireless receiver is configured to receive wireless activation signals wirelessly transmitted from the transmitter unit in accordance with an irrigation program; a processor of the VT coupled with the wireless receiver, wherein the processor is configured to process the received wireless activation signals and in response activate an actuator in communication with the processor such that the actuator activates an actuatable device; and a beeper of the VT coupled with the processor; wherein the wireless receiver is further configured to receive an alert activation signal from the transmitter unit in response to a status parameter having a predefined relationship with a threshold; and wherein the process is further configured to activate the beeper in response to the beeper activation signal to generate an audible sound.

Further, in some implementations, the apparatus further comprises a counter wherein control logic of the processor is configured to set the counter to a predefined interval in response to receiving each wireless activation signal and indicating a valve-on state; and a timer, wherein the timer decrements the counter; wherein the control logic is configured to inspects the value of the counter and issue a valve shutoff command to the actuator when the counter is decremented to a predefined count. In some embodiments, the wireless receiver is configured to receive a wireless shutoff signal wirelessly transmitted from the transmitter unit in accordance with the irrigation program; and the control logic is configured to set the counter to the predefined count and to cause a valve shutoff command be forwarded to the actuator. Further, the processor can be configured not to store information from the valve activation signals and sets the counter to the predefined interval in response to receiving the wireless activation signals. In some embodiments, the beeper is positioned proximate an aperture sealed from the environment with a moisture resistant membrane and sealing ring.

Many of the functional units described in this specification have been labeled as devices, modules or systems, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as merely electronic signals on a system or network.

While the invention herein disclosed has been described by means of specific embodiments, examples and applications thereof, numerous modifications and variations could be made thereto by those skilled in the art without departing from the scope of the invention set forth in any claims supported by this specification.

What is claimed is:

1. An irrigation system, comprising:
   a connector of a controller interface (CI) coupled with an irrigation controller, wherein the connector is configured to receive a valve activation signal activated by the irrigation controller;
   a user interface of the CI;
   a processor of the CI coupled with the connector and the user interface, wherein the processor is configured to obtain valve transceiver (VT) programming with at least a portion of the VT programming being received from inputs by a user through the user interface of the CI, determine a station identifier as a function of the valve activation signal, and identify as defined in the VT programming a remote valve associated with the station identifier of the irrigation controller and controlled by a remote VT; and
   a wireless transceiver coupled with the processor and configured to wirelessly transmit a wireless activation signal configured to be wirelessly received by the VT controlling the valve associated by the VT programming with the station identifier such that the VT is configured to control an actuator to actuate the valve.

2. The irrigation system of claim 1, wherein the processor in obtaining the VT programming is configured to associate the VT with the valve controlled by the VT and associated with the station identifier designated by the valve activation signal.

3. The irrigation system of claim 1, wherein the processor is further configured communicate a query to the irrigation controller, wherein the connector in receiving the valve activation signal activated by the irrigation controller is configured to receive a response to the query, and wherein the processor determines the station identifier from the response to the query.

4. The irrigation system of claim 1, wherein the processor is configured to receive, from the inputs through the user interface, direction information as part of the VT programming, wherein the direction information identifies a designated geographic direction from a location of the CI toward the VT with which the VT programming information is associated.

5. The irrigation system of claim 1, wherein the processor is configured to evaluate the valve activation signal received from the irrigation controller to identify the station identifier, identify as a function of the valve activation signal and the station identifier the valve to be activated in accordance with the valve activation signal, identify the VT corresponding to the valve to be activated, and activate the wireless transceiver to wirelessly transmit the wireless activation signal in response to identifying the VT to activate the corresponding one or more identified remote valves.

6. The irrigation system of claim 1, wherein the connector comprises a plurality of station input terminals configured to couple with station output terminals of the irrigation controller intended to be directly wired with a valve actuator such that the valve activation signal when applied to a station output terminal in accordance with an irrigation schedule implemented by the irrigation controller is received at a corresponding station input terminal, and wherein the processor is configured to associate in the VT programming the input terminal with the valve to be activated upon detecting a valve activation signal on the input terminal.

7. The irrigation system of claim 1, wherein the connector is configured to couple with a communication port of a control panel of the irrigation controller to receive the valve activation signals directly from the control panel.

8. The irrigation system of claim 1, wherein the processor of the CI is further configured to receive sensor data from a remote sensor, determine whether a threshold associated with the sensor data is exceeded and interrupt irrigation from the one or more valves controlled by the VT when the threshold associated with the sensor data is exceeded.

9. The irrigation system of claim 8, wherein the processor of the CI is further configured to interrupt all irrigation associated with the irrigation controller for at least a predefined period of time in response to determining that the threshold associated with the sensor data is exceeded.

10. The irrigation system of claim 1, wherein the processor is configured to obtain the remote VT programming independent of programming of the irrigation program at the irrigation controller.

11. The irrigation system of claim 1, wherein the wireless transceiver is configured to receive status information from the VT regarding a parameter of the VT; and
the processor is further configured to determine whether the status information has a predefined relationship with a corresponding status threshold, and cause a beeper command to be wirelessly communicated to the VT to generate an audible alert in response to determining that the status information has the predefined relationship with a corresponding status threshold.

12. The irrigation system of claim 1, further comprising:
a main circuit board of the CI, the main circuit board comprising the processor and an interface board connector, wherein the interface board connector is configured to interchangeably connect the main board with one of multiple different interface boards having the connector, wherein the connector is different on the different interface boards to allow the CI to be implemented in different configurations.

13. A method of irrigating, comprising:
receiving, at a connector of a controller interface (CI) coupled with an irrigation controller, a valve activation signal activated by the irrigation controller, wherein the valve activation signal corresponds to a station identifier programmed at the irrigation controller;
identifying, at a processor of the CI, a remote valve associated with the station identifier as defined at the CI in valve transceiver (VT) programming wherein at least a portion of the VT programming is received from inputs by a user through a user interface of the CI coupled with the processor, wherein the VT programming associates the station identifier with the remote valve controlled by an associated VT; and
wirelessly transmitting a wireless activation signal to the associated VT, wherein the associated VT is configured to control an actuator to actuate the remote valve.

14. The method of claim 13, wherein the obtaining the VT programming comprises associating the VT with the station identifier and a valve designation corresponding to the valve controlled by the VT.

15. The method of claim 14, wherein the obtaining the VT programming comprises:
receiving, from the inputs by the user through the user interface, the station identifier of the irrigation controller; and
associating the station identifier with a valve designation corresponding to the valve controlled by the VT as part of the remote VT programming.

16. The method of claim 14, wherein the obtaining the VT programming comprises:
receiving, from the inputs through the user interface, direction information representing a designated geographic direction toward the VT with which the remote VT programming information is associated; and
associating the direction information with a VT identifier.

17. The method of claim 13, further comprising:
querying, from the CI, the irrigation controller; and
wherein the receiving the valve activation signal comprises receiving, at the CI, a response to the query from the irrigation controller and identifying from the response the station identifier.

18. The method of claim 17, wherein the response comprises status information indicating a valve with an on status corresponding to the station identifier;
wherein the identifying the remote valve associated with the station identifier comprises evaluating, at the CI, the status information to identify the station identifier.

19. The method of claim 18, wherein the wirelessly transmitting the wireless activation signal comprises broadcasting the wireless activation signal comprising an activation listing that identifies a state of multiple valves controlled through the CI including the on state of the valve associated with the station identifier.

20. The method of claim 13, wherein the identifying the remote valve comprises:
identifying an input terminal of the CI that couples with a station output terminal of the irrigation controller and through which the valve activation signal is received; and
identifying the valve associated with the input terminal and through which the valve activation signal is received.

21. The method of claim 13, wherein the identifying the one or more remote valve comprises:
receiving the valve activation signal through the connector coupled with a communication port of a control panel of the irrigation controller; and
evaluating in the CI the valve activation signal to identify the station identifier specified in accordance with the valve activation signal and the valve as defined in the VT programming associated with the station identifier.

22. A method of controlling irrigation, comprising:
identifying, at a controller interface (CI) coupled with an irrigation controller, a remote valve transceiver (VT), wherein the CI is separate from the VT and the CI is configured to wirelessly communicate wireless activation signals to the VT;
displaying, on a display of the CI, an identification of the VT; and
displaying, on the display of the CI, a valve station designator corresponding to a valve controlled by the VT.

23. The method of claim 22, further comprising:
receiving a station number through a user interface of the CI that is separate from the irrigation controller, wherein the station number is consistent with a station number defined within an irrigation program stored in and implemented by the irrigation controller; and
associating, at the CI, the station number according to the irrigation program with the valve station designator.

24. The method of claim 22, wherein the displaying the valve station designator comprises displaying the valve station designator corresponding to an input terminal of the CI with which a user is to couple with a station output terminal of the irrigation controller, the station output terminal corresponding to a station defined within the irrigation program to be activated when the irrigation controller issues a station activation signal on the station output terminal in accordance with the irrigation program.

25. The method of claim 22, further comprising:
- displaying, on the display of the CI, a direction designation interface configured to allow a user to designate a direction from the CI toward the VT;
- receiving, through the user interface of the CI while the direction designation interface is displayed, a direction designation designating the direction from the CI toward the VT; and
- associating, at the CI, the direction designation with the VT.

26. The method of claim 22, further comprising:
- receiving, at the CI, status information regarding parameters of the VT;
- determining, at the CI, whether the status information has a predefined relationship with a corresponding status threshold; and
- wirelessly communicating from the CI an alert activation signal to the VT in response to determining that the status information has the predefined relationship with the corresponding status threshold, wherein the alert activation signal is configured to cause the VT to activate an audible element at the VT to generate an audible alert.

27. A method of controlling irrigation, the method comprising:
- querying, from a controller interface (CI), an irrigation controller, wherein the CI is communicationally coupled with the irrigation controller;
- receiving, at the CI, a response to the query;
- generating at the CI a wireless activation signal as a function of the response to the query; and
- wirelessly transmitting the wireless activation signal to a valve transceiver (VT) configured to receive the wireless activation signal to control an actuator to actuate a valve.

28. The method of claim 27, wherein the receiving the response to the query comprises receiving status information from the irrigation controller identifying a status that the valve should be active; and
- wherein the wirelessly transmitting the wireless activation signal comprises broadcasting the wireless activation signal comprising an activation listing that identifies a state of multiple valves controlled through the CI.

\* \* \* \* \*